(12) United States Patent
Rajaiah et al.

(10) Patent No.: US 12,496,262 B2
(45) Date of Patent: *Dec. 16, 2025

(54) JAMMED EMULSION TOOTHPASTE COMPOSITIONS

(71) Applicant: The Procter & Gamble Company, Cincinnati, OH (US)

(72) Inventors: Jayanth Rajaiah, Loveland, OH (US); Paul Albert Sagel, Maineville, OH (US); Michael David Curtis, Mason, OH (US); Franco Silva Mederios, Loveland, OH (US); James Albert Berta, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/944,620

(22) Filed: Sep. 14, 2022

(65) Prior Publication Data
US 2023/0107290 A1 Apr. 6, 2023

Related U.S. Application Data

(60) Provisional application No. 63/245,947, filed on Sep. 20, 2021.

(51) Int. Cl.
*A61K 8/06* (2006.01)
*A61K 8/21* (2006.01)
(Continued)

(52) U.S. Cl.
CPC ............ *A61K 8/062* (2013.01); *A61K 8/21* (2013.01); *A61K 8/22* (2013.01); *A61K 8/362* (2013.01);
(Continued)

(58) Field of Classification Search
None
See application file for complete search history.

(56) References Cited

U.S. PATENT DOCUMENTS

| 2,798,053 A | 7/1957 | Brown |
| 2,835,628 A | 5/1958 | Saffir |
(Continued)

FOREIGN PATENT DOCUMENTS

| CN | 1893917 A | 1/2007 |
| DE | 2408663 A1 | 8/1975 |
(Continued)

OTHER PUBLICATIONS

Russell et al., Antibacterial activity of chlorhexidine, 1993, Journal of Hospital Infection, 25, p. 229 (Year: 1993).*

(Continued)

*Primary Examiner* — Michael G. Hartley
*Assistant Examiner* — Kaila A Craig
(74) *Attorney, Agent, or Firm* — John G. Powell; Elizabeth Conklin

(57) ABSTRACT

Jammed oil-in-water emulsion toothpaste compositions. Jammed oil-in-water emulsion toothpaste compositions with unexpectedly high yield stress values and/or high opacity without the use of a solid opacifier. Jammed oil-in-water emulsion toothpaste compositions with a hydrophobic phase with a particular droplet size of from about 0.4 microns to about 1000 microns, which can lead to toothpaste compositions with unexpectedly high yield stress values and/or high opacity without the use of a solid opacifier.

29 Claims, 7 Drawing Sheets

(51) Int. Cl.
  *A61K 8/22* (2006.01)
  *A61K 8/362* (2006.01)
  *A61K 8/49* (2006.01)
  *A61K 8/67* (2006.01)
  *A61K 8/92* (2006.01)
  *A61Q 11/00* (2006.01)

(52) U.S. Cl.
  CPC ............ *A61K 8/4973* (2013.01); *A61K 8/671* (2013.01); *A61K 8/92* (2013.01); *A61Q 11/00* (2013.01); *A61K 2800/21* (2013.01); *A61K 2800/26* (2013.01); *A61K 2800/28* (2013.01); *A61K 2800/30* (2013.01); *A61K 2800/92* (2013.01)

(56) References Cited

U.S. PATENT DOCUMENTS

| | | |
|---|---|---|
| 3,506,720 A | 4/1970 | Model et al. |
| 3,959,458 A | 5/1976 | Agricola |
| 3,988,433 A | 10/1976 | Benedict |
| 4,051,234 A | 9/1977 | Gieske |
| 4,606,913 A | 8/1986 | Aronson |
| 5,016,784 A | 5/1991 | Batson |
| 5,512,278 A | 4/1996 | Mundschenk |
| 5,741,773 A | 4/1998 | Zhang et al. |
| 5,891,453 A | 4/1999 | Sagel |
| 5,894,017 A | 4/1999 | Sagel et al. |
| 5,989,569 A | 11/1999 | Dirksing et al. |
| 6,040,160 A | 3/2000 | Kojima et al. |
| 6,045,811 A | 4/2000 | Dirksing et al. |
| 6,096,328 A | 8/2000 | Sagel et al. |
| 6,136,297 A | 10/2000 | Sagel |
| 6,509,007 B2 | 1/2003 | Rajaiah et al. |
| 6,635,676 B2 * | 10/2003 | Baker, Jr. ............ A61Q 17/005 514/642 |
| 8,084,408 B2 | 12/2011 | Wei |
| 10,780,032 B1 * | 9/2020 | Rajaiah ............ A61K 8/062 |
| 11,096,874 B2 | 8/2021 | Rajaiah et al. |
| 11,123,270 B2 | 9/2021 | Rajaiah et al. |
| 11,147,753 B2 | 10/2021 | Rajaiah et al. |
| 11,253,442 B2 | 2/2022 | Rajaiah et al. |
| 11,266,581 B2 | 3/2022 | Rajaiah et al. |
| 11,278,476 B2 | 3/2022 | Rajaiah et al. |
| 11,590,063 B2 | 2/2023 | Rajaiah et al. |
| 2002/0061282 A1 * | 5/2002 | Georgiades ............ A61K 8/362 424/49 |
| 2002/0176827 A1 | 11/2002 | Rajaiah |
| 2003/0113276 A1 | 6/2003 | Rajaiah et al. |
| 2003/0170193 A1 | 9/2003 | Pate et al. |
| 2004/0101494 A1 | 5/2004 | Scott et al. |
| 2004/0151674 A1 | 8/2004 | Appelqvist et al. |
| 2005/0008584 A1 | 1/2005 | Montgomery |
| 2005/0036958 A1 | 2/2005 | Feng |
| 2005/0063923 A1 | 3/2005 | Prencipe et al. |
| 2005/0064371 A1 | 3/2005 | Soukos |
| 2005/0137109 A1 * | 6/2005 | Quan ............ A61K 8/0208 510/303 |
| 2005/0137110 A1 | 6/2005 | Scott |
| 2005/0143274 A1 | 6/2005 | Ghosh et al. |
| 2005/0208106 A1 * | 9/2005 | Lange ............ A61P 17/00 424/443 |
| 2006/0010004 A1 | 1/2006 | Deckner |
| 2006/0013787 A1 * | 1/2006 | Sebillotte-Arnaud ........ A61K 8/0241 424/70.11 |
| 2006/0019214 A1 | 1/2006 | Lawrence |
| 2006/0078520 A1 | 4/2006 | Pays et al. |
| 2006/0127344 A1 | 6/2006 | Zofchak |
| 2007/0054233 A1 | 3/2007 | Rizoiu et al. |
| 2007/0054235 A1 | 3/2007 | Rizoui et al. |
| 2007/0054236 A1 | 3/2007 | Rizoiu |
| 2007/0059660 A1 | 3/2007 | Rizoiu |
| 2007/0116831 A1 | 5/2007 | Prakash et al. |
| 2007/0280894 A1 | 12/2007 | Romano et al. |
| 2008/0032252 A1 | 2/2008 | Hayman |
| 2008/0193404 A1 | 8/2008 | Lange et al. |
| 2008/0274067 A1 | 11/2008 | Chaffer |
| 2010/0285148 A1 | 11/2010 | Wlaschin |
| 2011/0089073 A1 | 4/2011 | Baig |
| 2011/0150788 A1 | 6/2011 | Gonzales et al. |
| 2011/0306004 A1 | 12/2011 | Sagel |
| 2012/0134936 A1 | 5/2012 | Kwak et al. |
| 2013/0295525 A1 | 11/2013 | Sagel |
| 2014/0178443 A1 | 6/2014 | Sagel et al. |
| 2014/0335028 A1 | 11/2014 | Prencipe et al. |
| 2015/0238399 A1 | 8/2015 | Spaid et al. |
| 2015/0353699 A1 | 12/2015 | Foudazi et al. |
| 2016/0038385 A1 | 2/2016 | Rege |
| 2016/0279039 A1 | 9/2016 | Giniger |
| 2017/0172864 A1 | 6/2017 | Evans |
| 2017/0239029 A1 | 8/2017 | Sagel |
| 2018/0127577 A1 | 5/2018 | Haase |
| 2018/0133119 A1 | 5/2018 | Rajaiah et al. |
| 2018/0133120 A1 | 5/2018 | Rajaiah |
| 2018/0133121 A1 | 5/2018 | Rajaiah et al. |
| 2018/0133122 A1 | 5/2018 | Rajaiah |
| 2018/0133128 A1 | 5/2018 | Rajaiah |
| 2018/0133502 A1 | 5/2018 | Rajaiah |
| 2018/0140516 A1 | 5/2018 | Rajaiah |
| 2020/0113790 A1 * | 4/2020 | Cambos ................ A61K 8/345 |
| 2020/0337954 A1 | 10/2020 | Rajaiah et al. |
| 2020/0337955 A1 | 10/2020 | Rajaiah et al. |
| 2020/0345597 A1 | 11/2020 | Rajaiah et al. |
| 2020/0375857 A1 | 12/2020 | Rajaiah et al. |
| 2021/0386633 A1 | 12/2021 | Rajaiah et al. |
| 2021/0393493 A1 | 12/2021 | Rajaiah et al. |
| 2022/0040061 A1 | 2/2022 | Rajaiah et al. |
| 2022/0280397 A1 | 9/2022 | Rajaiah et al. |
| 2022/0347064 A1 | 11/2022 | Rajaiah et al. |
| 2023/0091576 A1 | 3/2023 | Rajaiah et al. |
| 2023/0149275 A1 | 5/2023 | Rajaiah |
| 2023/0172818 A1 | 6/2023 | Rajaiah |
| 2023/0172819 A1 | 6/2023 | Rajaiah et al. |

FOREIGN PATENT DOCUMENTS

| | | | |
|---|---|---|---|
| DE | 102007013040 A1 | 9/2008 | |
| EP | 0251591 A1 | 7/1988 | |
| EP | 1696866 B1 | 9/2006 | |
| EP | 3315119 A1 | 10/2016 | |
| EP | 3315172 A1 | 10/2016 | |
| EP | 3315120 A1 * | 5/2018 | ............... A61K 8/64 |
| EP | 1863438 B1 | 10/2018 | |
| EP | 3522856 B1 | 3/2022 | |
| GB | 1492660 A | 11/1977 | |
| JP | S50104187 A | 8/1975 | |
| JP | 2008013450 A | 1/2008 | |
| WO | 03015656 A2 | 2/2003 | |
| WO | 2006138550 A1 | 9/2008 | |
| WO | 2010098761 A1 | 9/2010 | |
| WO | 2013093743 A1 | 6/2013 | |
| WO | 2016196473 A1 | 12/2016 | |
| WO | 201783570 A1 | 5/2017 | |
| WO | 2017090998 A1 | 6/2017 | |
| WO | 2020219319 A1 | 10/2020 | |
| WO | 2020219320 A1 | 10/2020 | |
| WO | 2020219321 A1 | 10/2020 | |
| WO | 2020219322 A1 | 10/2020 | |

OTHER PUBLICATIONS

Princen, H.M., Rheology of Foams and Highly Concentrated Emulsions, 1985, 105, pp. 150-171 (Year: 1985).*
Princen (Rheology of Foams and Highly Concentrated Emulsions, Journal of Colloid and Interface Science (1985) 105, 150-171) (Year: 1985).*
PCT Search Report and Written Opinion for PCT/US2022/076631 dated Jan. 18, 2023, 12 pages.
"Balm SPF 36", Mintel XP 55709825A Etude House Collagen MoistfullColour Cosmetics, Oct. 2009, 5 pages.

(56) References Cited

OTHER PUBLICATIONS

"Cooling Foot & Leg Gel", Mintel XP 55709836A, Aug. 2008, 2 pages.
"Face Wash", Mintel XP 55709835A The Body Shop, Jan. 2009, 3 pages.
"Glacial Face Wash", XP 55709842A Mintel, Sep. 2006, 4 pages.
"Revolumising Lip Care", Mintel XP 55709829 Jeanne Gatineau, Mar. 2009, 5 pages.
"Sebum Clearing Masque", Mintel XP 55709826A Dermalogica, Sep. 2009, 4 pages.
"Span and Tween", Retrieved from: https://chemagent.su/index.php, Aug. 1, 2010, 6 pages.
Aland, Sebastian et al. "Simulation of common features and differences of surfactant-based and solid-stabilized emulsions", Colloids and Surfaces a: Physiochemicl and Engineering Aspects, vol. 413, Nov. 5, 2012, pp. 298-302.
Chemistry and Technology of Silicones, Walter Noll, Academic Press Inc, (Harcourt Brue Javanovich, Publishers, New York), 1968, pp. 282-287 and 409-426.
Choi, et al., "Jamming and unjamming transition of oil-in-water emulsions under continuous temperature change". Biomicrofluidics, vol. 9, 2015, pp. 03417-1 to 034107-13.
Claudio Peri, "The Extra—Virgin Olive Oil Handbook-Appendix", Published in Wiley Online Library, Mar. 21, 2014, pp. 349-360.
Claudio Peri: "Appendix" In: "The Extra-Virgin Olive Oil Handbook", John Wiley and Sons Ltd., XP055494736, ISBN: 978-1-118-46041-2, Mar. 21, 2014, pp. 349-360.
Fei, et al., "Active colloidal particles at fluid-fluid interface", Current Opinion in Colloid and Interface Science, vol. 32, Oct. 31, 2017, pp. 57-68.
GNPD "Lemon Soda Toothpaste" Dec. 6, 2010 retrieved from www.gnpd.com, 4 Pages.
Google Scholar Search "Rinseable Multi-Phase Compositions" dated Jan. 2021, 2 Pages.
ICI Americas Inc. "The HLB System A Time-Saving GUide to Emulsifier Selection". Mar. 1980, pp. 1-22.
Jansen, et al., "From Bijels to Pickering Emulsions: a lattice Boltzmann study", arxiv.org, Apr. 26, 2010, 11 Pages.
Jasna Brujic, Chaoming Song, Ping Wang, Christopher Briscoe, Guillaume Marty, and Hernan A. Makse. "Measuring the Coordination Number and Entropy of a 3D Jammed Emulsion Packing by Confocal Microscopy." Physical Review Letters, Year 2007, pp. 248001-1 to 248001-4.
Kaganyuk, et al., "Role of particles in the rheology of solid-stabilized high internal phase emulsions", Journal of Colloid and Interface Science, vol. 540, Mar. 22, 2019, pp. 197-206.
Kalyanram, et al., "Aerosol-Ot Stabilized Micro and Nano-Scale Emulsions for Pharmaceutical Formulations", In International Journal of Organic & Medicinal Chemistry, vol. 4, Issue 5, Dec. 18, 2017, 3 Pages.
Kirk-Othmer, Encyclopedia of Chemical Technology, Fourth Edition, vol. 21, Jan. 6, 1997, pp. 207-218.
Kostansek, Edward, and Updated by Staff. "Emulsions." Kirk-Othmer Encyclopedia of Chemical Technology (2000), pp. 1-24.
Marshall et al. "Hydrogen Peroxide: A Review of Its Use in Dentistry", In Journal of Periodontology, vol. 66, Issue 9 (Year: 1995), 8 Pages.
Mishra, et al., "Microemulsions: as drug delivery system." In Journal of Scientific Innovative Research 3(4), 2014, pp. 467-474.
Pal, Rajinder, "Yield stress and viscoelastic properties of high internal phase ratio emulsions", In Journal of Colloid and Polymer Science, vol. 277, Jun. 1999, pp. 583-588.
Penreco, "Intelligent Gel Technology Product Specifications: Versagel M." www.penreco.com, Jun. 2016, 2 pages.
Shakeel, et al., "Bigels: A unique class of materials for drug delivery applications", SOFT Materials, vol. 16, No. 2, 22, Jan. 2018, pp. 77-93.
University of Pennsylvania, "Easier Way to make bijels", a complex new form of liquid matter, retrieved from the Internet: https://www.sciencedaily.com/releases/2016/01/160128160015.htm, Jan. 28, 2016, 3 Pages.
www.fao.org, "petroleum jelly-FAO". Prepared at the 51st JECFA (1998), published in FNP 52 Add 6 (1998), 5 pages.

* cited by examiner

Example II-D

Example II-C

Example II-F

Example II-G

Example II-A

Example II-C

Example II-D

Example II-F

JAMMED EMULSION TOOTHPASTE COMPOSITIONS

FIELD OF THE INVENTION

The present invention relates to toothpaste compositions comprising jammed emulsion, such as jammed oil-in-water emulsion. The present invention also relates to toothpaste compositions comprising jammed oil-in-water emulsion with unexpectedly high yield stress values and/or high opacity without solid opacifiers. The present invention further relates to toothpaste compositions comprising jammed oil-in-water emulsion wherein the hydrophobic phase can have a particular droplet size to provide a suitable yield stress and/or opacity.

BACKGROUND OF THE INVENTION

Typically, toothpaste compositions are formulated as a single-phase aqueous chassis or a single-phase non-aqueous chassis. In many cases, additional ingredients are added to toothpaste composition to impart structure and/or increase the yield stress of the toothpaste composition.

For example, thickening agents can be added to toothpaste compositions to increase the yield stress of the toothpaste so that the toothpaste can be dispensed from a tube and/or stand-up on the bristles of a toothbrush (i.e. not sink into the bristles of the toothbrush upon dispensing). However, many consumers desire a simpler toothpaste composition with a smaller number of ingredients. Additionally, the introduction of additional ingredients can lead to formulation instability if the added ingredients interact with other toothpaste components.

Thus, there is a need for a toothpaste composition with a suitable yield stress and/or opacity without having to introduce thickening agents, structuring agents, and/or solid opacifiers.

SUMMARY OF THE INVENTION

Disclosed herein is a jammed oil-in-water toothpaste composition comprising (a) aqueous phase; (b) hydrophobic phase; and (c) emulsifier, wherein the hydrophobic phase has a D[4,3] equivalent-diameter of droplets of hydrophobic phase is from about 0.001 microns to about 1000 microns.

Also disclosed herein is a jammed oil-in-water toothpaste composition comprising (a) aqueous phase; (b) hydrophobic phase; and (c) emulsifier, wherein the toothpaste composition has a yield stress of from about 2 Pa to about 5000 Pa.

Also disclosed herein is an opaque jammed oil-in-water toothpaste composition comprising (a) aqueous phase; (b) hydrophobic phase; and (c) emulsifier, wherein the toothpaste composition is substantially free of, essentially free, and/or free of solid opacifier.

DETAILED DESCRIPTION OF THE INVENTION

Figure 1:
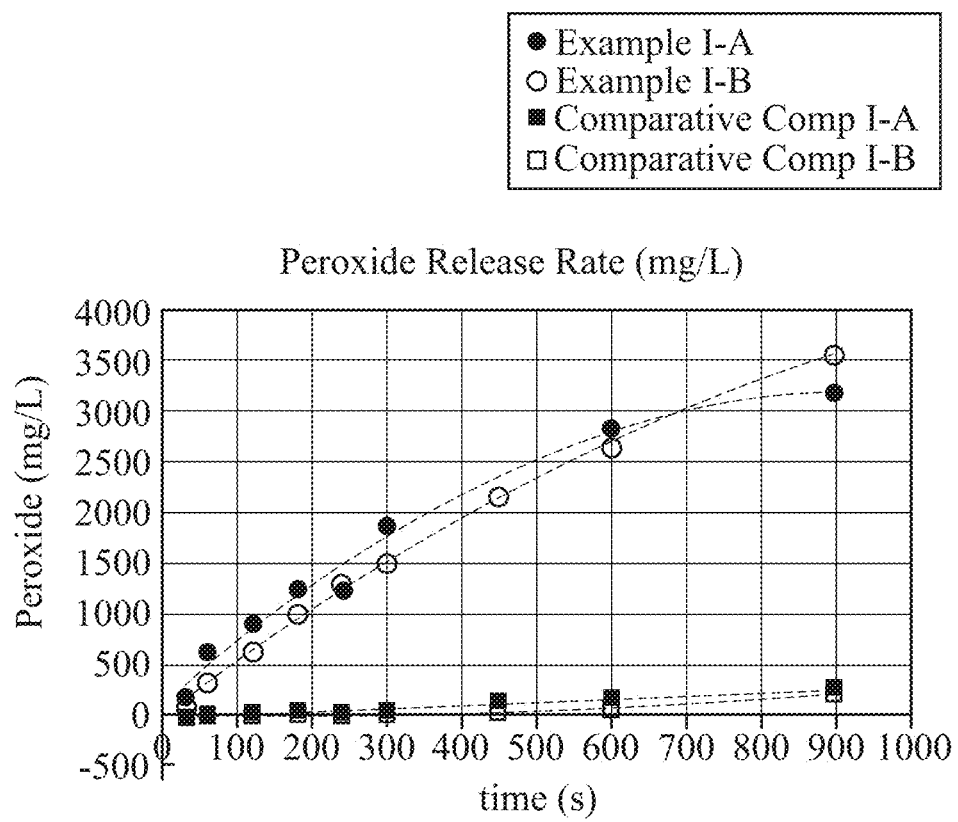
FIG. 1 shows the peroxide release rate of Example I-A and Example I-B.
Figure 2:
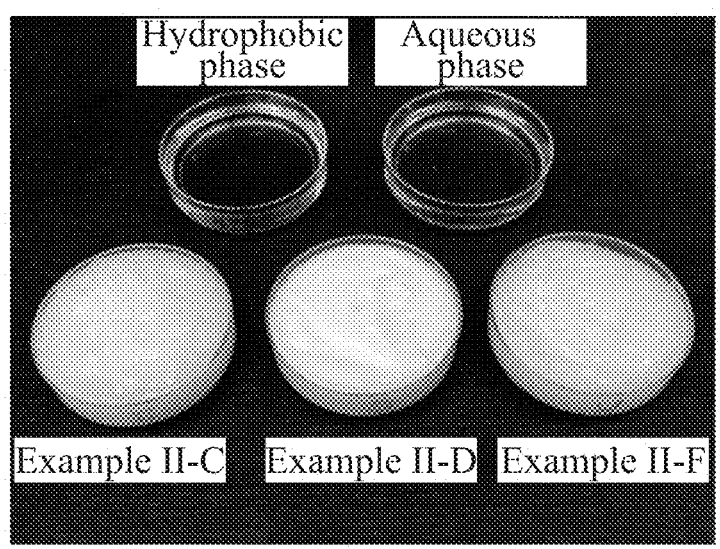
FIG. 2 shows a photograph of Hydrophobic Phase and Aqueous Phase from TABLE 8, and Examples II-C, II-D and II-F.
Figure 3A:
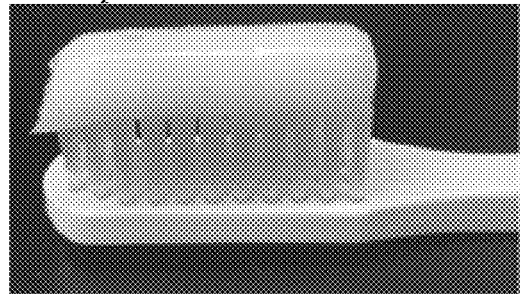
FIG. 3A shows a photograph of a nurdle of Example II-C dispensed on a toothbrush.
Figure 3B:
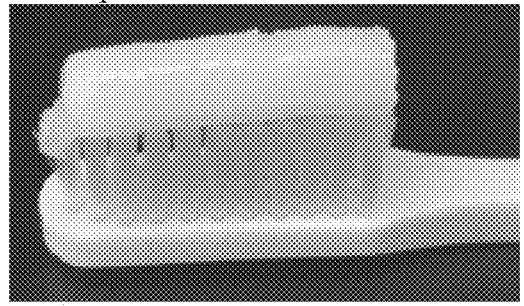
FIG. 3B shows a photograph of a nurdle of Example II-D dispensed on a toothbrush.
Figure 3C:
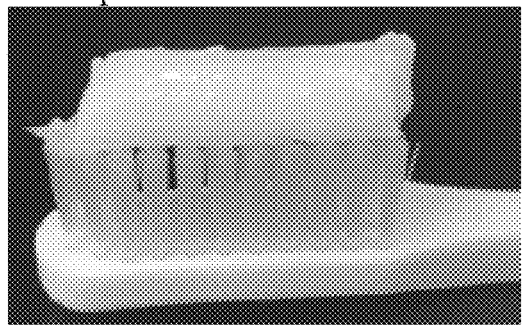
FIG. 3C shows a photograph of a nurdle of Example II-F dispensed on a toothbrush.
Figure 3D:
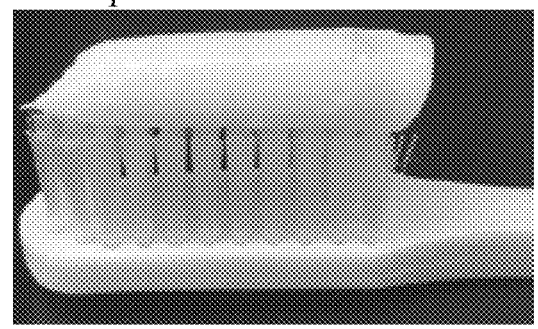
FIG. 3D shows a photograph of a nurdle of Example II-F dispensed on a toothbrush.
Figure 4:
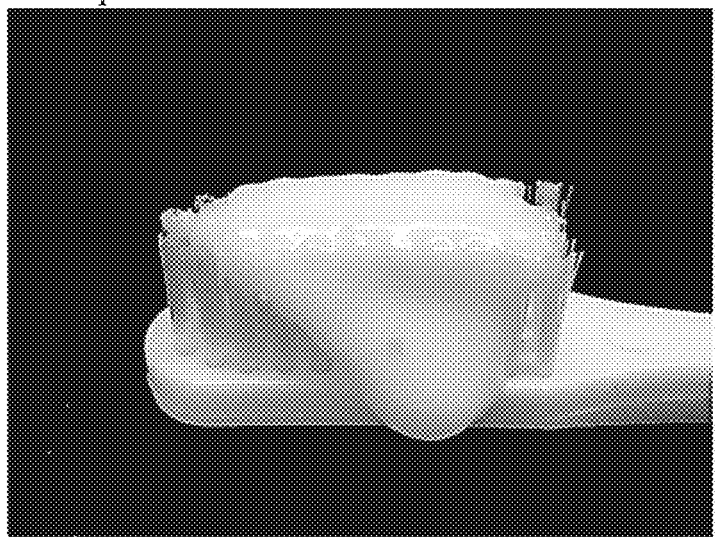
FIG. 4 shows a photograph of a nurdle of Example I-A dispensed onto a toothbrush.

Typically, toothpaste compositions are formulated as a single-phase aqueous chassis or a single-phase non-aqueous chassis further combined with abrasives and flavors. In many cases, thickening agents need to be added to these toothpaste compositions to increase the yield stress of the toothpaste so that the toothpaste can be dispensed from a tube and/or stand-up on the bristles of a toothbrush (i.e. not sink into the bristles of the toothbrush upon dispensing).

Surprisingly, a toothpaste composition including jammed oil-in-water emulsion has a yield stress that is greater than the aqueous phase and/or the hydrophobic phase that are used to make the jammed oil-in-water emulsion. In other words, two components are mixed with a low yield stress and the resulting jammed oil-in-water emulsion that is made upon mixing, as described herein, has an unexpectedly high yield stress. While not wishing to being bound by theory, it is believed that the jammed oil-in-water emulsion can have a higher than expected yield stress once the high internal phase undergoes the jamming transition.

The jammed oil-in-water emulsion can be made through the portion-wise addition or slow gradual addition of the hydrophobic phase to the aqueous phase, as described herein. Upon the making of the jammed oil-in-water emulsion, the yield stress is greater than the yield stress of the hydrophobic phase and/or the aqueous phase. It has also been found that, surprisingly, the yield stress of the jammed oil-in-water emulsion can also be manipulated through physical manipulation, such as, for example, rate of mixing or shear, after the entirety of the hydrophobic phase has been added to the aqueous phase or while the hydrophobic phase is being added to the aqueous phase. The physical manipulation, such as through stirring, shaking, vibrating, high shear mixing, homogenization, etc., can lead to additional increases in yield stress of the toothpaste composition without the need to add subsequent processing or stabilizing aids, such as thickening agents.

While not wishing to being bound by theory, it is believed as droplets or regions of hydrophobic phase are appropriately sized, the yield stress of the composition will be suitable for use as a toothpaste. Suitable yield stresses can include 4 Pa to about 1000 Pa, from about 25 Pa to about 500 Pa, and/or other ranges described further herein. Opacifiers, such as titanium dioxide, can be added to the formulation to make the toothpaste opaque in appearance. Unexpectedly, the toothpaste composition comprising jammed oil-in-water emulsion can provide an opaque appearance without the addition of opacifiers even when the aqueous phase and/or the hydrophobic phase are not opaque.

While not wishing to being bound by theory, it is believed when droplets or regions of hydrophobic phase are appropriately sized to reflect wavelengths of visible light (from about 400 nm to about 700 nm), the composition becomes opaque in appearance—surprisingly even without solid particulate opacifiers, such as titanium dioxide. Accordingly, the Dv 50 equivalent-diameter, D[4,3] equivalent-diameter, or D[3,2] equivalent-diameter of the droplets or regions of hydrophobic phase may be from about 0.001 to about 1000 microns, or preferably from about 0.01 to about 100 microns. These compositions may be jammed macro-emulsions.

Surprisingly, when the Dv 50 equivalent-diameter, D[4,3] equivalent-diameter, or D[3,2] equivalent-diameter of the droplets or regions of hydrophobic phase is be from about 0.001 to about 1000 microns or preferably from about 0.01 to about 100 microns, the jammed oil-in-water toothpaste has a suitable yield stress and a suitable opacity without the need for solid particulates.

Definitions

The term "oral care composition", as used herein, includes a product, which in the ordinary course of usage, is not intentionally swallowed for purposes of systemic administration of particular therapeutic agents, but is rather retained in the oral cavity for a time sufficient to contact dental surfaces or oral tissues. Examples of oral care compositions include dentifrice, toothpaste, tooth gel, subgingival gel, mouth rinse, mousse, foam, mouth spray, lozenge, chewable tablet, chewing gum, tooth whitening strips, floss and floss coatings, breath freshening dissolvable strips, denture care or adhesive product, unit-dose composition, and/or fibrous composition. The oral care composition may also be incorporated onto strips or films for direct application or attachment to oral surfaces.

The term "dentifrice composition", as used herein, includes tooth or subgingival-paste, gel, or liquid formulations unless otherwise specified. The dentifrice composition may be a single-phase composition or may be a combination of two or more separate dentifrice compositions. The dentifrice composition may be in any desired form, such as deep striped, surface striped, multilayered, having a gel surrounding a paste, or any combination thereof. Each dentifrice composition in a dentifrice comprising two or more separate dentifrice compositions may be contained in a physically separated compartment of a dispenser or single compartment of a dispenser and dispensed side-by-side.

The term "toothpaste composition" as used herein means a water-dispersible composition that is designed to treat surfaces of the oral cavity, such as through the release of oral care agents. Suitable toothpaste compositions can be applied or used using a brush with bristles and can be rinsed from the brush. Additionally, toothpaste compositions can include compositions that are brushed onto teeth and the excess may be spit out but not rinsed out of the mouth.

The term "immiscible" or "insoluble" as used herein means less than 1 part by weight of the substance dissolves in 100 parts by weight of a second substance.

The term "solubility" as used herein is the maximum number of parts by weight of the substance that can dissolve in 100 parts by weight of a second substance.

The term "phase" as used herein means a physically distinct region or regions, which may be continuous or discontinuous, having one or more properties that are different from another phase. Non-limiting examples of properties that may be different between phases include composition, viscosity, solubility, hydrophobicity, hydrophilicity, visual characteristics, and miscibility. Examples of phases include solids, semisolids, liquids, and gases.

The term "multi-phase oral care composition" as used herein comprises a mixture of two or more phases that are immiscible with each other, for example water-in-oil, oil-in-water emulsions, or mixtures thereof. The phases may be continuous, discontinuous, or combinations thereof. The multi-phase oral care composition or a phase of the multi-phase oral care composition may be solid, liquid, semisolid, or combinations thereof. In preferred aspects the multi-phase oral care composition is semisolid. Examples of multi-phase oral care compositions also include compositions where the phases are multi-continuous including bi-continuous, layered, striped, marbled, ribbons, swirled, and combinations thereof. Examples of multi-phase oral care compositions also include compositions where the phases are tessellated or tiled.

The term "emulsion" as used herein is an example of a toothpaste composition wherein: 1) at least one of the phases is discontinuous and 2) at least one of the phases is continuous. Examples of emulsions include droplets of oil dispersed in water. In this example, the water and oil would be mutually immiscible with each other, oil would be the discontinuous phase, and the water would be the continuous phase.

The term "macro-emulsion" as used herein is an example of an emulsion wherein at least one of the discontinuous phases is visible under a microscope using light with one or more wavelengths from 400 nm to 700 nm. Examples of macro-emulsions include those in which the Dv 50 equivalent-diameter, D[4,3] equivalent-diameter, or D[3,2] equivalent-diameter of the regions of at least one of the discontinuous phases is larger than the wavelength of light being used, for instance larger than 0.4, or 0.7 micron.

The term "micro-emulsion" as used herein is an example of an emulsion wherein the discontinuous phases is not visible under a microscope using light with one or more wavelengths from 400 nm to 700 nm. Examples of micro-emulsions include those in which the regions of the discontinuous phases are smaller than the wavelength of light being used, for instance smaller than 0.4, or 0.7 micron.

The term "oil-in-water emulsion" as used herein is an example of an emulsion wherein 1) the continuous phase is aqueous or hydrophilic, and 2) the discontinuous phase is hydrophobic.

The term "water-in-oil emulsion" as used herein is an example of an emulsion wherein 1) the continuous phase is hydrophobic, and 2) the discontinuous phase is aqueous or hydrophilic.

The term "high internal phase emulsion" as used herein is an example of an emulsion wherein the discontinuous phase comprises more than about 74% by weight or volume of the toothpaste composition. High internal phase emulsions may be oil-in-water emulsions, water-in-oil emulsions, or mixtures thereof.

The term, "jammed emulsion" as used herein, is a high internal phase emulsion 1) wherein the high internal phase emulsion exhibits no more than 5% macroscopic separation after 48 hours at 23° C. measured according to the method specified herein, and/or 2) wherein separate regions of discontinuous phase influence the shape of one another. Examples of jammed emulsions may include high internal phase emulsions in which adjacent or neighboring regions of discontinuous phase influence the shape of one another.

The term "jamming concentration" of a high internal phase emulsion as used herein is the minimum concentration of the discontinuous phase above which the high internal phase emulsion 1) exhibits no more than 5% macroscopic separation after 48 hours at 23° C. measured according to the method specified herein, and/or 2) wherein separate regions of discontinuous phase influence the shape of one another.

The term "jam" or "jamming" of a high internal phase emulsion as used herein is the phenomenon where the high internal phase emulsion transitions to one that 1) exhibits no more than 5% macroscopic separation after 48 hours at 23° C. measured according to the method specified herein and/or 2) wherein separate regions of discontinuous phase influence the shape of one another.

The term "solid" as used herein is a material that, at room temperature, 1) has defined dimensions even when it is not constrained in a container, or 2) maintains its original shape when it is picked up off a surface and subsequently placed back on the surface.

The term "liquid" as used herein is a material that, at room temperature, 1) flows under gravity, or 2) takes the shape of the container it is placed in. Examples of liquids include mineral oil, water, and silicone oil. When a liquid is poured into a container, the exposed surface (the surface that is not in contact with the walls of the container) of liquids may become horizontal and flat due to gravity. Liquids may have a freezing point, melting point or drop melting point as measured according to ASTM method D127 or a congealing point as measured according to ASTM method D938 or a pour point as measured according to ASTM D97 less than about OC, less than about 23° C., or less than about 40° C. Liquids may have a kinematic viscosity measured according to ASTM D445 at 40° C. less than about 10,000 cSt, less than about 1000 cSt, or less than about 100 cSt.

The term "semisolid" as used herein is a material that, at room temperature, 1) has some solid-like properties and some liquid-like properties, or 2) whose ability to meet the above definition of a solid or liquid may depend on the amount of material being evaluated; for example, a small amount of petrolatum placed in a large container may not flow under gravity, and it may not take the shape of the container (thus not meeting the definition of a liquid); but a large amount of petrolatum placed in an large container may flow under gravity, or it may take the shape of the container (thus meeting the definition of a liquid). Examples of semisolids include petrolatum, toothpaste, silicone gels, butter, creams, ointments, and jammed emulsions.

The term "lotion" as used herein is a preparation intended for application on the body, surfaces of the oral cavity, or mucosal surfaces. Examples of lotions include hand lotions, skin care lotions, body lotions, suntan lotions, and jammed emulsions.

The term "aqueous phase" as used herein is a phase that comprises water, optionally at least one oral care active agent, and is immiscible with the hydrophobic phase.

The term "hydrophobic phase" as used herein means all components of the composition that are immiscible with the aqueous phase.

The term "equivalent-diameter" of a region or droplet as used herein means the diameter of a sphere having the same volume as the region or droplet.

The term "Dv 50 equivalent-diameter" as used herein is the equivalent-diameter in microns at which 50% of the regions of hydrophobic phase or droplets of aqueous phase are smaller and 50% are larger. The v in the term Dv 50 shows that this refers to the volume distribution. The Dv 50 equivalent-diameter of regions of hydrophobic phase of a multi-phase oral care composition is measured according to the method specified herein.

The term "D[4,3] equivalent-diameter" as used herein is the volume-weighted-mean equivalent-diameter in microns of the regions of hydrophobic phase or droplets of aqueous phase. The D[4,3] equivalent-diameter of regions of hydrophobic phase of a multi-phase oral care composition is measured according to the method specified herein.

The term "D[3,2] equivalent-diameter" as used herein is the surface-weighted-mean equivalent-diameter in microns of the regions of hydrophobic phase or droplets of aqueous phase. The D[3,2] equivalent-diameter of regions of hydrophobic phase of a multi-phase oral care composition is measured according to the method specified herein.

The term "cone penetration consistency value" as used herein means the depth, in tenths of a millimeter, that a standard cone will penetrate the sample under fixed conditions of mass, time, and temperature. The cone penetration consistency value is measured according to ASTM method D937.

The term "yield stress" as used herein means the critical shear stress at which the material begins to flow as a liquid.

The term "rinseable" as used herein means the material can be rinsed from a surface using water at a certain temperature in a certain period of time. Examples of rinseable materials generally include honey, milk, and compositions comprising oil-in-water emulsions such as Example I and Example II below.

The term "dispersible" as used herein means the material can be dispersed in water at 23° C.±2° C. The water-dispersibility of the material is measured according to the method specified herein. Examples of water-dispersible materials generally include compositions comprising oil-in-water emulsions such as Examples I and Example II below.

The term "macroscopic separation" as used herein is a phenomenon in which at least a portion of one or more components or one or more phases of a composition separates out of the composition. The macroscopic separation is measured according to the method specified herein. The lack of macroscopic separation is a measure of the physical stability of a composition.

The term "opacifier" as used herein is a solid particulate material that is opaque and is generally used to increase the opacity of a composition. Examples of opacifiers include titanium dioxide powder and zinc oxide powder.

The term "heterogenous dispersion" as used herein is a heterogenous combination of two or more substances Examples of heterogenous dispersions include emulsions such as oil-in-water emulsions, and jammed emulsions. Heterogenous dispersions do not include homogenous dispersions (such as solutions where a solute is uniformly dissolved in a solvent).

The term "petrolatum" as used herein means a semisolid mixture of hydrocarbons. Petrolatum may have a cone penetration consistency value as measured according ASTM method D937 from about 10 to about 500, preferably from about 25 to about 300, more preferred from about 50 to about 250, or more preferred from about 100 to about 200. Petrolatum may have a melting point or drop melting point as measured according to ASTM method D127 or a congealing point as measured according to ASTM method D938 from about from about 40° C. to about 120° C., preferably from about 50° C. to about 100° C., more preferred from about 500 to about 90° C., or more preferred from about 60° C. to about 80° C.

The term "mineral oil" as used herein means a liquid mixture of hydrocarbons. Mineral oil may have a cone penetration consistency value as measured according ASTM method D937 more than about 600, preferably more than about 500, or more preferred more than about 400. Mineral oil may have a freezing point, melting point or drop melting point as measured according to ASTM method D127 or a congealing point as measured according to ASTM method D938 or a pour point as measured according to ASTM D97 less than about 0° C., less than about 23° C., or less than about 40° C. Mineral oil may have a kinematic viscosity measured according to ASTM D445 at 40° C. less than about 10,000 cSt, less than about 1000 cSt, or less than about 100 cSt.

The term "HLB" of an emulsifier is an expression of its Hydrophile-Lipophile Balance, i.e. the balance of the size and strength of the hydrophilic (water-loving or polar) and the lipophilic (oil loving or non-polar) groups of the emulsifier. The HLB values are quantified as follows:

A. For non-ionic emulsifiers (except those containing propylene oxide, butylene oxide, nitrogen, or sulfur) HLB values are calculated according to the procedure specified in "The HLB system—a time-saving guide to emulsifier selection", from ICI Americas, Wilmington Delaware 19897, which is herein incorporated in its entirety by reference, including the various emulsifiers and blends of multiple emulsifiers listed in it along with their HLB values.

B. For ionic emulsifiers HLB values are calculated according to the procedure specified in 1) "A quantitative kinetic theory of emulsion type I, physical chemistry of the emulsifying agent" by J. T. Davies J. H. Schulman (Ed.), Proceedings of the 2nd International Congress on Surface Activity, Academic Press, New York (1957), 2) Davies, J. T. (1959) Proc. Int. Congr. Surf. Act., 1, 426, and/or 3) Davies, J. T. and Rideal, E. K. (1961) Interfacial Phenomena.

For all other emulsifiers and those whose HLB values cannot be calculated according to either of the above two procedures, HLB values are measured experimentally according to the experimental procedure specified in "The HLB system—a time-saving guide to emulsifier selection", from ICI Americas, Wilmington Delaware 19897.

"Active and other ingredients" useful herein may be categorized or described herein by their cosmetic and/or therapeutic benefit or their postulated mode of action or function. However, it is to be understood that the active and other ingredients useful herein can, in some instances, provide more than one cosmetic and/or therapeutic benefit or function or operate via more than one mode of action. Therefore, classifications herein are made for the sake of convenience and are not intended to limit an ingredient to the particularly stated function(s) or activities listed.

The term "teeth", as used herein, refers to natural teeth as well as artificial teeth or dental prosthesis and is construed to comprise one tooth or multiple teeth. The term "tooth surface" as used herein, refers to natural tooth surface(s) as well as artificial tooth surface(s) or dental prosthesis surface (s) accordingly.

As used herein, the word "or" when used as a connector of two or more elements is meant to include the elements individually and in combination; for example X or Y, means X or Y or both.

"Array" means a display of packages comprising oral care compositions comprising varying amounts and identities of actives, such as anticaries drugs. The packages may have the same brand and/or sub-brand and/or the same trademark registration and/or having been manufactured by or for a common manufacturer and the packages may be available at a common point of sale (e.g. oriented in proximity to each other in a given area of a retail store or organized together on the same website). An array is marketed as a line-up of products normally having like packaging elements (e.g., packaging material type, film, paper, dominant color, design theme, etc.) that convey to consumers that the different individual packages are part of a larger line-up. Arrays often have the same brand, for example, "Crest," and same sub-brand, for example, "Pro-Health." A different product in the array may have the same brand "Crest" and, optionally a different sub-brand "3D White." The differences between the "Pro-Health" product of the array and the "3D White" product in the array may include product form, different anticaries drug, different amounts of the anticaries drug, or other differences in other active or inactive ingredients. Arrays also often have the same trademarks, including trademarks of the brand, sub-brand, and/or features and/or benefits across the line-up. "On-line Array" means an "Array" distributed by a common on-line source.

While compositions and methods are described herein in terms of "comprising" various components or steps, the compositions and methods can also "consist essentially of" or "consist of" the various components or steps, unless stated otherwise.

The term "substantially free" as used herein refers to the presence of no more than 0.05%, preferably no more than 0.01%, and more preferably no more than 0.001%, of an indicated material in a composition, by total weight of such composition.

The term "essentially free" as used herein means that the indicated material is not deliberately added to the composition, or preferably not present at analytically detectable levels. It is meant to include compositions whereby the indicated material is present only as an impurity of one of the other materials deliberately added.

All measurements referred to herein are made at about 23° C. (i.e. room temperature) unless otherwise specified.

The toothpaste composition, as described herein, comprises oral care active agent, such as fluoride, peroxide, and/or metal, delivered from a jammed-oil-in-water emulsion, as described herein. Additionally, the toothpaste composition can comprise other optional ingredients, as described below. The section headers below are provided for convenience only. In some cases, a compound can fall within one or more sections. For example, stannous fluoride can be a tin compound and/or a fluoride compound.

Jammed Emulsions

The toothpaste comprises a high internal phase emulsion, jammed water-in-oil emulsion, or jammed oil-in-water emulsion, such as the jammed oil-in-water emulsions that are described in U.S. Pat. No. 10,780,032, which is herein incorporated by reference in its entirety.

Traditional oil-in-water emulsions are multi-phase compositions with a discontinuous hydrophobic phase and a continuous aqueous phase. Traditional oil-in-water emulsions can be prepared by combining a minority hydrophobic phase with a majority aqueous phase. Traditional oil-in-water emulsions are discontinuous droplets of hydrophobic phase suspended and/or stabilized within a continuous aqueous phase. As the hydrophobic and aqueous phases are immiscible, generally only a small portion of the hydrophobic phase can be stabilized within the aqueous phase before macroscopic separation occurs.

A high internal phase emulsion can be either oil-in-water or water-in-oil emulsion, wherein there is a high amount of the internal, discontinuous phase, by volume or weight of the multi-phase composition, relative to a traditional emulsion. A high internal phase emulsion can have more of the internal, discontinuous phase, by volume or weight of the total multi-phase composition than the external, continuous phase, by volume or weight of the multi-phase composition.

However, the stability of high internal phase emulsions can prove challenging. High internal phase emulsions can suffer from macroscopic separation upon mixing or during storage of the high internal phase emulsions prior to use by a consumer.

As described herein, a jammed emulsion may be an unexpectedly stable high internal phase emulsion. As the concentration of the discontinuous phase of a high internal phase emulsion is increased, regions of discontinuous phase can become sufficiently crowded, such that they can jam against each other with a region of continuous phase between them and deform each other with a region of continuous phase between them. If both the continuous phase and discontinuous phase are liquids, the emulsion can transition into an at least partially semisolid structure once the jamming transition occurs.

Examples of jammed emulsions include those in which, under a microscope, 1) regions of discontinuous phase are or resemble polyhedrons or polygons, with or without rounded corners, with visible jamming between regions of discontinuous phase, with continuous phase sandwiched between regions of discontinuous phase, 2) regions of discontinuous phase are or resemble non-spherical shapes, with visible jamming between regions of discontinuous phase, with continuous phase sandwiched between regions of discontinuous phase, 3) regions of discontinuous phase are in a tessellated or tiled pattern or resemble one, with continuous phase sandwiched between regions of discontinuous phase, or 4) regions of discontinuous phase are in a pattern that resemble a Voronoi diagram with continuous phase sandwiched between regions of discontinuous phase.

The jammed emulsion, as described herein, can be prepared by the portion-wise addition or gradual addition or slow addition of the discontinuous phase to the continuous phase with adequate energy of mixing. Simply combining the entire discontinuous phase to the continuous phase will not necessarily result in jammed emulsion.

Without wishing to be bound by theory, the ratio of the rate of addition of the discontinuous phase to the energy of mixing may be a factor to help form a jammed emulsion. For example, hypothetically, a slow rate of addition combined with inadequate energy of mixing may not favor the formation of a jammed emulsion. In contrast, hypothetically, even a faster rate of addition combined with an adequate energy of mixing may favor the formation of a jammed emulsion.

Without wishing to be bound by theory, it is believed that adding the entire discontinuous phase to the continuous phase, macroscopic separation will be more likely to occur. Instead, by slowly adding (either by portion-wise addition or a slow and/or steady continuous addition), the molecules of the discontinuous phase can associate into discrete regions instead of separating macroscopically. As the concentration of the discontinuous phase reaches the jamming concentration, a jamming transition can occur where separate regions of the discontinuous phase can influence the shapes of one another (for example neighboring or adjacent regions of discontinuous phase), which can contribute to the unexpected stability of jammed emulsions. In certain aspects of jammed emulsions, 1) separate regions of the discontinuous phase can influence the shape of one another (for example neighboring or adjacent regions of discontinuous phase), which can lead to a transition from substantially spherical discontinuous regions to at least partially polyhedral discontinuous regions at the jamming concentration, or 2) the emulsion can exhibit a Yield Stress or Brookfield Viscosity greater than that of the constituent aqueous phase and/or the hydrophobic phase measured according to the methods specified herein at 23° C.

The toothpaste composition, as described herein, comprises a jammed emulsion, such as a jammed oil-in-water emulsion. The jammed oil-in-water emulsion comprises discontinuous hydrophobic phase, continuous aqueous phase, and/or oral care active agent.

Aqueous Phase

The jammed oil-in-water emulsion comprises aqueous phase. The jammed oil-in-water emulsion can comprise minority aqueous phase. The aqueous phase can be at least partially continuous, essentially continuous, or continuous.

The jammed oil-in-water emulsion can comprise from about 0.01% to about 75%, from about 0.01% to about 25%, from about 1% to about 20%, from about 2.5% to about 20%, from about 1% to about 20%, or from about 5% to about 15%, by weight or volume of the jammed oil-in-water emulsion, of the aqueous phase.

The aqueous phase may also include other water-soluble solvents, such as for example, polyalkylene glycols with molecular weights from about 200 to about 20,000, humectants, or combinations thereof. Suitable humectants generally include edible polyhydric alcohols such as glycerin, sorbitol, xylitol, butylene glycol, and propylene glycol, and mixtures thereof. The aqueous phase may comprise at least about 10%, at least about 20%, or at least about 30%, of water, by weight or volume of the aqueous phase.

The aqueous phase can be in a minority proportion relative to the aqueous phase present in the toothpaste composition. As used herein "minority proportion" means that the percent by weight or volume of the aqueous phase of the toothpaste composition is less than the percent by weight or volume of the hydrophobic phase of the toothpaste composition.

The jammed oil-in-water emulsion may comprise an aqueous solution of a bleaching agent, such as hydrogen peroxide, optionally including emulsifier.

Hydrophobic Phase

The jammed oil-in-water emulsion comprises hydrophobic phase. The jammed oil-in-water emulsion can comprise majority hydrophobic phase. The hydrophobic phase is at least partially discontinuous, essentially discontinuous, or preferably discontinuous.

The toothpaste composition comprises a safe and effective amount of a hydrophobic phase. The toothpaste composition can comprise at least about 10%, at least about 25%, at least about 50%, at least about 60%, from about 75% to about 99%, from about 10% to about 99%, from about 25% to about 95%, from about 80% to about 99%, greater than about 80%, greater than about 90%, or from about 85% to about 95%, by weight or volume of the jammed oil-in-water emulsion, of the hydrophobic phase.

The density of the hydrophobic phase used in the toothpaste composition, as described herein, may be in the range of from about 0.8 $g/cm^3$ to about 1.0 $g/cm^3$, from about 0.85 $g/cm^3$ to about 0.95 $g/cm^3$, or about 0.9 $g/cm^3$, or any other numerical range, which is narrower, and which falls within such broader numerical range, as if such narrower numerical ranges were all expressly written herein.

While not wishing to being bound by theory, it is believed when the hydrophobic phase is appropriately selected based on its refractive index, suitably sized droplets or regions of hydrophobic phase can reflect visible light and the composition becomes opaque in appearance—surprisingly even without solid particulate opacifiers, such as titanium dioxide. Accordingly, the refractive index of the hydrophobic phase or aqueous phase used in the toothpaste composition, as described herein, may be in the range of from about 1 to about 2, preferably from about 1.1 to about 1.6, more preferably from about 1.2 to about 1.5, and most preferably from about 1.3 to about 1.5.

The hydrophobic phase can comprise a hydrophobic liquid. The hydrophobic phase can comprise an oil, such as edible oil, natural oil, or synthetic oil. The hydrophobic phase can comprise non-toxic edible oils, aliphatic hydrocarbons, fatty esters, and combinations thereof.

The hydrophobic phase can comprise unsaturated or saturated fatty alcohols, unsaturated or preferably saturated triglycerides, unsaturated or saturated fatty acids, or combinations thereof. The hydrophobic phase can comprise saturated long chain (greater than 12 carbon atoms in aliphatic chain) triglycerides, saturated short chain (less than 6 carbon atoms in aliphatic chain) triglycerides, saturated medium chain (6 to 12 carbon atoms in aliphatic chain) triglycerides, or combinations thereof. The hydrophobic phase can comprise saturated long chain fatty acids or alcohols, saturated short chain fatty acids or alcohols, saturated medium chain fatty acids or alcohols, or combinations thereof. Saturated triglycerides, saturated fatty acids, and saturated fatty alcohols may be artificially hydrogenated or naturally saturated. Examples of naturally saturated medium chain triglycerides include fractionated coconut oil, fractionated palm oil, and/or triglycerides of saturated medium chain fatty acids. Examples of naturally saturated medium chain fatty acids include caproic acid (6 carbons in aliphatic chain), caprylic acid (8 carbons in aliphatic chain), capric acid (10 carbons in aliphatic chain), and/or lauric acid (12 carbons in aliphatic chain).

While not wishing to being bound by theory, it is believed that saturated compounds are preferred (vs. unsaturated compounds) as alkene functional groups may be more reactive to certain ingredients in toothpaste compositions, such as fluoride and/or peroxide.

Compound I shows an example of a medium-chain triglyceride, containing three medium chain fatty acids (two caprylic acids and one capric acid)

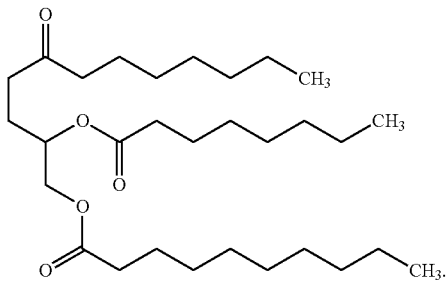

Compound I

The hydrophobic phase may comprise fractionated coconut oil, fractionated palm oil, and/or combinations thereof.

Coconut oil can comprise the following esters listed in TABLE A.

TABLE A

| Esters commonly found in Coconut Oil | | |
|---|---|---|
| Ester of: | | % |
| Caprylic acid (C8) | Saturated | 7 |
| Capric acid (C10) | Saturated | 8 |
| Lauric acid (C12) | Saturated | 48 |
| Myristic acid (C14) | Saturated | 16 |
| Palmitic acid (C16) | Saturated | 9.5 |
| Oleic acid (C18:1) | Monounsaturated | 6.5 |
| Other | Polyunsaturated | 5 |

Accordingly, coconut oil can comprise caprylic acid, capric acid, lauric acid, myristic acid, palmitic acid, oleic acid, and/or combinations.

Fractionated coconut oil can include coconut oil where certain long chain triglycerides have been removed through a variety of techniques well known to a person of ordinary skill in the art, such as lauric acid, myristic acid, palmitic acid, oleic acid, other monounsaturated esters, other polyunsaturated esters, and/or combinations thereof.

Certain suppliers of fractionated coconut oil, such as bulkapothecary.com exclude lauric acid (C12), stating " . . . fractionated coconut oil has the long chain triglycerides like lauric acid removed retaining the capric and caprylic acids.".

However, while certain suppliers of fractionated coconut oil, such as bulkapothecary.com, exclude lauric acid, it is believed that triglyceride esters of lauric acid are not always considered a long chain triglyceride.

Medium chain triglycerides found in coconut oil can include triglyceride esters of acid molecules including from about 6 carbon atoms to about 14 carbon atoms, from about 6 carbon atoms to about 12 carbon atoms, from about 8 carbon atoms to about 12 carbon atoms, and/or from about 8 carbon atoms to about 10 carbon atoms. Thus, medium chain triglycerides can include caprylic acid (8 carbon atoms), capric acid (10 carbon atoms), and/or lauric acid (12 carbon atoms).

Long chain triglycerides found in coconut oil can include triglyceride esters of acid molecules including greater than 10 carbon atoms, greater than 12 carbon atoms, and/or greater than 14 carbon atoms.

Accordingly, the hydrophobic phase can comprise triglycerides of caprylic acid, capric acid, lauric acid, and/or combinations thereof. While not wishing to being bound by theory, it is believed that fractionated oils are preferred (vs. non-fractionated oils) as longer chain triglycerides are typically removed through the fractionation process. Many of the longer chain triglycerides can include mono-, di, and/or polyunsaturated esters. Some suppliers may also remove certain medium length triglycerides, such as lauric acid. Thus, the hydrophobic phase can also comprise triglycerides of caprylic acid, capric acid, and/or combinations.

The hydrophobic phase can also comprise saturated long chain monoglycerides or diglycerides, saturated short chain monoglycerides or diglycerides, saturated medium chain monoglycerides or diglycerides, and/or combinations thereof.

The hydrophobic phase may also comprise silicones, polysiloxanes, and mixtures thereof.

The hydrophobic phase may comprise mineral oil, petrolatum, and/or combinations thereof.

A suitable petrolatum includes white petrolatum. Other examples of suitable petrolatum include Snow White Pet-C from Calumet Specialty Products (Indianapolis, IN), G-2191 from Sonneborn (Parsippany, NJ), G-2218 from Sonneborn, G-1958 from Sonneborn, G-2180 from Sonneborn, Snow White V28 EP from Sonneborn, and Snow White V30 from Sonneborn, G-2494 from Sonneborn, and mixtures thereof.

The hydrophobic phase may comprise plant-based ingredients, for example non-petrochemical alternatives to mineral oil or petrolatum such as plant-based oils, plant-based waxes, and mixtures thereof. Examples also include castor seed oil, hydrogenated castor oil, beeswax, and mixtures thereof.

The hydrophobic phase can comprise aliphatic hydrocarbon. The aliphatic hydrocarbons can comprise from about 4, 6, 8, 10, 12, 14, or 16 to about 16, 18, 20, 22, 24, 26, 28, 30, 36, 40 carbon atoms such as decane, 2 ethyldecane, tetradecane, isotetradecane, hexadecane, eicosane, and combinations thereof. Medium chain or long chain triglycerides can comprise vegetable oils, fish oils, animal fats, hydrogenated vegetable oils, partially hydrogenated vegetable oils, semi-synthetic triglycerides, synthetic triglycerides, and mixtures thereof. Fractionated, refined or purified oils of these types can also be used. Examples of long chain triglyceride-containing oils include almond oil; babassu oil; borage oil; black currant seed oil; canola oil; castor oil; coconut oil; fractionated coconut oil; liquid coconut oil; corn oil; cottonseed oil; emu oil; evening primrose oil; flax seed oil; grapeseed oil; groundnut oil; mustard seed oil; olive oil; palm oil; palm kernel oil; peanut oil; rapeseed oil; safflower oil; sesame oil; shark liver oil; soybean oil; sunflower oil; hydrogenated castor oil; hydrogenated coconut oil; hydrogenated palm oil; hydrogenated soybean oil; hydrogenated vegetable oil; a mixture of hydrogenated cottonseed oil and hydrogenated castor oil; partially hydrogenated soybean oil; a mixture of partially hydrogenated soybean oil and partially hydrogenated cottonseed oil; glyceryl trioleate; glyceryl trilinoleate; glyceryl trilinolenate; a $\Omega$3-polyunsaturated fatty acid triglyceride containing oil; and mixtures thereof. The long chain triglyceride containing oils may be selected from the group consisting of corn oil, olive oil, palm oil, peanut oil, safflower oil, sesame oil, soybean oil, castor oil, linseed oil, rape oil, rice bran oil, coconut oil, hydrogenated castor oil; partially hydrogenated soybean oil; glyceryl trioleate; glyceryl trilinoleate; a $\Omega$3-polyunsaturated fatty acid triglyceride containing oil; and combinations thereof. Examples of medium chain triglycerides include fractionated natural oils, such as fractionated coconut oil, as described further herein.

Saturated or unsaturated fatty alcohols may have from about 6 to about 20 carbon atoms, cetearyl alcohol, lauryl alcohol, and mixtures thereof. For example, Lipowax (Cetearyl Alcohol and Ceteareth-20) are supplied and manufactured by Lipo Chemical.

General information on silicones including silicone fluids, gums and resins, as well as the manufacture of silicones, can be found in Encyclopedia of Polymer Science and Engineering, Volume 15, Second Edition, pp 204-308, John Wiley & Sons Inc. 1989 and Chemistry and Technology of Silicones, Walter Noll, Academic Press Inc, (Harcourt Brue Javanovich, Publishers, New York), 1968, pp 282-287 and 409-426.

The toothpaste composition, aqueous phase, or hydrophobic phase may be substantially free of ingredients, for example acids and/or alcohols, combinations of mineral oil and ethylene/propylene/styrene copolymer and/or butylene/ethylene/styrene copolymer, certain bleaching agents, fumed silica, polyorganosiloxanes, copolymer condensation products of silicone resins and polydiorganosiloxanes, or combinations thereof, silicones, dimethicone, paraffinum liquidum, trimethylsiloxysilicate/dimethiconol crosspolymer, or combinations thereof, molecules with double or triple covalent bonds between adjacent carbon atoms, molecules with styrene groups, that at temperatures (e.g. $-7°$ C., $4°$ C., $23°$ C., $25°$ C., $30°$ C., $40°$ C., $50°$ C., or $60°$ C.) and conditions that the toothpaste composition may be exposed to during manufacture, filling, shipping, or storage (for example 1 day, 2 days, 1 week, 2 weeks, 1 month, 2 months, 3 months, 6 months, 12 months, 18 months, or 24 months) prior to use by the consumer that 1) may compromise the efficacy, comfort, usage experience, concentration of actives or bleaching agents at the tooth surface over time, active or bleaching efficiency, or compatibility between ingredients, or 2) may react with other ingredients or degrade other ingredients or may cause foam or pressure to build up in the package or container in which the toothpaste composition is stored. The toothpaste compositions may comprise less than 0.001% by weight of the composition, of any of the compounds recited in this paragraph. Without being bound by a theory it is believed that the decrease in surface tension produced by alcohol may decrease the retention time of the aqueous phase at the tooth surface, thereby decreasing the efficacy of the oral care actives. The presence of acids might contradict with the actives and/or may produce negative side effects. Thus, the toothpaste compositions can be free of acids, free of alcohols, or free of a mixture thereof.

The hydrophobic phase can be in a predominant or majority proportion relative to the aqueous phase present in the toothpaste composition. As used herein "majority proportion" means that the percent by weight or volume of the hydrophobic phase of the toothpaste composition is in excess relative to the percent by weight or volume of the aqueous phase of the toothpaste composition.

The size and number of regions of hydrophobic phase may affect the amount of oral/topical irritation and/or tooth sensitivity imparted by the toothpaste composition, opacity, translucency, transparency, brightness, whiteness, and/or stability of the toothpaste composition. The toothpaste composition can be described in terms of its Dv 50 equivalent-diameter, D[4,3] equivalent-diameter, or D[3,2] equivalent-diameter of regions of the hydrophobic phase. For example, the Dv 50 equivalent-diameter, D[4,3] equivalent-diameter, or D[3,2] equivalent-diameter of regions of the hydrophobic phase can be from about 0.001 to about 5000, preferably from about 0.001 to 1000, more preferably from about 0.01 to about 100, more preferably from about 0.1 to about 100 microns, or most preferably from about 0.4 to about 100 microns. The multi-phase oral compositions may be macro-emulsions or micro-emulsions.

Emulsifiers

The jammed oil-in-water can comprise emulsifier. Depending on the design of jammed oil-in-water emulsion, the hydrophobic phase can have emulsifying properties. Thus, the emulsifier and the hydrophobic phase can comprise the same compound.

The jammed oil-in-water emulsion, as described herein, can comprise from about 0.001% to about 20%, from about 0.01% to about 10%, up to about 10%, up to about 5%, or from about 0.1% to about 10%, by weight of the jammed oil-in-water emulsion, of the emulsifier.

Classes of surfactants useful as emulsifiers include nonionic surfactant, anionic surfactant, cationic surfactant, zwitterionic surfactant, amphoteric surfactant, polymeric surfactant, synthetic surfactant, and/or combinations thereof. Many suitable nonionic and amphoteric surfactants are disclosed by U.S. Pat. Nos. 3,988,433; 4,051,234, and many suitable nonionic surfactants are also disclosed by U.S. Pat. No. 3,959,458.

The emulsifier can comprise polysorbate, an alkyl sulfate, Lipowax® D, or combinations thereof. Suitable polysorbate compounds include, polysorbate 20, 40, 60, 80, or combinations thereof, such as Tween® 20, 40, 60, 80, or combinations thereof.

The emulsifier can comprise natural emulsifiers, such as acacia, gelatin, lecithin and cholesterol; finely dispersed solids, such as colloidal clays, bentonite, veegum (magnesium aluminum silicate; and synthetic emulsifiers, such as salts of fatty acids, sulfates such as sorbitan trioleate, sorbitan tristearate, sucrose distearate, propylene glycol monostearate, glycerol monostearate, propylene glycol monolaurate, sorbitan monostearate, sorbitan monolaurate, polyoxyethylene-4-lauryl ether, sodium lauryl sulfate, sulfonates such as dioctyl sosium sulfosuccinate, glyceryl esters, polyoxyethylene glycol esters and ethers, diethylene glycol monostearate, PEG 200 distearate, and sorbitan fatty acid esters, such as sorbitan monopalmitate, and their polyoxyethylene derivatives, polyoxyethylene glycol esters such as the monostearate, Polysorbate 80 (ethoxylated sorbitan monooleate) (supplied by Spectrum, etc.); and combinations thereof.

The emulsifier can be a surfactant that is non-reactive with oral care active agents. For example, surfactants that are non-reactive with a bleaching agent may be substantially free of hydroxy groups, nitrogen groups and linkages, double or triple covalent bonds between adjacent carbon atoms, metals such as Zn, etc., or combinations thereof.

The jammed oil-in-water toothpaste composition may be free of, essentially free of, and/or substantially free of sulfate, alkyl sulfate, and/or sodium lauryl sulfate, as some consumers have a perception that these surfactants may lead to harsh conditions in the oral cavity.

The jammed oil-in-water may be substantially free of ingredients, for example reactive emulsifiers, that at temperatures (e.g. −7° C., 4° C., 23° C., 25° C., 30° C., 40° C., 50° C., or 60° C.) and conditions that the jammed oil-in-water emulsion may be exposed to during manufacture, filling, shipping, or storage (for example 1 day, 2 days, 1 week, 2 weeks, 1 month, 2 months, 3 months, 6 months, 12 months, 18 months, or 24 months) prior to use by the consumer, 1) may compromise the efficacy, comfort, usage experience, concentration of actives or bleaching agents at the tooth surface over time, active or bleaching efficiency, or compatibility between ingredients, or 2) may react with other ingredients or degrade other ingredients or may cause foam or pressure to build up in the package or container in which the jammed oil-in-water emulsion is stored. "Substantially free of a reactive emulsifier" as used herein means that the composition comprises less than 0.001% by weight of a reactive emulsifier.

The emulsifier may be a non-ionic surfactant. Nonionic surfactants include polyoxyethylene sorbitan fatty acid esters, such as, materials sold under the trademark Tween. The number following the 'polyoxyethylene' part in the following section refers to the total number of oxyethylene —(CH$_2$CH$_2$O)— groups found in the molecule. The number following the 'polysorbate' part is related to the type of fatty acid associated with the polyoxyethylene sorbitan part of the molecule. Monolaurate is indicated by 20, monopalmitate is indicated by 40, monostearate by 60, and monooleate by 80. Examples of such materials are polyoxyethylene (20) sorbitan monolaurate (Tween 20), polyoxyethylene (20) sorbitan monopalmitate (Tween 40), polyoxyethylene (20) sorbitan monostearate (Tween 60), polyoxyethylene (4) sorbitan monostearate (Tween 61), polyoxyethylene (20) sorbitan tristearate (Tween 65), polyoxyethylene (20) sorbitan monooleate (Tween 80), polyoxyethylene (5) sorbitan monooleate (Tween 81), and polyoxyethylene (20) sorbitan trioleate (Tween 85), and mixtures thereof. Polyoxyethylene fatty acid esters are also suitable and examples include those materials sold under the trademark Myrj such as polyoxyethylene (8) stearate (Myrj 45) and polyoxyethylene (40) stearate (Myrj 52), and mixtures thereof. Further nonionics include, polyoxyethylene polyoxypropylene block polymers, such as poloxamers and Pluronics.

Other suitable surfactants include zwitterionic surfactants, such as cocamidopropyl betaine, which can be used to improve foaming properties of jammed oil-in-water emulsions, if desired.

Another suitable class of non-ionic surfactants that can be used in the emulsifier are polyoxyethylene fatty ethers, such as, the materials sold under the trademark Brij. Examples of such materials are polyoxyethylene (4) lauryl ether (Brij 30), polyoxyethylene (23) lauryl ether (Brij 35), polyoxyethylene (2) cetyl ether (Brij 52), polyoxyethylene (10) cetyl ether (Brij 56), polyoxyethylene (20) cetyl ether (Brij 58), polyoxyethylene (2) stearyl ether (Brij 72), polyoxyethylene (10) stearyl ether (Brij 76), polyoxyethylene (20) stearyl ether (Brij 78), polyoxyethylene (2) oleyl ether (Brij 93), polyoxyethylene (10) oleyl ether, and polyoxyethylene (20) oleyl ether (Brij 99), and mixtures thereof.

A portion of a non-ionic surfactant may be substituted with a lipophilic surfactant, such as, sorbitan fatty acid esters such as the materials sold under the trademark Arlacel. Suitable lipophilic surfactants include sorbitan monolaurate (Arlacel 20), sorbitan monopalmitate (Arlacel 40), sorbitan monostearate (Arlacel 60), sorbitan monooleate (Arlacel 80), sorbitan sesquioleate (Arlacel 83), and sorbitan trioleate (Arlacel 85), and mixtures thereof. Typically, from about 2% to about 90% of the level of the nonionic surfactant may be substituted by a lipophilic surfactant, or from about 25% to about 50%.

Other suitable emulsifiers include sodium lauryl sulfate, sodium lauryl isethionate, sodium lauroyl methyl isethionate, sodium cocoyl glutamate, lauryl glucoside carboxylate, sodium dodecyl benzene sulfonate, alkali metal or ammonium salts of lauroyl sarcosinate, myristoyl sarcosinate, palmitoyl sarcosinate, stearoyl sarcosinate and oleoyl sarcosinate, polyoxyethylene sorbitan monostearate, isostearate and laurate, sodium lauryl sulfoacetate, N-lauroyl sarcosine, the sodium, potassium, and ethanolamine salts of N-lauroyl, N-myristoyl, or N-palmitoyl sarcosine, polyethylene oxide condensates of alkyl phenols, cocamidopropyl betaine, lauramidopropyl betaine, palmityl betaine, sodium cocoyl glutamate, and/or combinations thereof.

Each emulsifier and/or blends of multiple emulsifiers can have a hydrophilic-lipophilic balance (HLB) value. An emulsifier that is lipophilic in character is assigned a low HLB number (below about 9), and one that is hydrophilic is assigned a high HLB number (above about 11). In certain embodiments, the skilled formulator will recognize the importance of selecting an emulsifier (or blend of multiple emulsifiers) with a suitable balance of hydrophilic and lipophilic properties to encourage the formation of a high internal phase emulsion or preferably a jammed emulsion. The HLB is calculated according to the procedure specified previously. Information on emulsifiers and HLB values can be found in 1) "Emulsion science and technology" edited by Tharwat F. Tadros, Wiley VCH, ISBN: 978-3-527-32525-2, 2) "Classification of surface-active agents by HLB" by W. C. Griffin of the Atlas Powder Company in the Journal of Cosmetic Chemists 1949, 3) "Calculation of HLB of non-ionic surfactants" by W. C. Griffin in the Journal of Cosmetic Chemists 1954, 4) "Interfacial phenomena", Chapter 8 "Disperse systems and adhesion" by J. T. Davies and E. K. Rideal Academic Press, New York, 1963, 5) "A quantitative kinetic theory of emulsion type I, physical chemistry of the emulsifying agent" by J. T. Davies J. H. Schulman (Ed.), Proceedings of the 2nd International Congress on Surface Activity, 1, Academic Press, New York (1957), 6) "Span and Tween" brochure 08/10 D1005/1 by Croda Europe Ltd. England, 7) "Food enrichment with Omega-3 fatty acids", Chapter 5 "Stabilization of omega-3 oils and enriched foods using emulsifiers" by C. Genot, T.-H. Kabri and A. Meynier, France, Woodhead Publishing, and 8) "Health Care Product Guide—North America", brochure "Pharmaceuticals, Dermatology, Delivering your solution, Animal Health, Nutraceuticals" by Croda. The emulsifiers and blends of multiple emulsifiers along with their HLB values specified in these documents are incorporated herein by reference.

An emulsifier that tends to form a water-in-oil emulsion and an emulsifier that forms an oil-in-water emulsion may be blended to achieve an HLB suitable for an oil-in-water emulsion. The average HLB number of the blend may be calculated from additivity:

HLB of blend=$(a)$*$HLB_1$+$(b)$*$HLB_2$

Wherein a and b are the weight fractions of the two emulsifiers with $HLB_1$ and $HLB_2$.

For example, to determine the HLB value of a blend comprising 70% of TWEEN 80 (HLB=15) and 30% Of SPAN 80 (HLB=4.3), the calculation would be:

The contribution from TWEEN 80 is 70%×15.0=10.5
The contribution from SPAN 80 is 30%×4.3=1.3
Thus, the HLB of blend is 11.8 (i.e. 10.5+1.3)

The HLB values of various emulsifiers and/or blends of multiple emulsifiers can be from about are from about 0 to about 60, above 11, from about 11 to about 60, from about 11 to about 40, preferably from about 11 to about 20, or more preferred from about 16 to about 18, or combinations thereof; or from about 20 to about 40, or from about 30 to about 40.

The emulsifier or blend of multiple emulsifiers can be hydrophilic, miscible with water, immiscible with mineral oil, or combinations thereof.

Each emulsifier can comprise at least one hydrophobic tail group and at least one hydrophilic head group. There can be from about 6 to about 20, from about 8 to about 16, or from about 10 to 14 carbon atoms in from about 1 to about 4, from about 1 to about 3, or from about 1 to about 2 hydrophobic tails, or in 1 hydrophobic tail. Each hydrophobic tail can have up to about 4, up to about 3, or up to about 1 branch, or 0 branches. Each hydrophobic tail can have up to about 3, up to about 2, up to about 1, or 0 alkene functional groups (or carbon-carbon double bonds). The hydrophilic head group of each emulsifier molecule can comprise from about PEG-4 to about PEG-40, from about PEG-8 to about PEG-30, or preferably from about PEG-16 to about PEG-24 attached to sorbitan. The emulsifier can comprise from about 4 to about 60, from about 8 to about 30, from about 16 to about 34 of moles of ethylene oxide in each emulsifier molecule.

The emulsifier or blend of multiple emulsifiers can comprise PEG-20 sorbitan monolaurate (Tween 20), PEG-20 sorbitan monooleate (Tween 80), and/or sodium lauryl sulfate. Preferably, the emulsifer can comprise PEG-20 sorbitan monolaurate.

The emulsifier (and HLB) may comprise one or more of the following list, and blends of multiple emulsifiers may comprise blends of these in any combination thereof: Span 20 (HLB of 8.6), Span 40 (6.7), Span 60 (4.7), Span 80 (4.3), Span 83 (3.7), Span 85 (1.8), Span 120 (4.7), Tween 20 (16.7), Tween 21 (13.3), Tween 40 (15.6), Tween 60 (14.9), Tween 61 (9.6), Tween 65 (10.5), and Tween 80 (15).

Yield Stress

Typically, toothpaste compositions are formulated as a single-phase aqueous chassis or a single-phase non-aqueous chassis further combined with abrasives and flavors. In many cases, thickening agents need to be added to these toothpaste compositions to increase the yield stress of the toothpaste so that the toothpaste can be dispensed from a tube and/or stand-up on the bristles of a toothbrush (i.e. not sink into the bristles or flow down the sides of the bristles of the toothbrush upon dispensing).

Surprisingly, a toothpaste composition including jammed oil-in-water emulsion has a yield stress that is greater than the aqueous phase and/or the hydrophobic phase that are used to make the jammed oil-in-water emulsion. In other words, two components are mixed with a low yield stress and the resulting jammed oil-in-water emulsion that is made upon mixing, as described herein, has an unexpectedly high yield stress. While not wishing to being bound by theory, it is believed that the jammed oil-in-water emulsion can have a higher-than-expected yield stress once the high internal phase undergoes the jamming transition.

Furthermore, it has also been surprisingly found that jammed oil-in-water emulsions can be made with a high yield stress by mixing the aqueous phase and hydrophobic phase at a high rate of mixing or shear. While not wishing to being bound by theory, it is believed that the high shear rate decreases the droplet size of hydrophobic phase which leads to a higher yield stress.

The jammed oil-in-water emulsion can be made through the portion-wise addition or gradual addition of the hydrophobic phase to the aqueous phase, as described herein. Upon the making of the jammed oil-in-water emulsion, the yield stress is greater than the yield stress of the hydrophobic phase and/or the aqueous phase. It has also been found that, surprisingly, the yield stress of the jammed oil-in-water emulsion can also be manipulated through physical manipulation, such as, for example, rate of mixing or shear, after the entirety of the hydrophobic phase has been added to the aqueous phase or while the hydrophobic phase is being added to the aqueous phase. The physical manipulation, such as through stirring, shaking, vibrating, high shear mixing, homogenization, etc., can lead to additional increases in yield stress of the toothpaste composition without the need to add subsequent processing or stabilizing aids, such as thickening agents.

The multi-phase oral care compositions can be described by its water-dispersibility according to the method disclosed herein. The water dispersibility of the multi-phase oral care composition can be greater than about 5%, greater than about 10%, greater than about 20%, greater than about 25%, or greater than about 50% of the total content of the multi-phase oral care composition, by weight or volume. Preferably, the water-dispersibility of the multi-phase oral care compositions can be from about 20% to 100%, from about 40% to 100%, from about 60% to 100%, or greater than about 70%, by weight or volume of the total multi-phase oral care composition.

As yield stress of the jammed oil-in-water emulsion can be manipulated through physical processing of the emulsion, an array of toothpaste compositions that differ on yield stress, but not requiring the addition or removal of any ingredients is also disclosed herein. The array can include a first toothpaste composition comprising a jammed oil-inwater emulsion and a second toothpaste composition comprising a jammed oil-in-water emulsion. The first toothpaste composition can have a lower yield stress than the second toothpaste composition, but still a higher yield stress than the aqueous phase and/or hydrophobic phase. The first toothpaste composition could be useful for consumers that desire the paste to sink into the bristles of a brush, such as in the case of users of power brushes, hands free mouthpiece brushes, and/or trays. The second toothpaste composition can be useful for consumers of power brushes and/or manual brushes. The yield stress of the first toothpaste composition may be up to about 20 Pa, preferably up to about 15 Pa, and most preferably up to about 10 Pa. The yield stress of the second toothpaste composition may be from about 25 to about 2000 Pas, from about 25 to about 1000 Pa, preferably from about 25 to about 500 Pa, and most preferably from about 25 to about 200 Pa.

The yield stress of the toothpaste composition can be from about 2 Pa to about 5000 Pa, from about 2 Pa to about 2000 Pa, from about 4 Pa to about 1000 Pa, from about 2 Pa to about 500 Pa, from about 2 Pa to about 100 Pa, from about 5 Pa to about 50 Pa, or from about 25 Pa to about 500 Pa, as measured according to the method specified herein at 23° C.

Opacifiers

Typically, toothpaste compositions are formulated as a single-phase aqueous chassis or a single-phase non-aqueous chassis further combined with abrasives and flavors. In many cases, ingredients are added to toothpaste compositions that can result in toothpaste with an unappealing cloudy appearance—neither completely translucent nor completely opaque.

In some cases, opacifiers, such as titanium dioxide are added to make the paste a) opaque in appearance, or b) bright or white in appearance. Unexpectedly, the toothpaste composition comprising jammed oil-in-water emulsion can provide a) an opaque appearance, or b) bright or white appearance without the addition of opacifiers, such as titanium dioxide, even when the aqueous phase and/or the hydrophobic phase are not opaque.

Opacifiers, such as titanium dioxide, can be added to the formulation to make the toothpaste opaque in appearance. Unexpectedly, the toothpaste composition comprising jammed oil-in-water emulsion can provide an opaque appearance without the addition of opacifiers even when the aqueous phase and/or the hydrophobic phase are not opaque.

While not wishing to being bound by theory, it is believed when droplets or regions of hydrophobic phase are appropriately sized to reflect wavelengths of visible light (from about 400 nm to about 700 nm), the composition can become opaque in appearance—surprisingly even without solid particulate opacifiers, such as titanium dioxide. Accordingly, the Dv 50 equivalent-diameter, D[4,3] equivalent-diameter, or D[3,2] equivalent-diameter of the droplets or regions of hydrophobic phase may be from about 0.4 to about 1000 microns, preferably from about 0.4 to about 500 microns, and most preferably from about 0.4 to about 100 microns. These compositions may be jammed macro-emulsions.

The opacity of a substance or composition can be correlated with its L*. Bright or white substances or compositions can have a L* of at least 25 units. Surprisingly the toothpaste composition comprising jammed oil-in-water emulsion can provide compositions that have a L* of at least about 25, preferably at least about 50, more preferably at least about 70, or most preferably at least about 80 units without the addition of opacifiers. Even more surprisingly, the toothpaste composition comprising jammed oil-in-water emulsion can provide compositions that have a L* of at least about 25, preferably at least about 50, more preferably at least about 70, or most preferably at least about 80 units without the addition of opacifiers and even when the aqueous phase and/or the hydrophobic phase have a L* less than about 5, less than about 10, or less than about 25 units.

In traditional toothpastes, solid particulates and solid abrasives can be carefully selected such that their refractive index matches that of the surrounding toothpaste matrix to make the composition more translucent and "gel-like" in appearance. Unexpectedly, the toothpaste composition comprising jammed oil-in-water emulsion can also provide a translucent appearance without the need for solid particulates at all. While not wishing to being bound by theory, it is believed when droplets or regions of hydrophobic phase of the present invention are small enough to allow wavelengths of visible light (less than about 0.4 microns, or less than about 0.7 microns) to pass through, the composition becomes translucent in appearance. Accordingly, the Dv 50 equivalent-diameter, D[4,3] equivalent-diameter, or D[3,2] equivalent-diameter of the droplets or regions of hydrophobic phase may be from about 0.001 to about 1 micron, preferably from about 0.001 to about 0.7 microns, and most preferably from about 0.001 to about 0.4 microns. These compositions may be jammed micro-emulsions.

Additionally, the jammed oil-in-water emulsion can have a white appearance that can be used without the need for dyes and/or opacifiers. Dyes can be added to the jammed oil-in-water emulsion to modify the color of the emulsion.

The toothpaste composition can be free of, essentially free of, and/or substantially free of opacifiers, such as titanium dioxide, zinc oxide, calcium salts, pyrophosphate, other metal oxides, and/or bismuth oxychloride. The toothpaste composition can comprise less than 0.01%, less than 0.001%, and or less than 0.0001%, by weight of the toothpaste composition, of opacifiers.

Minimum Number of Ingredients

As traditional toothpaste compositions are typically formulated as a single-phase aqueous chassis or a single-phase non-aqueous chassis further combined with abrasives and flavors, a variety of thickening agents, opacifiers, stabilizers, and/or surfactants can be added to keep the active ingredient, such as fluoride, stable until it reaches the oral cavity. By instead formulating the toothpaste as a jammed oil-in-water emulsion, the toothpaste composition can be free of, essentially free of, and/or substantially free of many ingredients that are normally included in toothpaste formulation, such as opacifiers, sodium lauryl sulfate, abrasive, thickening agents, dyes, etc., as further described herein.

Some consumers desire an elegantly designed toothpaste composition that includes fewer ingredients. The jammed oil-in-water emulsion may have a maximum of 9, maximum of 8, maximum of 7, maximum of 6, or maximum of 5 ingredients. Additionally, many of the ingredients can be naturally derived, natural, and/or sustainable ingredients, such as hydrophobic phase comprising natural oil.

Abrasive

The toothpaste composition of the present invention can comprise abrasive. Abrasives can be added to oral care formulations, such as toothpaste compositions, to help remove surface stains from teeth. The abrasive can comprise calcium abrasive, silica abrasive, and/or alumina abrasive.

The calcium abrasive can be any suitable abrasive compound that can provide calcium ions in a toothpaste composition and/or deliver calcium ions to the oral cavity when the toothpaste composition is applied to the oral cavity. The toothpaste composition can comprise from about 5% to about 70%, from about 10% to about 60%, from about 20% to about 50%, from about 25% to about 40%, or from about 1% to about 50% of a calcium abrasive. The calcium abrasive can comprise one or more calcium abrasive compounds, such as calcium carbonate, precipitated calcium carbonate (PCC), ground calcium carbonate (GCC), chalk, dicalcium phosphate, calcium pyrophosphate, and/or mixtures thereof.

The toothpaste composition can also comprise silica abrasive, such as silica gel (by itself, and of any structure), precipitated silica, amorphous precipitated silica (by itself, and of any structure as well), hydrated silica, and/or combinations thereof. The toothpaste composition can comprise from about 5% to about 70%, from about 10% to about 60%, from about 10% to about 50%, from about 20% to about 50%, from about 25% to about 40%, or from about 1% to about 50% of a silica abrasive.

The abrasive can also comprise other abrasives, such as bentonite, perlite, titanium dioxide, alumina, hydrated alumina, calcined alumina, aluminum silicate, insoluble sodium metaphosphate, insoluble potassium metaphosphate, insoluble magnesium carbonate, zirconium silicate, solid particulate thermosetting resins and/or other suitable abrasive materials. The toothpaste composition can comprise from about 5% to about 70%, from about 10% to about 60%, from about 10% to about 50%, from about 20% to about 50%, from about 25% to about 40%, or from about 1% to about 50% of other abrasives.

The toothpaste composition can be free of, essentially free of, and/or substantially free of abrasive. Unexpectedly, the jammed oil-in-water composition can provide abrasive-free cleaning. While not wishing to being bound by theory, it is believed that the jammed oil-in-water emulsion can provide abrasive-free cleaning because a) it can quickly release cleaning or bleaching agents that may be present in the aqueous phase, and b) it can have a majority hydrophobic phase that can remove or bleach stains, plaque, tartar, biofilm, and/or bacteria through an oil pulling or bleaching mechanism.

Oral Care Active Agent

The toothpaste composition can comprise oral care active agent. Suitable oral care active agents can include whitening agent, anticaries agent, antibacterial agent, antisensitivity agent, dicarboxylic acid, among other components described herein.

Anticaries Agent

The oral care active agent can comprise an anticaries agent. The anticaries agent can be active against caries through one of these four mechanisms: i) suppressing acid formation via antibacterial action; ii) reducing enamel solubility through a calcium co-ion effect; iii) reducing enamel solubility through a fluoride co-ion effect; and iv) reducing enamel solubility through surface adsorbed stabilizers. Thus, the anticaries agent can comprise antibacterial agent, calcium, and/or fluoride. However, a compound can fall within more than one of these categories, such as, for example, stannous chloride, which can be antibacterial agent and/or metal or stannous fluoride, which can be antibacterial agent, fluoride ion source, and/or metal.

Antibacterial Agent

The oral care active agent can comprise antibacterial agent. The antibacterial agent can be any agent that suppresses acid formation by the bacteria of dental caries. Suitable antibacterial agents include agents that those that can provide at least about an 80%, or about 30%, 60%, 65%, 75%, 85%, 90%, or 95%, reduction in ΔpH with respect to Crest® Cavity Protection that thereby reduce caries at least about 9%, or about 1%, 6%, 7%, 8%, 10%, 11%, or 12%, with respect to the placebo or water control in rat caries experiments.

Suitable antibacterial agents include hops acids, such as hops alpha acids, hops beta acids, hydrogenated hops acids, and/or combinations thereof. Other suitable antibacterial agents include metal ion sources, such as tin ion sources, zinc ion sources, copper ion sources, and/or combinations thereof. Other suitable antibacterial agents include triclosan, extracts from any species within the genus *Magnolia*, extracts from any species within the genus *Humulus*. Other suitable antibacterial agents include hops acids, tin ion sources, benzyl alcohol, sodium benzoate, methylglycyl acetate, menthyl lactate, L-menthol, o-neomenthol, chlorophyllin copper complex, phenol, oxyquinoline, and/or combinations thereof. Other suitable antibacterial agents include one or more amino acids, such as basic amino acids.

The oral care composition can comprise from about 0.01% to about 10%, from about 1% to about 5%, or from about 0.5% to about 15% of an antibacterial agent. Some, but not all, suitable antibacterial agents will be discussed separately.

Antisensitivity Agent

The oral care active agent can comprise antisensitivity agent. Suitable antisensitivity agents include potassium nitrate, dicarboxylic acid, such as oxalic acid, tin, and/or combinations thereof.

Whitening Agent

The toothpaste composition may comprise from about 0.1% to about 10%, from about 0.2% to about 5%, from about 1% to about 5%, or from about 1% to about 15%, by weight of the toothpaste composition, of whitening agent.

The whitening agent can be a compound suitable for whitening at least one tooth in the oral cavity. The whitening agent may include peroxides, metal chlorites, perborates, percarbonates, peroxyacids, persulfates, dicarboxylic acids, as described herein, and/or combinations thereof. Suitable peroxides include solid peroxides, hydrogen peroxide, urea peroxide, polyvinylpyrrolidone peroxide complex, cross-linked polyvinylpyrrolidone peroxide complex, calcium peroxide, benzoyl peroxide, sodium peroxide, barium peroxide, inorganic peroxides, hydroperoxides, organic peroxides, and mixtures thereof. Suitable metal chlorites include calcium chlorite, barium chlorite, magnesium chlorite, lithium chlorite, sodium chlorite, and potassium chlorite. Other suitable whitening agents include sodium persulfate, potassium persulfate, peroxydone, 6-phthalimido peroxy hexanoic acid, Pthalamidoperoxycaproic acid, dicarboxylic acids, such as oxalic acid, malonic acid, methylmalonic acid, or mixtures thereof.

Dicarboxylic Acid

The toothpaste composition can comprise dicarboxylic acid. The dicarboxylic acid comprises a compound with two carboxylic acid functional groups. The dicarboxylic acid can comprise a compound or salt thereof defined by Formula I.

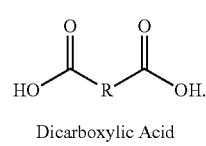

Formula I

Dicarboxylic Acid

R can be null, alkyl, alkenyl, allyl, phenyl, benzyl, aliphatic, aromatic, polyethylene glycol, polymer, O, N, P, and/or combinations thereof.

The dicarboxylic acid can comprise oxalic acid, malonic acid, succinic acid, glutaric acid, adipic acid, pimelic acid, suberic acid, azerlaic acid, sebacic acid, undecanedioic acid, dodecanedioic acid, brassylic acid, thapsic acid, japanic acid, phellogenic acid, equisetolic acid, malic acid, maleic acid, tartaric acid, phthalic acid, methylmalonic acid, dimethylmalonic acid, tartronic acid, mesoxalic acid, dihydroxymalonic acid, fumaric acid, terephthalic acid, glutaric acid, salts thereof, or combinations thereof. The dicarboxylic acid can comprise suitable salts of dicarboxylic acid, such as, for example, monoalkali metal oxalate, dialkali metal oxalate, monopotassium monohydrogen oxalate, dipotassium oxalate, monosodium monohydrogen oxalate, disodium oxalate, titanium oxalate, and/or other metal salts of oxalate. The dicarboxylic acid can also include hydrates of the dicarboxylic acid and/or a hydrate of a salt of the dicarboxylic acid.

The toothpaste composition can comprise from about 0.01% to about 10%, from about 0.1% to about 15%, from about 1% to about 5%, or from about 0.0001 to about 25%, by weight of the toothpaste composition, of dicarboxylic acid.

Polyphosphate

The toothpaste composition and/or polydentate ligand can comprise polyphosphate, which can be provided by a polyphosphate source. A polyphosphate source can comprise one or more polyphosphate molecules. Polyphosphates are a class of materials obtained by the dehydration and condensation of orthophosphate to yield linear and cyclic polyphosphates, such as phytic acid, of varying chain lengths. Thus, polyphosphate molecules are generally identified with an average number (n) of polyphosphate molecules, as described below. A polyphosphate is generally understood to consist of two or more phosphate molecules arranged primarily in a linear configuration, although some cyclic derivatives may be present.

Preferred polyphosphates are those having an average of two or more phosphate groups so that surface adsorption at effective concentrations produces sufficient non-bound phosphate functions, which enhance the anionic surface charge as well as hydrophilic character of the surfaces. Preferred in this invention are the linear polyphosphates having the formula: $XO(XPO_3)_nX$, wherein X is sodium, potassium, ammonium, or any other alkali metal cations and n averages from about 2 to about 21, from about 2 to about 14, or from about 2 to about 7. Alkali earth metal cations, such as calcium, are not preferred because they tend to form insoluble fluoride salts from aqueous solutions comprising a fluoride ions and alkali earth metal cations. Thus, the toothpaste compositions disclosed herein can be free of or substantially free of calcium pyrophosphate.

Some examples of suitable polyphosphate molecules include, for example, pyrophosphate (n=2), tripolyphosphate (n=3), tetrapolyphosphate (n=4), sodaphos polyphosphate (n=6), hexaphos polyphosphate (n=13), benephos polyphosphate (n=14), hexametaphosphate (n=21), which is also known as Glass H. Polyphosphates can include those polyphosphate compounds manufactured by FMC Corporation, ICL Performance Products, and/or Astaris.

The toothpaste composition can comprise from about 0.01% to about 15%, from about 0.1% to about 10%, from about 0.5% to about 5%, from about 1 to about 20%, or about 10% or less, by weight of the toothpaste composition, of the polyphosphate source. Alternatively, the toothpaste composition can be essentially free of, substantially free of, or free of polyphosphate. The toothpaste composition can be essentially free of, substantially free of, or free of cyclic polyphosphate. The toothpaste composition can be essentially free of, substantially free of, or free of phytic acid, which can lead to insoluble tin and/or zinc compounds.

Fluoride

The toothpaste composition can comprise fluoride, which can be provided by a fluoride ion source. The fluoride ion source can comprise one or more fluoride containing compounds, such as stannous fluoride, sodium fluoride, potassium fluoride, amine fluoride, sodium monofluorophosphate, zinc fluoride, and/or mixtures thereof.

The fluoride ion source and the tin ion source can be the same compound, such as for example, stannous fluoride, which can generate tin ions and fluoride ions. Additionally, the fluoride ion source and the tin ion source can be separate compounds, such as when the tin ion source is stannous chloride and the fluoride ion source is sodium monofluorophosphate or sodium fluoride.

The fluoride ion source and the zinc ion source can be the same compound, such as for example, zinc fluoride, which can generate zinc ions and fluoride ions. Additionally, the fluoride ion source and the zinc ion source can be separate compounds, such as when the zinc ion source is zinc phosphate and the fluoride ion source is stannous fluoride.

The fluoride ion source can be essentially free of or free of stannous fluoride. Thus, the toothpaste composition can comprise sodium fluoride, potassium fluoride, amine fluoride, sodium monofluorophosphate, zinc fluoride, and/or mixtures thereof.

The toothpaste composition can comprise a fluoride ion source capable of providing from about 50 ppm to about 5000 ppm, and preferably from about 500 ppm to about 3000 ppm of free fluoride ions. To deliver the desired amount of fluoride ions, the fluoride ion source may be present in the toothpaste composition at an amount of from about 0.0025% to about 5%, from about 0.01% to about 10%, from about 0.2% to about 1%, from about 0.5% to about 1.5%, or from about 0.3% to about 0.6%, by weight of the toothpaste composition. Alternatively, the toothpaste composition can comprise less than 0.1%, less than 0.01%, be essentially free of, be substantially free of, or free of a fluoride ion source.

Metal

The toothpaste composition, as described herein, can comprise metal, which can be provided by a metal ion source comprising one or more metal ions. The metal ion source can comprise or be in addition to the tin ion source and/or the zinc ion source, as described herein. Suitable metal ion sources include compounds with metal ions, such as, but not limited to Sn, Zn, Cu, Mn, Mg, Sr, Ti, Fe, Mo, B, Ba, Ce, Al, In and/or mixtures thereof. The metal ion source can be any compound with a suitable metal and any accompanying ligands and/or anions.

Suitable ligands and/or anions that can be paired with metal ion sources include, but are not limited to acetate, ammonium sulfate, benzoate, bromide, borate, carbonate, chloride, citrate, gluconate, glycerophosphate, hydroxide, iodide, oxalate, oxide, propionate, D-lactate, DL-lactate, orthophosphate, pyrophosphate, sulfate, nitrate, tartrate, and/or mixtures thereof.

The toothpaste composition can comprise from about 0.01% to about 10%, from about 1% to about 5%, or from about 0.5% to about 15% of metal and/or a metal ion source.

Tin

The toothpaste composition of the present invention can comprise tin, which can be provided by a tin ion source. The tin ion source can be any suitable compound that can provide tin ions in a toothpaste composition and/or deliver tin ions to the oral cavity when the toothpaste composition is applied to the oral cavity. The tin ion source can comprise one or more tin containing compounds, such as stannous fluoride, stannous chloride, stannous bromide, stannous iodide, stannous oxide, stannous oxalate, stannous sulfate, stannous sulfide, stannic fluoride, stannic chloride, stannic bromide, stannic iodide, stannic sulfide, and/or mixtures thereof. The tin ion source can comprise stannous fluoride, stannous chloride, and/or mixture thereof. The tin ion source can also be a fluoride-free tin ion source, such as stannous chloride.

The toothpaste composition can comprise from about 0.0025% to about 15%, from about 0.01% to about 10%, from about 0.2% to about 1%, from about 0.4% to about 1%, or from about 0.3% to about 0.6%, by weight of the toothpaste composition, of tin and/or a tin ion source.

Zinc

The toothpaste composition can comprise zinc, which can be provided by a zinc ion source. The zinc ion source can comprise one or more zinc containing compounds, such as zinc fluoride, zinc lactate, zinc oxide, zinc phosphate, zinc chloride, zinc acetate, zinc hexafluorozirconate, zinc sulfate, zinc tartrate, zinc gluconate, zinc citrate, zinc malate, zinc glycinate, zinc pyrophosphate, zinc metaphosphate, zinc oxalate, and/or zinc carbonate. The zinc ion source can be a fluoride-free zinc ion source, such as zinc phosphate, zinc oxide, and/or zinc citrate.

The zinc and/or zinc ion source may be present in the total toothpaste composition at an amount of from about 0.01% to about 10%, from about 0.2% to about 1%, from about 0.5% to about 1.5%, or from about 0.3% to about 0.6%, by weight of the composition. Alternatively, the composition can be essentially free of, substantially free of, or free of zinc.

pH

The pH of the toothpaste compositions as described herein can be from about 4 to about 7, from about 4.5 to about 6.5, or from about 4.5 to about 5.5. The pH of the toothpaste compositions, as described herein, can also be at least about 6, at least about 6.5, or at least about 7. The pH of a mouthrinse solution can be determined as the pH of the neat solution. The pH of a dentifrice composition can be determined as a slurry pH, which is the pH of a mixture of the dentifrice composition and water, such as a 1:4, 1:3, or 1:2 mixture of the dentifrice composition and water. The pH of the toothpaste compositions as described herein have a preferred pH of from about 4 to about 10, from about 5 to about 9, from about 6 to about 8, or about 7.

The toothpaste composition can comprise one or more buffering agents. Buffering agents, as used herein, refer to agents that can be used to adjust the slurry pH of the toothpaste compositions. The buffering agents include alkali metal hydroxides, carbonates, sesquicarbonates, borates, silicates, phosphates, imidazole, and mixtures thereof. Specific buffering agents include monosodium phosphate, trisodium phosphate, sodium hydroxide, potassium hydroxide, alkali metal carbonate salts, sodium carbonate, imidazole, pyrophosphate salts, citric acid, and sodium citrate. The toothpaste composition can comprise one or more buffering agents each at a level of from about 0.1% to about 30%, from about 1% to about 10%, or from about 1.5% to about 3%, by weight of the present composition.

Thickening Agent

The toothpaste composition can comprise one or more thickening agents. Thickening agents can be useful in the toothpaste compositions to provide a gelatinous structure that stabilizes the toothpaste against phase separation. Suitable thickening agents include polysaccharides, polymers, and/or silica thickeners. Some non-limiting examples of polysaccharides include starch; glycerite of starch; gums such as gum karaya (sterculia gum), gum tragacanth, gum arabic, gum ghatti, gum acacia, xanthan gum, guar gum and cellulose gum; magnesium aluminum silicate (Veegum); carrageenan; sodium alginate; agar-agar; pectin; gelatin; cellulose compounds such as cellulose, carboxymethyl cellulose, hydroxyethyl cellulose, hydroxypropyl cellulose, hydroxymethyl cellulose, hydroxymethyl carboxypropyl cellulose, methyl cellulose, ethyl cellulose, and sulfated cellulose; natural and synthetic clays such as hectorite clays; and mixtures thereof.

The thickening agent can comprise polysaccharides. Polysaccharides that are suitable for use herein include carageenans, gellan gum, locust bean gum, xanthan gum, carbomers, poloxamers, modified cellulose, and mixtures thereof. Carageenan is a polysaccharide derived from seaweed. There are several types of carageenan that may be distinguished by their seaweed source and/or by their degree of and position of sulfation. The thickening agent can comprise kappa carageenans, modified kappa carageenans, iota carageenans, modified iota carageenans, lambda carrageenan, and mixtures thereof. Carageenans suitable for use herein include those commercially available from the FMC Company under the series designation "Viscarin," including but not limited to Viscarin TP 329, Viscarin TP 388, and Viscarin TP 389.

The thickening agent can comprise one or more polymers. The polymer can be a polyethylene glycol (PEG), a polyvinylpyrrolidone (PVP), polyacrylic acid, a polymer derived from at least one acrylic acid monomer, a copolymer of maleic anhydride and methyl vinyl ether, a crosslinked polyacrylic acid polymer, of various weight percentages of the toothpaste composition as well as various ranges of average molecular ranges. The polymer can comprise polyacrylate crosspolymer, such as polyacrylate crosspolymer-6. Suitable sources of polyacrylate crosspolymer-6 can include Sepimax Zen™ commercially available from Seppic.

The thickening agent can comprise inorganic thickening agents. Some non-limiting examples of suitable inorganic thickening agents include colloidal magnesium aluminum silicate, silica thickeners. Useful silica thickeners include, for example, include, as a non-limiting example, an amorphous precipitated silica such as ZEODENT® 165 silica. Other non-limiting silica thickeners include ZEODENT® 153, 163, and 167, and ZEOFREE® 177 and 265 silica products, all available from Evonik Corporation, and AEROSIL® fumed silicas.

The toothpaste composition can comprise from 0.01% to about 15%, from 0.1% to about 10%, from about 0.2% to about 5%, or from about 0.5% to about 2% of one or more thickening agents.

Alternatively, the toothpaste composition can be free of, essentially free of, and/or substantially free of thickening agent as the jammed oil-in-water emulsion has an unexpectedly high yield stress relative to its constituent components.

Amino Acid

The toothpaste composition can comprise amino acid. The amino acid can comprise one or more amino acids, peptide, and/or polypeptide, as described herein.

Amino acids, as in Formula II, are organic compounds that contain an amine functional group, a carboxyl functional group, and a side chain (R in Formula III) specific to each amino acid. Suitable amino acids include, for example, amino acids with a positive or negative side chain, amino acids with an acidic or basic side chain, amino acids with polar uncharged side chains, amino acids with hydrophobic side chains, and/or combinations thereof. Suitable amino acids also include, for example, arginine, histidine, lysine, aspartic acid, glutamic acid, serine, threonine, asparagine, glutamine, cysteine, selenocysteine, glycine, proline, alanine, valine, isoleucine, leucine, methionine, phenylalanine, tyrosine, tryptophan, citrulline, ornithine, creatine, diaminobutanoic acid, diaminoproprionic acid, salts thereof, and/or combinations thereof.

Suitable amino acids include the compounds described by Formula III, either naturally occurring or synthetically derived. The amino acid can be zwitterionic, neutral, positively charged, or negatively charged based on the R group and the environment. The charge of the amino acid, and whether particular functional groups, can interact with tin at particular pH conditions, would be well known to one of ordinary skill in the art.

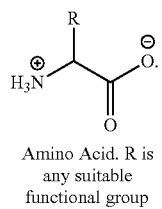

Formula III

Amino Acid. R is any suitable functional group

Suitable amino acids include one or more basic amino acids, one or more acidic amino acids, one or more neutral amino acids, or combinations thereof.

The toothpaste composition can comprise from about 0.01% to about 20%, from about 0.1% to about 10%, from about 0.5% to about 6%, or from about 1% to about 10% of amino acid, by weight of the toothpaste composition.

The term "neutral amino acid" as used herein includes not only naturally occurring neutral amino acids, such as alanine, asparagine, cysteine, glutamine, glycine, isoleucine, leucine, methionine, phenylalanine, proline, serine, threonine, tryptophan, tyrosine, valine, but also other amino acids having an isoelectric point in range of pH 5.0 to 7.0. The neutral amino acid can also be at least partially water soluble and provide a pH of about 7 or less in an aqueous solution of 1 g of neutral amino acid in 1000 mL of distilled water at 25° C.

Accordingly, suitable neutral amino acids can also include alanine, aminobutyrate, asparagine, cysteine, cystine, glutamine, glycine, hydroxyproline, isoleucine, leucine, methionine, phenylalanine, proline, serine, taurine, threonine, tryptophan, tyrosine, valine, salts thereof, or mixtures thereof. Preferably, neutral amino acids used in the composition of the present invention may include asparagine, glutamine, glycine, salts thereof, and/or mixtures thereof.

Vitamin

The toothpaste composition can comprise one or more vitamins. As used herein, "vitamin" includes all natural and/or synthetic analogs of vitamins, vitamers, compounds and/or derivatives that exhibit the biologically activity of vitamins, isomers of these compounds, stereoisomers of these compounds, salts of these compounds, or combinations thereof.

Suitable vitamins for gum health can include Vitamin A, such as retinoid compound, Vitamin B, including Vitamin B1 (thiamine), Vitamin B2 (riboflavin), Vitamin B3 (niacin), Vitamin B5 (pantothenic acid), Vitamin B6, Vitamin B7 (biotin), Vitamin B9 (folic acid and/or folate), Vitamin B12 (cyanocobalamin), Vitamin C, Vitamin D, Vitamin E, Vitamin K, and/or combinations thereof. Vitamins can also include other vitamin-like compounds, such as choline, carnitine, or combinations thereof.

The toothpaste composition can comprise from about 0.0001% to about 10%, from about 0.01% to about 5%, or from about 0.01% to about 2%, by weight of the composition, of vitamin.

Retinoid Compound

The compositions of the present invention can comprise one or more retinoid compounds. As used herein, "retinoid compound" includes all natural and/or synthetic analogs of Vitamin A or retinol-like compounds that possess the biological activity of Vitamin A in the skin as well as the geometric isomers and stereoisomers of these compounds. The retinoid compound can, for example, be retinol, retinyl esters (e.g., C—C alkyl esters of retinol, including retinyl palmitate, retinyl acetate, retinyl propionate), retinal, and/or retinoic acid (including all-trans retinoic acid and/or 13-cis-retinoic acid). In some embodiments, retinoids other than retinoic acid are used. These compounds are available in the art and are commercially available from several sources, e.g., Sigma Chemical Company (St. Louis, Mo.), and Boehringer Mannheim (Indianapolis, Ind.). Other suitable retinoids are tocopheryl-retinoate, tocopherol ester of cis- or trans-retinoic acid, adapalene (6-3-(1-adamantyl)-4-methoxyphenyl-2-naphthoic acid), and tazarotene (ethyl 6-2-(4,4-dimethylthiochroman-6-yl)-ethynylnicotinate).

Desirable retinoids include retinol, retinoic acid, retinyl palmitate, retinyl acetate, retinyl propionate, retinal, and combinations thereof.

The retinoid compound may be included as the substantially pure material, or as an extract obtained by suitable physical and/or chemical isolation from natural (e.g., plant) sources. The retinoid compound can be substantially pure, or essentially pure. The compositions of this invention may contain a safe and effective amount of the retinoid compound, such that the toothpaste composition is safe and effective for regulating or improving the condition of keratinous tissues and accidental ingestion since applied to the oral cavity.

The retinoid compound can comprise retinol, retinyl ester, retinal, retinoic acid, tocopheryl-retinoate, tocopherol ester of cis- or trans-retinoic acid, isotretinoin, alitretinoin, etretinate, acitretin, adapalene, bexarotene, tazarotene, or combinations thereof. The retinoid compound can be pharmaceutical grade, USP, or the like grade, due to use in the oral cavity. The retinoid compound and/or the retinol can have a purity of at least about 95%, at least about 97%, at least about 99%, at least about 99.5%, or at least about 99.9%. The toothpaste composition can comprise from about 0.0001% to about 10%, from about 0.01% to about 5%, or from about 0.01% to about 2%, by weight of the composition, of retinoid compound. The toothpaste composition can comprise from about 1 ppm to about 10,000 ppm, from about 500 ppm to about 5000 ppm, from about 750 ppm to about 5000 ppm, from about 1000 ppm to about 2500 ppm, about 1500 ppm, or about 2250 ppm of retinoid compound. Amounts of retinoid compound that are greater than about 5000 ppm are thought to lead to toxicity concerns for formulating with toothpaste compositions, which would not be present in skin care compositions.

The retinoid compound can comprise retinol comprising cis- and/or trans-alkene functional groups. The retinol can comprise at least about 80%, at least about 90%, at least about 95%, and/or at least about 99% of trans-alkene functional groups.

The retinoid compound can also comprise surfactant, such as anionic surfactant, cationic surfactant, and/or nonionic surfactant, which can improve gum barrier permeability. Suitable surfactants can include polysorbate.

Peptide

The toothpaste composition can comprise peptide. A peptide is a linear organic polymer consisting of a number of amino-acid residues bonded together in a chain, forming part of (or the whole of) a protein molecule. The peptide can comprise from two amino acids to ten amino acids, from two amino acids to five amino acids, or from four amino acids to six amino acids.

Peptides, including but not limited to, di-, tri-, tetra-, and pentapeptides and derivatives thereof, may be included in the compositions of the present invention in amounts that are safe and effective, including safe and effective for ingestion. As used herein, "peptides' refers to both the naturally occurring peptides and synthesized peptides. Also, useful herein are naturally occurring and commercially available compositions that contain peptides.

Suitable dipeptides for use herein include, for example, Carnosine (beta-ala-his). Suitable tripeptides for use herein include, for example, gly-his-lys, arg-lys-arg, and/or his-gly-gly. Suitable tripeptide derivatives include palmitoyl-gly-his-lys, which may be purchased as Biopeptide CL™ (100 ppm of palmitoyl-gly his-lys commercially available from Sederma, France); Peptide CK (arg-lys-arg); Peptide CK(ac-arg-lys-arg-NH₂); and a copper derivative of his-gly-gly sold commercially as Iamin, from Sigma (St. Louis, Mo.). Suitable tetrapeptides for use herein include, for example, Peptide E, arg-ser-arg-lys.

Suitable pentapeptides for use herein include lys-thr-thr-lys-ser. A preferred commercially available pentapeptide derivative composition is Matrixyl™, which contains 100 ppm palmitoyl-lys-thr-thr-lys-ser (commercially available from Sederma France).

The peptide can comprise palmitoyl-lys-thr-thr lys-ser, palmitoyl-gly-his-lys, beta-ala-his, their derivatives, and/or combinations thereof. In some embodiments, the peptide comprises palmitoyl-lys-thr-thr-lys-ser, palmitoyl-gly-his-lys, their derivatives, or combinations thereof. In other embodiments, the peptide comprises palmitoyl-lys-thr-thr-lys-ser (pal-KTTKS) and/or derivatives thereof. Other suitable peptides include gly-his-ly (GHK), gly-glu-lys-gly (GEKG), or combinations thereof.

The toothpaste composition can comprise from about 0.0001% to about 10%, from about 0.01% to about 5%, from about 0.001% to about 5%, from about 0.01% to about 2%, or from about 0.0001% to about 1%, by weight of the composition of peptide. The toothpaste composition can comprise from about 1 ppm to about 1000 ppm, from about 1 ppm to about 100 ppm, from about 3 ppm to about 50 ppm, or from about 1 ppm to about 10000 ppm, by weight of the toothpaste composition, of peptide. Amounts of peptide that are greater than about 10000 ppm are thought to lead to toxicity concerns for formulating with toothpaste compositions, which would not be present in skin care compositions.

Humectant

The toothpaste composition can comprise one or more humectants, have low levels of humectant, be free of humectant, be substantially free of humectant, and/or essentially free of humectant. Humectants serve to add body or "mouth texture" to an toothpaste composition or dentifrice as well as preventing the dentifrice from drying out. Suitable humectants include polyethylene glycol (at a variety of different molecular weights), propylene glycol, glycerin (glycerol), erythritol, xylitol, sorbitol, mannitol, butylene glycol, lactitol, hydrogenated starch hydrolysates, and/or mixtures thereof. The toothpaste composition can comprise one or more humectants each at a level of from 0 to about 70%, from about 5% to about 50%, from about 10% to about 60%, or from about 20% to about 80%, by weight of the toothpaste composition.

*Humulus lupulus*

The toothpaste compositions of the present invention can comprise hops. The hops can comprise at least one hops compound from Formula IV and/or Formula VII. The compound from Formula IV and/or Formula VII can be provided by any suitable source, such as an extract from *Humulus lupulus* or Hops, *Humulus lupulus* itself, a synthetically derived compound, and/or salts, prodrugs, or other analogs thereof. The hops extract can comprise one or more hops alpha acids, one or more hops iso-alpha acids, one or more hops beta acids, one or more hops oils, one or more flavonoids, one or more solvents, and/or water. Suitable hops alpha acids (generically shown in Formula IV) can include humulone (Formula V), adhumulone, cohumulone, posthumulone, prehumulone, and/or mixtures thereof. Suitable hops iso-alpha acids can include cis-isohumulone and/or trans-isohumulone. The isomerization of humulone into cis-isohumulone and trans-isohumulone can be represented by Formula VI.

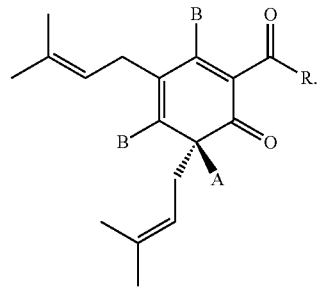

Formula IV

Hops Alpha Acids.

A is the hydroxyl functional group in the alpha position, B are the acidic hydroxyl groups in the beta position, and R is an alkyl functional group.

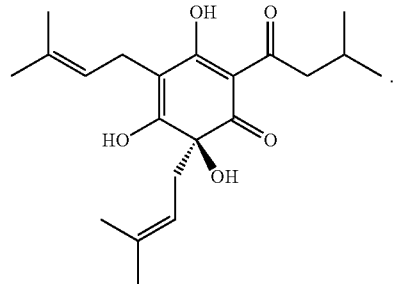

Formula V

Humulone

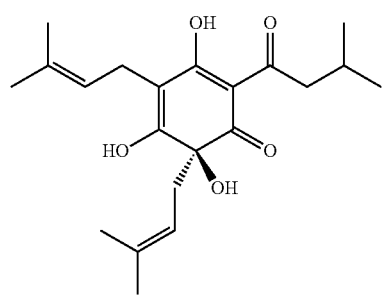

Isomerization of Humulone to isohumulone.

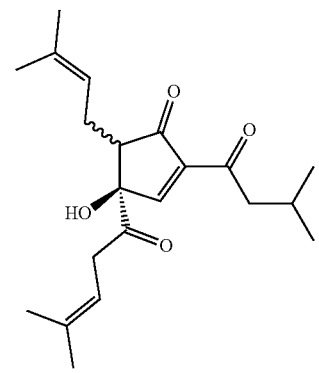

Suitable hops beta acids can include lupulone, adlupulone, colupulone, and/or mixtures thereof. A suitable hops beta acid can include a compound a described in Formula VII, VIII, IX, and/or X.

Formula VII

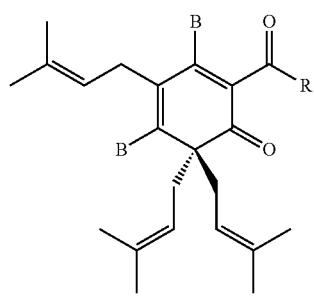

Hops Beta Acids.
B are the hydroxyl functional groups in the beta position
and R is an alkyl functional group.

Formula VIII

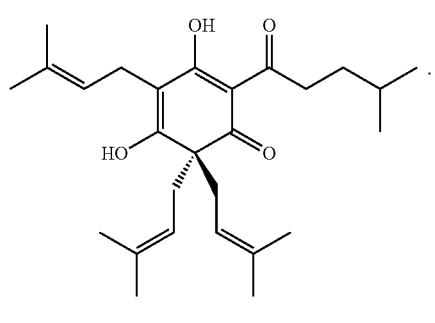

Lupulone

Formula IX

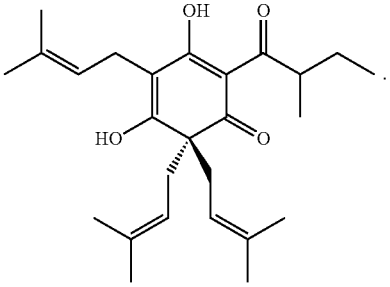

Adlupulone

Formula X

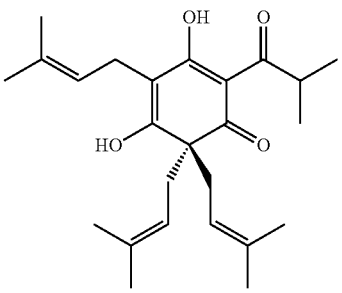

Colupulone

While hops alpha acids can demonstrate some antibacterial activity, hops alpha acids also have a bitter taste. The bitterness provided by hops alpha acids can be suitable for beer, but are not suitable for use in toothpaste compositions. In contrast, hops beta acids can be associated with a higher antibacterial and/or anticaries activity, but not as bitter a taste. Thus, a hops extract with a higher proportion of beta acids to alpha acids than normally found in nature, can be suitable for use in toothpaste compositions for use as an antibacterial and/or anticaries agent.

A natural hops source can comprise from about 2% to about 12%, by weight of the hops source, of hops beta acids depending on the variety of hops. Hops extracts used in other contexts, such as in the brewing of beer, can comprise from about 15% to about 35%, by weight of the extract, of hops beta acids. The hops extract desired herein can comprise at least about 35%, at least about 40%, at least about 45%, from about 35% to about 95%, from about 40% to about 90%, or from about 45% to about 99%, of hops beta acids. The hops beta acids can be in an acidic form (i.e. with attached hydrogen atom(s) to the hydroxyl functional group (s)) or as a salt form.

A suitable hops extract is described in detail in U.S. Pat. No. 7,910,140, which is herein incorporated by reference in its entirety. The hops beta acids desired can be non-hydrogenated, partially hydrogenated by a non-naturally occurring chemical reaction, or hydrogenated by a non-naturally occurring chemical reaction. The hops beta acid can be essentially free of or substantially free of hydrogenated hops beta acid and/or hops acid. A non-naturally occurring chemical reaction is a chemical reaction that was conducted with the aid of chemical compound not found within *Humulus lupulus*, such as a chemical hydrogenation reaction conducted with high heat not normally experienced by *Humulus lupulus* in the wild and/or a metal catalyst.

A natural hops source can comprise from about 2% to about 12%, by weight of the hops source, of hops alpha acids. Hops extracts used in other contexts, such as in the brewing of beer, can comprise from about 15% to about 35%, by weight of the extract, of hops alpha acids. The hops extract desired herein can comprise less than about 10%, less than about 5%, less than about 1%, or less than about 0.5%, by weight of the extract, of hops alpha acids.

Hops oils can include terpene hydrocarbons, such as myrcene, humulene, caryophyllene, and/or mixtures thereof. The hops extract desired herein can comprise less than 5%, less than 2.5%, or less than 2%, by weight of the extract, of one or more hops oils.

Flavonoids present in the hops extract can include xanthohumol, 8-prenylnaringenin, isoxanthohumol, and/or mixtures thereof. The hops extract can be substantially free of, essentially free of, free of, or have less than 250 ppm, less than 150 ppm, and/or less than 100 ppm of one or more flavonoids.

As described in U.S. Pat. No. 5,370,863, hops acids have been previously added to toothpaste compositions. However, the toothpaste compositions taught by U.S. Pat. No. 5,370,863 only included up to 0.01%, by weight of the toothpaste composition. While not wishing to be bound by theory, it is believed that U.S. Pat. No. 5,370,863 could only incorporate a low amount of hops acids because of the bitterness of hops alpha acids. A hops extract with a low level of hops alpha acids would not have this concern.

The hops compound can be combined with or free from an extract from another plant, such as a species from genus *Magnolia*. The hops compounds can be combined with or free from triclosan.

The toothpaste composition can comprise from about 0.01% to about 10%, greater than 0.01% to about 10%, from about 0.05%, to about 10%, from about 0.1% to about 10%, from about 0.2% to about 10%, from about 0.2% to about 10%, from about 0.2% to about 5%, from about 0.25% to about 2%, from about 0.05% to about 2%, or from greater than 0.25% to about 2%, of hops, such as hops beta acid, as described herein. The hops, such as the hops beta acid, can be provided by a suitable hops extract, the hops plant itself, or a synthetically derived compound. The hops, such as hops beta acid, can be provided as neutral, acidic compounds, and/or as salts with a suitable counter ion, such as sodium, potassium, ammonia, or any other suitable counter ion.

The hops can be provided by a hops extract, such as an extract from *Humulus lupulus* with at least 35%, by weight of the extract, of hops beta acid and less than 1%, by weight of the hops extract, of hops alpha acid. The toothpaste composition can comprise 0.01% to about 10%, greater than 0.01% to about 10%, from about 0.05%, to about 10%, from about 0.1% to about 10%, from about 0.2% to about 10%, from about 0.2% to about 10%, from about 0.2% to about 5%, from about 0.25% to about 2%, from about 0.05% to about 2%, or from greater than 0.25% to about 2%, of hops extract, as described herein.

Prenylated Flavonoids

The toothpaste composition can comprise prenylated flavonoid. Flavonoids are a group of natural substances found in a wide range of fruits, vegetables, grains, bark, roots, stems, flowers, tea, and wine. Flavonoids can have a variety of beneficial effects on health, such as antioxidative, antiinflammatory, antimutagenic, anticarcinogenic, and antibacterial benefits. Prenylated flavonoids are flavonoids that include at least one prenyl functional group (3-methylbut-2-en-1-yl, as shown in Formula XI), which has been previously identified to facilitate attachment to cell membranes. Thus, while not wishing to being bound by theory, it is believed that the addition of a prenyl group, i.e. prenylation, to a flavonoid can increase the activity of the original flavonoid by increasing the lipophilicity of the parent molecule and improving the penetration of the prenylated molecule into the bacterial cell membrane. Increasing the lipophilicity to increase penetration into the cell membrane can be a double-edged sword because the prenylated flavonoid will tend towards insolubility at high Log P values (high lipophilicity). Log P can be an important indicator of antibacterial efficacy.

As such, the term prenylated flavonoids can include flavonoids found naturally with one or more prenyl functional groups, flavonoids with a synthetically added prenyl functional group, and/or prenylated flavonoids with additional prenyl functional groups synthetically added.

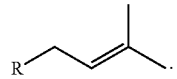

Formula XI

Prenyl Function Group with R representing the other portions of the molecule

Other suitable functionalities of the parent molecule that improve the structure-activity relationship (e.g., structure-MIC relationship) of the prenylated molecule include additional heterocycles containing nitrogen or oxygen, alkylamino chains, or alkyl chains substituted onto one or more of the aromatic rings of the parent flavonoid.

Flavonoids can have a 15-carbon skeleton with at least two phenyl rings and at least one heterocyclic ring. Some suitable flavonoid backbones can be shown in Formula XII (flavone backbone), Formula XIII (isoflavan backbone), and/or Formula XIV (neoflavonoid backbone).

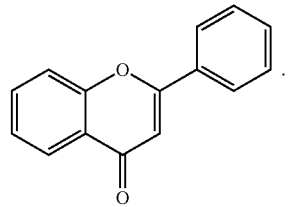

Formula XII

Flavone Backbone

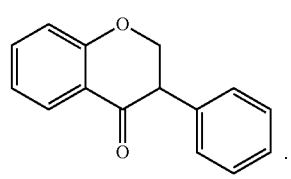

Formula XIII

Isoflavan backbone

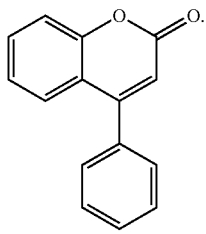

Neoflavanoid backbone

Formula XIV

Other suitable subgroups of flavonoids include anthocyanidins, anthoxanthins, flavanones, flavanonols, flavans, isoflavonoids, chalcones and/or combinations thereof.

Prenylated flavonoids can include naturally isolated prenylated flavonoids or naturally isolated flavonoids that are synthetically altered to add one or more prenyl functional groups through a variety of synthetic processes that would be known to a person of ordinary skill in the art of synthetic organic chemistry.

Other suitable prenylated flavonoids can include Bavachalcone, Bavachin, Bavachinin, Corylifol A, Epimedin A, Epimedin A1, Epimedin B, Epimedin C, Icariin, Icariside I, Icariside II, Icaritin, Isobavachalcone, Isoxanthohumol, Neobavaisoflavone, 6-Prenylnaringenin, 8-Prenylnaringenin, Sophoraflavanone G, (−)-Sophoranone, Xanthohumol, Quercetin, Macelignan, Kuraridin, Kurarinone, Kuwanon G, Kuwanon C, Panduratin A, 6-geranylnaringenin, Australone A, 6,8-Diprenylleriodictyol, dorsmanin C, dorsmanin F, 8-Prenylkaempferol, 7-O-Methylluteone, luteone, 6-prenylgenistein, isowighteone, lupiwighteone, and/or combinations thereof. Other suitable prenylated flavonoids include cannflavins, such as Cannflavin A, Cannflavin B, and/or Cannflavin C.

Preferably, the prenylated flavonoid has a high probability of having an MIC of less than about 25 ppm for *S. aureus*, a gram-positive bacterium. Suitable prenylated flavonoids include Bavachin, Bavachinin, Corylifol A, Icaritin, Isoxanthohumol, Neobavaisoflavone, 6-Prenylnaringenin, 8-Prenylnaringenin, Sophoraflavanone G, (−)-Sophoranone, Kurarinone, Kuwanon C, Panduratin A, and/or combinations thereof.

Preferably, the prenylated flavonoid has a high probability of having an MIC of less than about 25 ppm for *E. coli*, a gram-negative bacterium. Suitable prenylated flavonoids include Bavachinin, Isoxanthohumol, 8-Prenylnaringenin, Sophoraflavanone G, Kurarinone, Panduratin A, and/or combinations thereof.

Approximately 1000 prenylated flavonoids have been identified from plants. According to the number of prenylated flavonoids reported before, prenylated flavonones are the most common subclass and prenylated flavanols is the rarest sub-class. Even though natural prenylated flavonoids have been detected to have diversely structural characteristics, they have a narrow distribution in plants, which are different to the parent flavonoids as they are present almost in all plants. Most of prenylated flavonoids are found in the following families, including Cannabaceae, Guttiferae, Leguminosae, Moraceae, Rutaceae and Umbelliferae. Leguminosae and Moraceae, due to their consumption as fruits and vegetables, are the most frequently investigated families and many novel prenylated flavonoids have been explored. *Humulus lupulus* of the Cannabaceae include 8-prenylnaringenin and xanthohumol, which can play a role in the health benefits of beer.

The prenylated flavonoid can be incorporated through a hops extract, incorporated in a separately added extract, or added as a separate component of the toothpaste compositions disclosed herein.

Suitable prenylated flavonoids can have a particular octanol-water partitioning coefficient. The octanol-water partitioning coefficient can be used to predict the lipophilicity of a compound. Without wishing to being bound by theory, it is believed that compounds that fall within the ranges described herein will be able to enter and/or disrupt the primarily hydrophobic phospholipid bilayer that makes up the cell membrane of microorganisms. Thus, the octanol-water partitioning coefficient can be correlated to the antibacterial effect of prenylated flavonoids. Suitable prenylated flavonoids can have a log P of at least about 2, at least about 4, from about 2 to about 10, from about 4 to about 10, from about 4 to about 7, or from about 4 to about 6.

The toothpaste composition can comprise at least about 0.001%, from about 0.001% to about 5%, from about 0.01% to about 2%, from about 0.0001% to about 2%, or at least about 0.05% of prenylated flavonoid.

Other Ingredients

The toothpaste composition can comprise a variety of other ingredients, such as flavoring agents, sweeteners, colorants, preservatives, buffering agents, or other ingredients suitable for use in toothpaste compositions, as described below.

Flavoring agents also can be added to the toothpaste composition. Suitable flavoring agents include oil of wintergreen, oil of peppermint, oil of spearmint, clove bud oil, menthol, anethole, methyl salicylate, eucalyptol, *cassia*, 1-menthyl acetate, sage, eugenol, parsley oil, oxanone, alpha-irisone, marjoram, lemon, orange, propenyl guaethol, cinnamon, vanillin, ethyl vanillin, heliotropine, 4-cis-heptenal, diacetyl, methyl-para-tert-butyl phenyl acetate, and mixtures thereof. Coolants may also be part of the flavor system. Preferred coolants in the present compositions are the paramenthan carboxyamide agents such as N-ethyl-p-menthan-3-carboxamide (known commercially as "WS-3") or N-(Ethoxycarbonylmethyl)-3-p-menthanecarboxamide (known commercially as "WS-5"), and mixtures thereof. A flavor system is generally used in the compositions at levels of from about 0.001% to about 5%, by weight of the toothpaste composition. These flavoring agents generally comprise mixtures of aldehydes, ketones, esters, phenols, acids, and aliphatic, aromatic and other alcohols.

Sweeteners can be added to the toothpaste composition to impart a pleasing taste to the product. Suitable sweeteners include saccharin (as sodium, potassium or calcium saccharin), cyclamate (as a sodium, potassium or calcium salt), acesulfame-K, thaumatin, neohesperidin dihydrochalcone, ammoniated glycyrrhizin, dextrose, levulose, sucrose, mannose, sucralose, *stevia*, and glucose.

Colorants can be added to improve the aesthetic appearance of the product. Suitable colorants include without limitation those colorants approved by appropriate regulatory bodies such as the FDA and those listed in the European Food and Pharmaceutical Directives and include pigments, such as $TiO_2$, and colors such as FD&C and D&C dyes.

Preservatives also can be added to the toothpaste compositions to prevent bacterial growth. Suitable preservatives approved for use in oral compositions such as methylparaben, propylparaben, benzoic acid, and sodium benzoate can be added in safe and effective amounts.

Titanium dioxide may also be added to the present composition. Titanium dioxide is a white powder which adds opacity to the compositions. Titanium dioxide generally comprises from about 0.25% to about 5%, by weight of the toothpaste composition.

Other ingredients can be used in the toothpaste composition, such as desensitizing agents, healing agents, other caries preventative agents, chelating/sequestering agents, vitamins, proteins, other anti-plaque/anti-calculus agents, antibiotics, anti-enzymes, enzymes, pH control agents, oxidizing agents, antioxidants, and the like.

Methods of Using the Compositions and/or Delivery Systems

The jammed oil-in-water emulsion toothpaste composition can be used in the treatment, reduction, and/or prevention of caries, cavities, gingivitis, and/or combinations thereof.

The user can be instructed to apply a portion of the toothpaste onto a toothbrush. The portion of the toothpaste can be of any suitable shape, such as strip, a pea-sized amount, or various other shapes that would fit onto any mechanical and/or manual brush head. The user can be instructed to apply a strip of the toothpaste that is at least about 1 inch, at least about 0.5 inch, at least 1 inch, and/or at least 0.5 inch long to the bristles of a toothbrush, such as soft-bristled toothbrush.

The user can be instructed to apply pea-sized or grain of rice-sized portion of the toothpaste to the bristles of a toothbrush, such as in the case of use by children of less than 6 years old and/or less than 2 years old.

The user can be instructed to brush their teeth for at least about 30 seconds, at least about 1 minute, at least about 90 seconds, at least about 2 minutes, at least 30 seconds, at least 1 minute, at least 90 seconds, and/or at least 2 minutes.

The user can be instructed to brush their teeth thoroughly and/or as directed by a physician and/or dentist.

The user can be instructed to brush their teeth after each meal. The user can be instructed to brush their teeth at least once per day, at least twice per day, and/or at least three times per day. The user can be instructed to brush their teeth no more than three times a day, such as to prevent Sn staining. The user can be instructed to brush their teeth in the morning and/or in the evening prior to sleeping.

The user can be instructed to not swallow the toothpaste composition due to the inclusion of ingredients that are not suitable for ingestion, such as fluoride. The user may be instructed to expectorate (or spit out) the toothpaste composition after the cessation of the brushing cycle.

The usage instructions for the toothpaste, can vary based on age. For example, adults and children that are at least 6 or at least 2 can have one usage instruction while children under 6 or under 2 can have a second usage instruction.

The jammed oil-in-water emulsion toothpaste can be used in a multi-step oral health regimen. A first composition comprising jammed oil-in-water emulsion toothpaste comprising first oral care active, such as peroxide, fluoride, and/or tin, can be used as the first step in the oral health regimen. A second oral care composition comprising second oral care active, such as peroxide, fluoride, and/or tin, can be used as the second step in the oral health regimen.

The oral health regimen can comprise: (1) directing a user to apply a first composition to an oral cavity of the user, the first composition comprising a jammed oil-in-water toothpaste composition, the jammed oil-in-water toothpaste composition comprising fluoride and/or tin and (2) directing the user to apply a second composition to the oral cavity of the user, the second composition comprising peroxide. The second composition can be a jammed oil-in-water emulsion composition, a multi-phase oral care composition, or a single-phase oral care composition. Application of fluoride and/or tin followed by peroxide can be particularly advantageous to the user.

The oral health regimen can comprise: (1) directing a user to apply a first composition to an oral cavity of the user, the first composition comprising a jammed oil-in-water toothpaste composition, the jammed oil-in-water toothpaste composition comprising antisensitivity compound and (2) directing the user to apply a second composition to the oral cavity of the user, the second composition comprising peroxide. The second composition can be a jammed oil-in-water emulsion composition, a multi-phase oral care composition, or a single-phase oral care composition. Application of antisensitivity compound followed by peroxide can be particularly advantageous to the user to minimize sensitivity that can be experienced by some uses of peroxide.

The present invention can also be applied to the teeth of a consumer in the dental office by a dental professional, or the present invention can be applied at home by the consumer. Generally, the recommended treatment period is a sufficient period of time to achieve whitening.

The composition can also be applied with a paint-on device, a syringe or unit dose syringe, squeezable tube, a brush, a pen or brush tip applicator, a doe's foot applicator, swab, lip gloss applicator, strip that is removed after application, tray that is removed after application, or the like, or even with the fingers. The composition can also be combined with a delivery carrier, such as a strip of material, a dental tray, or a sponge material, and thereafter applied to the teeth. In certain aspects, the compositions or delivery systems herein are almost unnoticeable when applied to the teeth. After a desired period of time has elapsed, any residual composition may be easily removed by wiping, brushing or rinsing the oral surface.

The described compositions and delivery systems, described herein, may be combined in a kit which comprises: 1. present composition and 2. instructions for use; or which comprises: 1. present composition, 2. instructions for use, and 3. a delivery carrier. In addition, if the tooth shall be radiated by electromagnetic radiation, the kit may further comprise an electromagnetic radiation source of the appropriate wavelength and instruction for use, so that the kit can be used by consumers in a convenient manner.

Optional Electromagnetic Radiation Treatment

The multi-phase oral care composition as disclosed herein may be used to whiten teeth and/or removing stain from tooth surfaces. In addition, the bleaching efficacy may be further increased by directing electromagnetic radiation of a suitable wavelength toward at least one tooth. A suitable wavelength may be any wavelength, which corresponds to a maximum absorption band of the tooth and/or the tooth stain to be bleached. For example, the multi-phase oral care composition may be radiated with an electromagnetic radiation with one or more wavelengths in the range of from about 200 nm to about 1200 nm. The electromagnetic radiation may be directed toward at least one tooth. In addition, more than one tooth may be irradiated. For example, the electromagnetic radiation may have a peak intensity at one or more wavelengths in the range of from about 1 nm to about 750 nm, from about 200 nm to about 700 nm, from about 300 nm to about 700 nm, from about 400 nm to about 600 nm, from about 400 nm to about 500 nm, or up to about 750 nm. Additionally, the electromagnetic radiation may have a peak intensity at one or more wavelengths in the range of from about 400, 405, 410, 415, 420, 425, 430, 435, 440, or 445, 446 nm to about 450, 455, 460, 465, 470, 475, 480, 481, 485, 490, 495, or 500 nm or any other numerical range, which is narrower and which falls within such broader numerical range, as if such narrower numerical ranges were all expressly written herein. The electromagnetic radiation can have a peak intensity at a wavelength in the range of from about 425 nm to about 475 nm, from about 445 nm to about 465 nm, or wherein the peak intensity wavelength of the electromagnetic radiation is similar to the wavelength at which the stain absorbs the most electromagnetic radiation. Electromagnetic radiation may be directed toward at least one tooth for partial or whole wearing time of the composition; or after the composition has been removed from the tooth. Electromagnetic radiation may be applied at least for a sufficient period of time for whitening, e.g. for at least about 1 minute, for at least about 5 minutes, or for at least about 10 min. The electromagnetic radiation may be applied using the procedure disclosed in US 2013/0295525. Preferably the multi-phase oral care composition as disclosed herein is applied to at least one tooth and maintained on the at least one tooth for a first period of time; after the first period of time electromagnetic radiation is directed toward the at least one tooth for a second period of time, wherein the first period of time has a duration greater than 50%, preferably 80% of a total duration of the first and second periods of time; and finally, the multi-phase oral care composition is removed from the at least one tooth. Suitable sources of electromagnetic radiation include the sources described herein.

The multi-phase oral care compositions as disclosed herein may be transparent or translucent to electromagnetic radiation with wavelengths from about 400 nm to about 500 nm. In certain aspects, the multi-phase oral care compositions as disclosed herein when applied in a thickness of from about 0.0001, 0.001, or 0.01 cm to about 0.01, 0.1, or 0.5 cm thick allow from about 10%, 20%, or 30% to about 40%, 50%, 60%, 70%, 80%, 90%, or 100% of electromagnetic radiation at one or more wavelengths in the range of from about 1 nm to about 750 nm, from about 200 nm to about 700 nm, from about 300 nm to about 700 nm, from about 400 nm to about 600 nm, from about 400 nm to about 500 nm, or up to about 750 nm to pass through, as measured by a spectrophotometer. When a multi-phase oral care composition is applied in a thickness of about 0.1 cm, from about 80% to about 100% of electromagnetic radiation from about 400 nm to about 500 nm can pass through, as measured by a spectrophotometer. The multi-phase oral care compositions, as disclosed herein, may when applied in an amount from about 0.0001, 0.001, or 0.01 grams to about 0.01, 0.1, 1, or 5 grams, on a delivery carrier or tray with a surface area from about 5 $cm^2$ to about 20 $cm^2$, allow from about 10%, 20%, or 30% to about 40%, 50%, 60%, 70%, 80%, 90%, or 100% of electromagnetic radiation from about 400 nm to about 500 nm to pass through.

The electromagnetic radiation impinging on the surface of the tooth or outer surface of the carrier, which may be a strip or tray, at one or more wavelengths in the range of from about 1 nm to about 750 nm, from about 200 nm to about 700 nm, from about 300 nm to about 700 nm, from about 400 nm to about 600 nm, from about 400 nm to about 500 nm, or up to about 750 nm. may range in intensity from about 5, 10, 25, 50, 75, or 100 $mW/cm^2$ to about 10000, 5000, 2000, 1000, 500, 250, 225, 205, 200, 175, 150, 125, 100, 75, 50, 25, 10, or 5 $mW/cm^2$ or any other numerical range, which is narrower and which falls within such broader numerical range, as if such narrower numerical ranges were all expressly written herein.

The intensity of the electromagnetic radiation can be measured using a spectrometer (USB 2000+ from Ocean Optics) connected to a UV-VIS 200 micron fiber-optic cable with a cosine corrector at the tip (OP 200-2-UV-VIS from Ocean Optics). The spectrometer is connected to a computer running the spectrometer software (Oceanview 1.3.4 from Ocean Optics). The tip of the fiber-optic cable is held pointing toward the light source at the location where the light intensity is to be measured. The photons collected at the detector surface are guided via the fiber-optic cable to the charge-coupled device in the spectrometer (CCD). The CCD counts photons arriving to the CCD during a pre-determined time period at each wavelength from 200 nm to 1100 nm, and uses a software algorithm to convert these photon counts to spectral irradiance ($mW/cm^2/nm$). The spectral irradiance is integrated from 200 nm to 1100 nm by the software to yield the Absolute Irradiance ($mW/cm^2$), which is the intensity of electromagnetic radiation from 200 nm to 1100 nm. The spectral irradiance is integrated from 400 nm to 500 nm by the software to yield the Absolute Irradiance ($mW/cm^2$), which is the intensity of electromagnetic radiation from 400 nm to 500 nm.

For consumer convenience, the multi-phase oral care composition as disclosed herein may be provided as a Kit comprising the bleaching composition as disclosed herein, a delivery carrier for easier application, an electromagnetic radiation source emitting electromagnetic radiation in a suitable wavelength, and instructions for use.

The electromagnetic radiation source emitting electromagnetic radiation in a suitable wavelength can be a device capable of producing electromagnetic radiation, such as the devices described in U.S. Pat. No. 10,099,064, or curing lights used in dental offices, or devices similar to that described in the clinical protocol section specified herein.

The compositions of this invention are useful for both human and other animals (e.g. pets, zoo, or domestic animals) applications.

Packaging Materials for the Toothpaste Compositions

The jammed oil-in-water emulsion toothpaste composition can include primary packaging, such as a tube, bottle, and/or tub. The primary package can be placed within secondary package, such as a carton, shrink wrap, or the like. The oral care product can include a primary package, but be free of a secondary package to reduce materials used.

Instructions for use of the oral care composition can be printed on the primary package and/or the secondary package. The user can be instructed to dispense the toothpaste from the toothpaste tube.

The primary and/or secondary packaging can be made from material that are sustainable, recyclable, compostable, and/or disintegrable. The toothpaste tube can be made entirely from materials that can be recyclable in commercial and/or municipal recycling streams. The user can be instructed to place the primary packaging, such as a toothpaste tube, and/or the secondary packaging, such as a carton, directly into a home recycling container to be picked up by a recycling service, and/or into a store-hosted collected receptacle. Suitable materials that can be recyclable include paper, cardboard paper, corrugated cardboard, polyethene, such as low density polyethylene, medium density polyethylene, and/or high density polyethylene, polyethylene terephthalate, polyvinyl chloride, aluminum, glass, polypropylene, polystyrene, and/or combinations thereof. The primary and/or secondary packaging can be made from a single material, such as high density polyethylene, so that commercial and/or municipal recycling streams are not poisoned with another material that can be difficult to remove.

Clinical Protocol

The bleaching efficacies of compositions are measured according to the following clinical protocol. Per treatment group, 17 to 25 participants are recruited to complete the clinical study when testing compositions with less than about 1% bleaching agent, and 8 to 25 participants when testing compositions with at least about 1% bleaching agent. Recruited participants must have four natural maxillary incisors with all measurable facial sites. The mean baseline $L^*$ of the group of participants must be from 71 to 76, and the mean baseline $b^*$ of the group of participants must be from 13 to 18. In addition, participants with malocclusion on maxillary anterior teeth, severe or atypical intrinsic staining, such as that caused by tetracycline, fluorosis or hypocalcification, dental crowns or restorations on the facial surfaces of maxillary anterior teeth, self-reported medical history of melanoma, current smoking or tobacco use, light-sensitivity or a pigmentation skin disorder, self-reported tooth sensitivity, or previous tooth whitening using a professional treatment, over-the-counter kit, or investigational product, are excluded from the study. Participants are provided with take-home kits with Crest Cavity Protection toothpaste and Oral-B Indicator soft manual toothbrush (both from Procter & Gamble, Cincinnati, OH, USA) to be used twice a day in the customary manner.

The participants use a toothbrush to brush their teeth with the composition for a specified period of time for a specified number of times per day for a specified number of days.

The change in tooth color due to the treatment with the composition is measured using the procedure described below.

Tooth color is measured using a digital camera having a lens equipped with a polarizer filter (Camera model no. CANON EOS 70D from Canon Inc., Melville, NY with NIKON 55 mm micro-NIKKOR lens with adapter). The light system is provided by Dedo lights (model number DLH2) equipped with 150 watt, 24V bulbs model number (Xenophot model number HL X64640), positioned about 30 cm apart (measured from the center of the external circular surface of one of the glass lens through which the light exits to the other) and aimed at a 45 degree angle, such that the light paths intersect at the vertical plane of the chin rest about 36 cm in front of the focal plane of the camera. Each light has a polarizing filter (Lee 201 filter), and a cutoff filter (Rosco 7 mil Thermashield filter from Rosco, Stamford, CT, USA).

At the intersection of the light paths, a fixed chin rest is mounted for reproducible repositioning in the light field. The camera is placed between the two lights such that its focal plane is about 36 cm from the vertical plane of the chin rest. Prior to beginning the measurement of tooth color, color standards are imaged to establish calibration set-points. A Munsell N8 grey standard is imaged first. The white balance of the camera is adjusted, such that the RGB values of grey are 200. Color standards are imaged to get standard RGB values of the color chips. The color standards and grey standard are listed below (from Munsell Color, Division of X-rite, Grand Rapids, MI, USA). Each color standard is labeled with the Munsell nomenclature. To create a grid of color standards they can be arranged in the following manner. This enables multiple color standards to be contained in a single image captured of the grid of color standards.

Color Standard Grid 1

| 7.5R 6 8 | 2.5R 6 10 | 10YR 6.5 3 | POLARIZATION CHECK | 5R 7 8 | N 3.5 0 |
|---|---|---|---|---|---|
| 7.5RP 6 6 | 10R 5 8 | 5YR 7 3 | 2.5Y 8.5 2 | 2.2YR 6.47 4.1 | 7.5YR 7 4 |
| 5YR 8 2 | N 8 0 | 10R 7 4 | N 8 0 | 5YR 7.5 2.5 | 2.5Y 8 4 |
| 5YR 7 3.5 | 5YR 7 2.5 | 5YR 5 2 | 5YR 7.5 2 | N 6.5 0 | N 9.5 0 |

Color Standard Grid 2

| 5YR 7.5 3.5 | 2.5Y 6 4 | 10YR 7.5 3.5 | 2.5R 7 8 | 7.5R 7 8 | 10YR 7.5 2 |
|---|---|---|---|---|---|
| 10YR 7.5 2.5 | N 5 0 | 2.5R 6 8 | 10YR 7 2 | 5R 7 4 | 10YR 7 2.5 |
| N 6.5 0 | 7.5RP 6 8 | 7.5R 8 4 | 5Y 8 1 | 7.5YR 8 2 | 2.2YR 6.47 4.1 |
| N 5 0 | 2.5Y 8 4 | 10YR 7 3 | N 9.5 0 | 10RP 7 4 | 2.5Y 7 2 |

Color Standard Grid 3

| 5R 6 10 | N 8.5 0 | 10YR 6.5 3.5 | 10RP 6 10 | N 8 0 | 7.5YR 7 3 |
|---|---|---|---|---|---|
| 2.5Y 3.5 0 | 10YR 7 3.5 | 5Y 8.5 1 | 5YR 8 2.5 | 5YR 7.5 3 | 5R 5 6 |
| 10YR 7.5 3 | 5YR 6.5 3.5 | 2.5YR 5 4 | 2.5Y 8 2 | 10YR 8 2 | 2.5Y 7 2 |
| 2.5R 6 6 | 5R 7 6 | 10YR 8 2.5 | 10R 5 6 | N 6.5 0 | 7.5YR 8 3 |

For baseline tooth color, participants use a toothbrush ("Anchor 41 tuft white toothbrush" from Team Technologies, Inc. Morristown, TN, USA) to brush their teeth with water to remove debris from their teeth. Each participant then uses cheek retractors (from Washington Scientific Camera Company, Sumner, WA, USA; treated with at frosted matte finish at A&B Deburring Company, Cincinnati, OH, USA) to pull the cheeks back and allow the facial surfaces of their teeth to be illuminated. Each participant is instructed to bite their teeth together such that the incisal edges of the maxillary incisors contact the incisal edges of the mandibular incisors. The participants are then positioned on the chin rest at the intersection of the light paths in the center of the camera view and the tooth images are captured. After all participants are imaged, the images are processed using image analysis software (Optimas manufactured by Media Cybernetics, Inc. of Silver Spring, MD). The central four incisors are isolated and the average RGB values of the teeth are extracted.

After the participants have used a whitening product, but prior to capturing participant's tooth images, the system is set to the baseline configuration and calibrated as previously discussed. After calibration, each participant is imaged a second time using the same procedure as before making sure the participant is in the same physical position as the pre-treatment image including orientation of the teeth. The images are processed using the image analysis software to obtain the average RGB values of the central four maxillary incisors. The RGB values of all of the images are then mapped into CIE $L^{*'}a^*b^*$ color space using the RGB values and the $L^*a^*b^*$ values of the color chips on the color standard. The $L^*a^*b^*$ values of the color chips on the color standard are measured using a Photo Research SpectraScan PR650 from Photo Research Inc., LA using the same lighting conditions described for capturing digital images of the facial dentition. The PR650 is positioned the same distance from the color standards as the camera. Each chip is individually measured for $L^*a^*b^*$ after calibration according to the manufacturer's instructions. The RGB values are then transformed into $L^*a^*b^*$ values using regression equations such as:

$$L^* = 25.16 + 12.02^*(R/100) + 11.75^*(G/100) - 2.75^*(B/100) + 1.95^*(G/100)^3$$

$$a^* = -2.65 + 59.22^*(R/100) - 50.52^*(G/100) + 0.20^*(B/100) - 29.87^*(R/100)^2 + 20.73^*(G/100)^2 + 8.14^*(R/100)^3 - 9.17(G/100)^3 + 3.64^*[(B/100)^2]^*[R/100]$$

$$b^* = -0.70 + 37.04^*(R/100) + 12.65^*(G/100) - 53.81^*(B/100) - 18.14^*(R/100)^2 + 23.16^*(G/100)^*(B/100) + 4.70^*(R/100)^3 - 6.45^*(B/100)^3$$

The $R^2$ for $L^*$, $a^*$, and $b^*$ should be >0.95. Each study should have its own equations.

These equations are generally valid transformations in the area of tooth color ($60<L^*<95$, $0<a^*<14$, $6<b^*<25$). The data from each participant's set of images is then used to calculate product whitening performance in terms of changes in $L^*$, $a^*$ and $b^*$ – a standard method used for assessing whitening benefits. Changes in $L^*$ is defined as $\Delta L^* = L^*_{after\ treatments} - L^*_{baseline}$ where a positive change indicates improvement in brightness; Changes in $a^*$ (red-green balance) is defined as $\Delta a^* = a^*_{after\ treatments} - a^*_{baseline}$ where a negative change indicates teeth which are less red; Changes in $b^*$ (yellow-blue balance) is defined as $\Delta b^* = b^*_{after\ treatments} - b^*_{baseline}$ where a negative change indicates teeth are becoming less yellow. $-\Delta b^*$ is used as the primary measure of bleaching efficacy. The overall color change is calculated by the equation $\Delta E = (\Delta L^{*2} + \Delta a^{*2} + \Delta b^{*2})^{1/2}$.

After using the whitening products, color changes in CIE Lab color space can be calculated for each participant based on the equations given.

Preparation of the Present Multi-Phase Oral Care Compositions

Preparation of emulsions is well known in the art and any suitable manufacturing process can be used to make the multi-phase oral care compositions which may be in the form of an emulsion; see for example, *Remington: the Science and Practice of Pharmacy*, 19$^{th}$ ed., Vol. II, Chapters 20, 80, 86, etc. Generally, the components are separated into those that are oil-soluble and those that are water-soluble. These are dissolved in their respective solvents by heating if necessary. The two phases are then mixed and the product is stirred and cooled. After combining the phases, the present multi-phase oral care compositions, which may be in the form of emulsions may be agitated or sheared by various methods, including shaking, intermittent shaking, high shear mixing, or by using high speed mixers, blenders, colloid mills, homogenizers, or ultrasonic techniques. Depending on the specific ingredients, it may be recognized by one of skill in the art that certain modifications may need to be made to the manufacturing process to accommodate the specific properties of the ingredients. The type of multi-phase oral care composition prepared may be observed using a microscope. Further description of test methods are disclosed in *Remington: The Science and Practice of Pharmacy*, 19$^{th}$ ed., volume 1, 1995, pp. 282-283.

In certain aspects, multi-phase oral care compositions, which may be in the form of a jammed oil-in-water emulsion, as disclosed herein may be made as follows:

1) The water-soluble ingredients are dissolved in the aqueous phase, and the oil-soluble components in the hydrophobic phase.
2) The hydrophobic phase is added to the aqueous phase in portions in a SpeedMixer container with thorough mixing (2 minutes at 800 RPM in a Speedmixer for example) between portions. Ideally, 1) the size of the initial portion is less than 20% of the amount aqueous phase, 2) the size of subsequent portions may be increased gradually toward the amount of aqueous phase, and 3) the size of each portion is less than the amount of aqueous phase. As the jamming concentration is approached, an oil-in-water emulsion forms during this step, and the composition develops a lotion-like semisolid consistency—this is evidence that the droplets of the hydrophobic phase are jammed against each other and deform each other (note, they are still separated by a region of aqueous phase). This jamming is evidenced by the development of a lotion-like consistency of the composition.
3) Once all the hydrophobic phase has been incorporated, the contents of the Speedmixer container are mixed 3 times at 800 RPM for 2 minutes each time in a Speedmixer.

Note, in certain aspects, 1) it may be possible to add the hydrophobic phase to the aqueous phase at a suitably slow but continuous or pulsed rate with concurrent mixing in step-2 above, and 2) the mixing in step-3 above may be accomplished with other types of mixers over various lengths of time, such as a recirculation loop through static mixers, rotor-stator mixers, or other mixing devices, such as those described in the Handbook of Industrial Mixing.

The mixing procedure of the SpeedMixer™ series is based on the double rotation of the mixing cup using a dual asymmetric centrifugal mixing. This combination of centrifugal forces acting on different levels enables very rapid mixing of the entire cup. Optionally the composition may be heated, if necessary, to facilitate mixing. When the active is included in solid particulate form, the addition of an optional viscosity modifier, may be appropriate to keep the solid particulate dispersed and suspended within the composition. Flavorants or sweeteners may also be added to one of the phases of the composition, as desired. Thereafter the composition may be added to the delivery carrier, as desired.

Methods

Method to Measure the Dv 50, D[4,3], and D[3,2] of Droplets or Regions of Hydrophobic Phase of a Multi-Phase Oral Care Composition 1. Weigh 0.20 g (+/−0.02 g) of the sample to be tested into a 20 ml HDPE scintillation vial (VWR 66021-690).
2. Add water (for example WFI Quality OmniPur Sterile Filtered CAS #7732-18-5) 19.80 g (+/−0.02 g) to the vial and secure cap.
3. Roll the vial on a countertop gently until the sample to be tested is dispersed throughout the water. Avoid shaking or mixing vigorously. Agitation beyond that specified may alter the droplet size thereby leading to a result that is not representative of the starting sample.
4. Set up the Mastersizer 3000 (Malvern Panalytical Inc., Westborough, MA) and the Hydro unit (Model #MAZ3210), and ensure the hoses are securely attached.
5. Add water (for example MilliporeSigma Ultrapure Lab water system) to the lowest edge of silver rim and initialize the system (this measures the background).
6. When the system is ready, roll the vial gently about 4 or 5 times to mix the contents, and then slowly pipet contents of the vial (generally from about 0.1 gram to about 5 grams) using a 1.7 ml pipet (VWR #414004-031) into the Hydro unit until Obscuration is in range to be measured (1-10%). If the obscuration % is >10%, remove some of the sample solution from the vessel and add water (for example MilliporeSigma Ultrapure Lab water system) until Obscuration is less than 10%.
7. Start testing. Testing is done for 10 measurements and the sample is flushed upon completion. Stirrer speed is set at 500 rpm.
8. Add water when indicated for rinsing the system between samples (water is added generally about 5 to 6 times)
9. Repeat testing 2 more times with rinses in between.
10. Record the average Dv 50, D[4,3], and D[3,2] for each set of data (10 measurements×3 replications).

Additional information on the use of the Mastersizer 3000 can be found in the user manual (MAN0474 MRK1953-0 on the website malvernpanalytical.com).

Owing to the delicate nature of the emulsion and possibility of changing the droplet size during sample preparation, it is recommended to validate the method. To validate the above method, the D[4,3] of Validation Composition A made according to the procedure specified herein must be measured and demonstrated to be from 15 microns to 30 microns.

Validation Composition A

|  | Weight %* |
|---|---|
| 35% aqueous solution of $H_2O_2$[1] | 8.5714 |
| PEG-20 Sorbitan monolaurate (Tween 20)[2] | 1 |
| Mineral oil[3] | 90.4286 |
| % $H_2O_2$ | 3 |
| % Aqueous phase | 9.5714 |
| % Hydrophobic phase | 90.4286 |
| % Aqueous phase by volume | 7.57190 |
| % Hydrophobic phase by volume | 92.4290 |

[1]Ultra cosmetic grade 35% from Solvay, Houston, TX
[2]Tween20-LQ-(AP) from Croda Inc. Edison, NJ
[3]Kaydol grade from Sonneborn LLC., Parsippany, NJ
*% wt of total multi-phase composition unless otherwise indicated Batches of Validation Composition A are made according to the following procedure:

1. The Tween 20 and aqueous solution of H2O2 were weighed into a Speedmixer container (Max 300 Long Cup Translucent item number 501 218t or Max 300× Long Cup Translucent item number 501 217t, for the 150-gram and 250-gram batches, all containers from Flacktek Inc., Landrum, SC) and mixed by manually swirling the container until dissolved.
2. The mineral oil was added in portions (see table below, generally starting with small portions and increasing to larger portions) and mixed for about 1 to 2 minutes between portions with a rubber spatula. An oil-in-water emulsion formed during this step, and the composition developed a lotion-like semisolid consistency.
3. Once all the mineral oil was added, the contents of the Speedmixer container were mixed 3 times at 800 RPM for 2 minutes each time in a Speedmixer.

| VALIDATION COMPOSITION A | Batch size (g) | Approximate portion size (g) |
|---|---|---|
| Batch-1 | 150 | 25 |
| Batch-2 | 150 | 15 to 25 |
| Batch-3 | 250 | 23 to 51 |
| Batch-4 | 150 | 20 to 25 |
| Batch-5 | 150 | 20 to 25 |
| Batch-6 | 150 | 20 to 25 |
| Batch-7 | 250 | 5 to 20 |
| Batch-8 | 250 | 5 to 20 |

Method to Measure the Water-Dispersibility of a Multi-Phase Oral Care Composition 1. Allow the multi-phase oral care composition and sterile filtered water (Calbiochem catalog number 4.86505.1000 from EMD Millipore Corporation, Billerica, Massachusetts) to equilibrate at 23 C+/−2 C for at least 12 hours.
2. Record the tare weight of the bottom portion of a petri dish (VWR, Polystyrene, 100 mm×15 mm, catalog number 25384-342, purchased from VWR, Batavia, IL).
3. Weigh 0.30 to 0.35 gram of the multi-phase oral care composition into the center of the petri dish in one single blob. Record the initial weight of the sample.
4. Add 30 ml of sterile filtered water to the petri dish without disturbing the sample—with a syringe (30 ml BD Syringe with Luer Lok tip, item number 302832), taking care to go around the edges of the petri dish and directing the stream away from the sample.

5. After 10 minutes, decant the contents of the petri dish, dry it in an oven set at 60 C for at least 60 minutes, allow it to cool, and record the weight of petri dish+residual sample.
6. Calculate:

Weight of residual sample=(Weight of petri dish+residual sample from step-5)MINUS (Tare weight of petri dish from step-2)

7. Calculate:

% Water-dispersibility=100 MINUS[100×(Weight of residual sample from step-6)/(Initial weight of sample from step-3)]

8. Repeat steps-1-7 for a total of at least 3 measurements. Calculate the average. This is the water-dispersibility of the multi-phase oral care composition.

To validate the above method, the water-dispersibility of Validation Composition A made according to the procedure specified herein must be measured and demonstrated to be from 60 to 100%.

Method to Measure the Brookfield Viscosity of a Multi-Phase Oral Care Composition or Hydrophobic Phase 1. Transfer 40 to 50 ml of the multi-phase oral care composition or hydrophobic phase into a 50 ml polypropylene conical tube (Falcon brand catalog number REF 352098, Corning Science, Tamaulipas, Mexico). If the multi-phase oral care composition or hydrophobic phase exhibits macroscopic separation of one or more components prior to transferring into the conical tube, mix the multi-phase oral care composition or hydrophobic phase in a Speedmixer (for example at 800 RPM for 2 minutes) and transfer into the conical tube before it exhibits macroscopic separation of one or more components. If the multi-phase oral care composition or hydrophobic phase has macroscopic air-bubbles or voids: 1) Tap the conical tube on a hard surface or mix the conical tube on a vortex mixer (for example Vortex Genie 2 from Scientific Industries Inc. Bohemia, NY, or Mini Vortexer from VWR Scientific Products) until it is substantially free of macroscopic air-bubbles or voids or 2) Use a different method to transfer the multi-phase oral care composition into the conical tube such that it is substantially free of macroscopic air-bubbles or voids.
2. Allow the multi-phase oral care composition or hydrophobic phase to equilibrate in the conical tube for at least 12 hours at the desired temperature (e.g. −7° C., 4° C., 23° C., 25° C., 30° C., 40° C., 50° C., or 60° C.).
3. Confirm the viscometer (Brookfield 1/2RV DVII+Pro Viscometer) is level, turn it on, and autozero it according to the instruction manual.
4. Attach the appropriate spindle (for example Spindle D, E, or F, depending on the viscosity range of interest) and set the appropriate speed (for example 0.5, 1.0, 2.0, 2.5, 4.0, 5.0, 10, 20, 50 and 100 RPM) for the Brookfield Viscosity anticipated to be measured.
5. Place the conical tube under the spindle, lower the spindle until the t-bar is a few mm above the surface of the multi-phase oral care composition, and center the conical tube under the spindle.
6. Turn on the viscometer allow it to spin 3 to 5 rotations to confirm the spindle spins freely without grazing the walls of the conical tube. Turn on the helipath stand. When helipath lowers the t-bar completely under the multi-phase oral care composition or hydrophobic phase, turn on a timer set to 60 seconds. At 60 seconds record the Brookfield Viscosity in cPs.
7. Tap the conical tube on a hard surface or mix the conical tube on a vortex mixer (for example Vortex Genie 2 from Scientific Industries Inc. Bohemia, NY, or Mini Vortexer from VWR Scientific Products) until it is substantially free of macroscopic air-bubbles or voids, repeat steps-5-6 for a minimum of 3 measurements, with about 10 minutes between measurements.
8. Tap the conical tube on a hard surface or mix the conical tube on a vortex mixer (for example Vortex Genie 2 from Scientific Industries Inc. Bohemia, NY, or Mini Vortexer from VWR Scientific Products) until it is substantially free of macroscopic air-bubbles or voids, and repeat steps 2-7 for a second set of 3 measurements. Calculate the average of all 6 measurements. This is the Brookfield Viscosity of the multi-phase oral composition or hydrophobic phase.

To validate the above method, the Brookfield Viscosity of Validation Composition A made according to the procedure specified herein must be measured at 2.5 RPM with Spindle D at 23° C. and demonstrated to be from 15,000 to 45,000 cPs.

Method to Measure the Yield Stress of a Multi-Phase Oral Care Composition or Hydrophobic Phase 1. Transfer 40 to 50 ml of the multi-phase oral care composition or hydrophobic phase into a 50 ml polypropylene conical tube (Falcon brand catalog number REF 352098, Corning Science, Tamaulipas, Mexico). If the multi-phase oral care composition or hydrophobic phase exhibits macroscopic separation of one or more components prior to transferring into the conical tube, mix the multi-phase oral care composition or hydrophobic phase in a Speedmixer (for example at 800 RPM for 2 minutes) and transfer into the conical tube before it exhibits macroscopic separation of one or more components. If the multi-phase oral care composition or hydrophobic phase has macroscopic air-bubbles or voids: 1) Tap the conical tube on a hard surface or mix the conical tube on a vortex mixer (for example Vortex Genie 2 from Scientific Industries Inc. Bohemia, NY, or Mini Vortexer from VWR Scientific Products) until it is substantially free of macroscopic air-bubbles or voids or 2) Use a different method to transfer the multi-phase oral care composition into the conical tube such that it is substantially free of macroscopic air-bubbles or voids.
2. Allow the multi-phase oral care composition or hydrophobic phase to equilibrate in the conical tube for at least 12 hours at the desired temperature (e.g. −7° C., 4° C., 23° C., 25° C., 30° C., 40° C., 50° C., or 60° C.).
3. Confirm the rheometer (Brookfield HAYR-1 Rheometer) is level, turn it on, and autozero it according to the instruction manual.
4. Attach the appropriate spindle-vane (for example V72, V73, or V75, depending on the viscosity range of interest) and set to program for the specific spindle-vane being used. The program parameters are specified below:

| Spindle>> | V-72 | V-73 | V-75 |
|---|---|---|---|
| Yield Stress Range(Pa) | 4-40 | 20-200 | 80-800 |
| Immersion | Primary | Primary | Primary |
| Pre-Sheer rpm | 0 | 0 | 0 |
| Pre-Sheer time | 0 | 0 | 0 |

| Spindle>> | V-72 | V-73 | V-75 |
|---|---|---|---|
| Zero Speed (rpm) | 0.1 | 0.1 | 0.1 |
| Wait Time (sec) | 30 | 30 | 30 |
| Run Speed (rpm) | 0.1 | 0.1 | 0.3 |

5. Place the conical tube under the spindle-vane, and lower the spindle-vane slowly into the sample, taking care to minimize any disturbance to the sample this may cause. Continue lowering the spindle-vane until the top surface of the sample is at the primary immersion mark (bulge on the shaft) or secondary immersion mark (notch on the spindle-vane). If the spindle-vane is immersed to the secondary immersion mark, the value generated by this method will need to be multiplied by two.
6. Run the program selected in step-4. Without removing the spindle-vane run the program a total of 3 times. Record the 3 measurements. If the spindle-vane was immersed to the secondary immersion mark, multiply each measurement by 2; and if the spindle-vane was immersed to the primary immersion mark, multiply each measurement by 1. Record the 3 calculated values.
7. Tap the conical tube on a hard surface or mix the conical tube on a vortex mixer (for example Vortex Genie 2 from Scientific Industries Inc. Bohemia, NY, or Mini Vortexer from VWR Scientific Products) until it is substantially free of macroscopic air-bubbles or voids, and repeat steps 2-6 for a second set of 3 values. Calculate the average of all 6 values. This is the Yield Stress of the multi-phase oral composition or hydrophobic phase.

To validate the above method, the Yield Stress of Validation Composition A made according to the procedure specified herein must be measured with spindle-vane V72 immersed to the secondary immersion mark at 23° C. and demonstrated to be from 5 to 20 Pa.

Method to Measure the Percent Macroscopic Separation of One or More Components of a Multi-Phase Oral Care Composition 1. Transfer 50 mL of the multi-phase oral composition into a 50 ml polypropylene conical tube (Falcon brand catalog number REF 352098, Corning Science, Tamaulipas, Mexico). If the multi-phase oral composition exhibits macroscopic separation of one or more components prior to transferring into the conical tube, mix the multi-phase oral composition in a Speedmixer (in a "Max 300 Long Cup Translucent", item number 501 218t from Flacktek Inc., Landrum, SC) (for example at 800 RPM for 2 minutes) and transfer into the conical tube before it exhibits macroscopic separation of one or more components. If the multi-phase oral composition has macroscopic air-bubbles or voids: 1) Tap the conical tube on a hard surface until it is free of macroscopic air-bubbles or voids, or 2) Use a different method to transfer the multi-phase oral composition into the conical tube such that it is substantially free of macroscopic air-bubbles or voids. Screw the cap onto the conical tube. Repeat for a total of three conical tubes.
2. Position all three conical tubes in a vertical orientation (for example in a test tube rack) with the conical end on the bottom and the cap on top.
3. Allow all three conical tubes to stay undisturbed in the vertical position in a room or chamber in which the air is maintained at the temperature (e.g. −7° C., 4° C., 23° C., 25° C., 30° C., 40° C., 50° C., or 60° C.) for the period of time after which the macroscopic separation is to be measured.
4. At the end of period of time after which the macroscopic separation is to be measured (for example 1 day, 2 days, 1 week, 2 weeks, 1 month, 2 months, 3 months, 6 months, 12 months, 18 months, or 24 months) in the vertical position, measure the volume of material that has macroscopically separated on the bottom of the conical tube (aided by the graduations on the conical tube). If the volume of material that has macroscopically separated on the bottom of the conical tube is greater than 25 ml, measure the volume of material that has macroscopically separated to the top of the conical tube.
   Calculate the average volume of material that has macroscopically separated in all three tubes.
   Assess the tube to tube variability of the volume of material that has macroscopically separated as follows: The volume of material that has separated in each and every tube must be within the range of +/−2.5 ml of the average. If the volume of material that has separated in any one or more of the tubes is outside the range of +/−2.5 ml of the average: This is an indication of sample to sample variability potentially due to macroscopic separation of one or more components prior to transferring into the conical tubes, and the method needs to be repeated starting at step-1 to minimize sample to sample variability.
5. Calculate the percent macroscopic separation as: 100× (average volume of material that has macroscopically separated measured and calculated in step-4 DIVIDED by 50 ml).

To validate the above method, the percent macroscopic separation of one or more components of Validation Composition B specified below must be measured and demonstrated to be from 6% to 10%.

| VALIDATION COMPOSITION B - FOR METHOD TO MEASURE PERCENT MACROSCOPIC SEPARATION | (Wt %) |
|---|---|
| 35% aqueous solution $H_2O_2$[1] | 1.43 |
| Sterile Filtered Water[2] | 4.24 |
| Aerosol OT[3] | 1.00 |
| Mineral Oil[4] | 93.33 |

[1] ultra Cosmetic Grade from Solvay, Houston, Texas
[2] Calbiochem catalog number 4.86505.1000 from EMD Millipore Corporation, Billerica, Massachusetts
[3] Aerosol OT-100 from Cytec Industries, Princeton, NJ
[4] Kaydol grade from Sonneborn LLC, Petrolia, Pennsylvania Procedure to Make Validation Composition B—for Method to Measure Percent Macroscopic Separation
Three 50-gram batches of the validation composition are made according to the following procedure:
a) The Aerosol OT and mineral oil are weighed into a Speedmixer container ("Max 40 Long Cup Translucent", item number 501 223Lt from Flacktek Inc., Landrum, SC). The mixture is heated in a convection oven at 60 C and swirled to dissolve the Aerosol OT in the mineral oil.
b) In a separate plastic container, 42.4 grams of sterile filtered water and 14.3 grams of 35% aqueous solution of H2O2 are weighed and swirled to dissolve the H2O2 into the water. This diluted solution of H2O2 is heated in a convection oven at 60 C for about 10 minutes. 2.84 grams of this diluted solution of H2O2 in water is weighed into the Speedmixer container.
  c) The contents of the Speedmixer container are mixed at 800 RPM for 5 seconds, 1200 RPM for 5 seconds, and 1950 RPM for 2 minutes. The walls of the container are then scraped down with a rubber spatula, and the contents are mixed a second time at 800 RPM for 5 seconds, 1200 RPM for 5 seconds, and 1950 RPM for 2 minutes. The walls of the container are then scraped down with a rubber spatula, and the contents are mixed a third time at 800 RPM for 5 seconds, 1200 RPM for 5 seconds, and 1950 RPM for 2 minutes.

Method to Determine if a Composition is Easy to Manually Dispense from a Tube

1. Select a foil laminate tube with the following dimensions:
   a. Total length from tip of nozzle to bottom of barrel: About 112 mm
   b. Internal diameter of barrel: About 28 mm
   c. Length of nozzle: About 21 mm
   d. Internal diameter of nozzle: About 9.7 mm for half the length of the nozzle attached to the barrel, and about 4.2 mm for the other half of the nozzle leading to the exit orifice of the nozzle.
2. Fill from about 35 to about 40 grams of the composition through the bottom of the barrel into the tube from step-1. Seal the bottom of the barrel using an ultrasonic sealer.
3. Allow the tube to stay undisturbed in a room or chamber in which the air is maintained at the temperature (e.g. −7° C., 4° C., 23° C., 25° C., 30° C., 40° C., 50° C., or 60° C.) for the period of time after which the ease of dispensing is to be measured.
4. Allow the tube to equilibrate at about 23° C. for at least a day.
5. Pick up the tube between the thumb and fingers of one hand. While holding the tube in the air, squeeze the tube firmly between the thumb and fingers for about 10 seconds. Measure the length of the bead of the composition dispensed out of the nozzle of the tube.
6. The composition is considered easy to dispense manually from a tube after the specified period of time at the specified temperature if at least 1 inch of product is dispensed in step-5.

Method to Measure the L*-a*-b* of a Substance or Composition

1. The substance or composition is loaded into a clear disposable petri-dish (60 mm diameter×15 mm high, made from virgin crystal grade polystyrene, VWR catalog number 25384-092, purchased from VWR, Batavia, IL). Tap the petri-dish on a hard surface until it is substantially free of macroscopic air-bubbles or voids. The amount loaded needs to be enough to establish a circular area of contact that is at least about 45 mm in diameter on the bottom of the petri-dish and at least about 10 mm deep.
2. The L* (brightness), a* (red-green balance), and b* (yellow-blue balance) of the substance or composition is measured using a hand-held spectrophotometer Konica Minolta 700d. The spectrophotometer is used with an aperture of about 6.3 mm diameter, the observer angle is set at 2 degrees, the illuminant is set at daylight color temperature of 5003K, and specular reflection is excluded. The spectrophotometer is positioned such that the aperture is pointing upward, and the digital read-out is on the counter. The loaded petri-dish is now carefully centered and placed on the aperture so that it completely covers the aperture. The L*, a*, and b* are then measured with the spectrophotometer. Record these values.
3. Repeat step-2 for a total of three measurements. Calculate the average of the three measurements—this is the L*, a*, and b* of the substance or composition.

Method to Measure Active Release Rate from Compositions

The Active Release Rate Method employs a dialysis cell containing a membrane on which composition is applied and through which the active diffuses depending on the rate of its release from the composition. The dialysis cell serves as a proxy for a tooth and this method can be used to measure the release of any water soluble active for example hydrogen peroxide or fluoride.

A 15 mL dialysis cell (2K MWCO, Slide-A-Lyzer G2 Dialysis Cassette) is filled with WFI MilliQ Water (16 grams) and the cap affixed. To one side of the cassette a test product is applied covering the entire cell membrane surface at a depth defined by the cell plastic housing by leveling the applied product with a spatula. A piece of parafilm is applied over the product composition to protect it during cassette mixing during sampling. The cell is placed either vertically or horizontally product facing down on a tared balanced. A timer is started post product application and samples of the WFI MilliQ water within the cassette are taken at the defined time points and assayed for mg/L or ppm of active. The results are presented as: 1) A chart of the mg/L or ppm of active released Vs. time—this is the "Active Release Rate Profile", and 2) The mg/L or ppm active released after 60 and 120 seconds are also reported—this is the "mg/L or ppm Active Released in 60 and 120 Seconds".

At each defined sample point, the cell is taken and inverted 180 degrees twice, the lid removed and a sample (0.3-0.50 g) pulled via a pipet. Following sampling, the dialysis cell is returned to the balance until the next sample is required. Each sample is assayed for active using any suitable assay procedure. The procedure to assay for peroxide in mg/L peroxide is outlined below.

Procedure to Assay Contents of Dialysis Cell for Peroxide

A Reflectoquant RQ Flex peroxide test strip reader (Millipore Sigma) is calibrated using both 0.2-0.20 mg/L (604) and 100-1000 mg/L (609) test strips (Supelco) with peroxide standard solutions as follows:

0.2-20.0 mg/L strips:
1. 5 grams of 35% Hydrogen Peroxide is diluted to 500 grams total with WFI MilliQ water.
2. 1 gram from (1) is diluted to 500 grams total weight using WFI MilliQ water
3. 2 drops from (2) are applied to a 0.2-20.0 mg/L test strip for 5 seconds and the excess solution dabbed on a paper towel.
4. The test strip is inserted into a RQ Flex 10 with the 0.2-20.0 mg/L test strip program loaded and the measurement recorded. Note total strip development and program is 15 seconds in duration.
5. 2 grams from solution (1) are diluted to 500 grams with WFI MilliQ water and steps (3) and (4) are repeated.

100-1000 mg/L strips:
1. 0.5 grams of 35% Hydrogen Peroxide is diluted to 500 grams total with USP water.
2. 2 drops from (1) are applied to a 0.2-20.0 mg/L test strip for 10 seconds and the excess solution dabbed on a paper towel. The strip is developed by sitting for an additional 50 seconds.
3. The test strip is inserted into a RQ Flex 10 with 10 seconds remaining on the 100-1000 mg/L test strip program and the measurement recorded. Note total strip development and program is approximately 60 seconds in duration for this test strip.
4. 1 gram of 35% Hydrogen Peroxide is diluted to 500 grams total with WFI MilliQ water
5. The test strip is inserted into a RQ Flex 10 with the 100-1000 mg/L test strip program loaded and the measurement recorded.

Peroxide Sample Analysis
1. 2 drops from a given test sample time point are applied to a either a 0.2-20.0 mg/L or 100-1000 mg/L test strip following the development time period and analysis steps defined above (a3-a4 & b2-b3).
2. The diffused peroxide concentration defines the appropriate strip to use. If concentrations exceed the respective strip concentration ranges, serial dilutions are performed to bring the concentration into range.

Procedure to Assay Contents of Dialysis Cell for Fluoride
1. A Fluoride ion selective electrode was calibrated with 5 ppm, 50 ppm, and 500 ppm Sodium Fluoride standards prepared in 50% water and 50% TSIABII with CDTA Buffer.
2. Samples (~0.5 g) were pulled from the dialysis cell at the defined timepoints and diluted with 50% TSIABII with CDTA Buffer
3. The Fluoride ion selective probe was inserted into each defined sample and the reading (mg/L) was recorded.

EXAMPLES

The invention is further illustrated by the following examples, which are not to be construed in any way as imposing limitations to the scope of this invention. Various other aspects, modifications, and equivalents thereof which, after reading the description herein, may suggest themselves to one of ordinary skill in the art without departing from the spirit of the present invention or the scope of the appended claims.

Examples I

TABLE 1

Example I-A and Example I-B

| Weight % | A | B |
|---|---|---|
| Mineral Oil[1] | 81.357 | 81.3570 |
| 35% aqueous solution of H2O2[2] | 8.571 | 17.1410 |
| Purified Water, USP | 8.571 | — |

TABLE 1-continued

Example I-A and Example I-B

| Weight % | A | B |
|---|---|---|
| Sucralose[3] | 0.100 | 0.1000 |
| PEG-20 Sorbitan monolaurate (Tween 20)[4] | 1.000 | 1.0000 |
| Peppermint[5] | 0.400 | 0.4000 |
| Yield Stress (Pa) | 14.75 | 64.67 |
| Appearance | Opaque | — |
| Color | White | — |
| Consistency | Lotion-like | — |
| Dv 50 | 11.0 | 3.39 |
| D[4, 3] | 11.6 | — |
| [3, 2] | 9.87 | — |
| (microns) mean equivalent-diameter of regions or droplets of the hydrophobic phase measured according to the method specified herein (average of 10 × 1 measurements) | | |

[1]Drakeol 35, USP grade from Calumet, Indianapolis, IN
[2]Ultra cosmetic grade 35% from Solvay, Houston, TX diluted down to 17.5%
[3]Sucralose Micronized Powder USP/NF/FCC grade from Newtrend Technology Co. Ltd. Jiangxi, China
[4]Tween20-LQ-(AP) from Croda Inc. Edison, NJ
[5]Peppermint flavor TAK-121065 from Takasago International Corporation, Rockleigh, NJ TABLE 1 shows the formulation for Example A-1 and Example A-2 (same ingredients processed differently), both of which are jammed oil-in-water emulsions. Example I-A (350 kilograms) was produced by combining polysorbate 20, water, sucralose and the aqueous solution of $H_2O_2$ in a 20-gallon premix tank. The premix mixture was transferred to a 400 L vessel and agitated (35 RPM) while mineral oil was slowly added over 12 minutes. A jammed oil-in-water emulsion was formed during this step. Flavor was added and the batch homogenized at 1000 RPM for seven turnovers, and 2000 rpm for one turnover. This was Example I-A.

Example I-B (350 kilograms) was produced by combining polysorbate 20, water, sucralose and the aqueous solution of $H_2O_2$ in a 20-gallon premix tank. The premix mixture was transferred to a 400 L vessel and agitated (35 RPM) while mineral oil was slowly added over 27 minutes. A jammed oil-in-water emulsion was formed during this step. Flavor was added and the batch homogenized at 2000 rpm for three turnovers, 3000 RPM for three turnovers, and 3900 RPM for three turnovers. This was Example I-B.

These data show that, surprisingly, shearing the composition at a high rate of shear using homogenizer energy and time thickened the composition, as evidenced by the 500% increase in its yield stress for the same ingredients.

Comparative Composition I-A, Comparative Composition I-B, and Comparative Composition I-C

TABLE 2

Comparative Composition I-A, Comparative Composition I-B, and Comparative Composition I-C

| Comparative Composition | Ingredients | Number of Ingredients |
|---|---|---|
| Comparative Composition I-A Colgate Optic White Renewal Toothpaste (3% H2O2) | Propylene Glycol, Calcium Pyrophosphate, PVP, PEG/PPG-116/66 Copolymer, Hydrogen Peroxide, Flavor, Sodium Lauryl Sulfate, Tetrasodium Pyrophosphate, MFP, Sodium Saccharin, Disodium Pyrophosphate, Silica, Sucralose, BHT | 14 |

TABLE 2-continued

Comparative Composition I-A, Comparative Composition I-B, and Comparative Composition I-C

| Comparative Composition | Ingredients | Number of Ingredients |
|---|---|---|
| Comparative Composition I-B Colgate Optic White Overnight Pen (4% H2O2) | Alcohol, Acrylates/Octylacrylamide Copolymer, Water, Hydrogen Peroxide | — |
| Comparative Composition I-C Sensodyne Pronamel (1100 ppm Fluoride) | Water, Sorbitol, Hydrated Silica, Glycerin, Potassium Nitrate, PEG-8, Cocoamidopropyl betaine, Sodium Fluoride, Flavor, Titanium dioxide, xanthan gum, sodium saccharin, sodium hydroxide | 13 |
| Comparative Composition I-D Paradontax (1100 ppm Fluoride) | Glycerin, PEG-8, Hydrated Silica, Pentasodium triphosphate, flavor, Stannous fluoride, Sodium lauryl sulfate, Titanium dioxide, Polyacrylic acid, Cocoamidopropyl betaine, sodium saccharin | 11 |

The peroxide (active) release rate was determined according to the method specified herein for four compositions: 1) Example I-A, 2) Example I-B, 3) Comparative Composition I-A, 4) Comparative Composition I-B. Example I-A and Example I-B are inventive compositions. Comparative Composition I-A and Comparative Composition I-B are commercial products marketed by the Colgate-Palmolive Company. Comparative Composition I-A is Colgate Optic White Renewal Toothpaste, which is marketed to include hydrogen peroxide at 3% wt %. Comparative Composition I-B is Colgate Optic White Overnight, which is also marketed to include hydrogen peroxide at 4 wt %. The Peroxide Release Rate Profiles [mg/L peroxide released over time] of these four compositions are shown in FIG. 1. Surprisingly, both the inventive compositions (Example I-A and Example I-B) have a much higher peroxide release rate profile Vs. Comparative Composition I-A and Comparative Composition I-B. The mg/L peroxide released in 60 and 120 Seconds by these four compositions are presented in TABLE 3. While the recommended brushing time by the American Dental Association is 120 seconds, many people brush for 60 seconds or less. Surprisingly, both the inventive compositions (Example I-A and Example I-B) released a much higher amount of peroxide in both 60 and 120 seconds Vs. Comparative Composition I-A and Comparative Composition I-B. It is worth noting that the inventive compositions (Example I-A and Example I-B) released about 300% more mg/L peroxide after 60 seconds and 120 seconds Vs. Comparative Composition I-B even though the inventive compositions had 25% less peroxide (4% Vs. 3% peroxide).

TABLE 3 mg/L Peroxide Released In 60 and 120 Seconds

| | Example I-A (Jammed Oil-in-Water Emulsion Toothpaste) | Example I-B (Jammed Oil-in-Water Emulsion Toothpaste) | Comparative Composition I-A (Traditional Toothpaste) | Comparative Composition I-B (Traditional Toothpaste) |
|---|---|---|---|---|
| mg/L peroxide released in 60 seconds measured according to the method specified herein | 390 | 332 | 0 | 0 |
| mg/L peroxide released in 120 seconds measured according to the method specified herein | 717 | 627 | 0 | 2 |

Examples II

TABLE 4

Example II-A, Example II-B, Example II-C, Example II-D, Example II-E, Example II-F, Example II-G, Example II-H, Example II-I

| Weight % | A | B | C | D | E |
|---|---|---|---|---|---|
| 35% aqueous solution of $H_2O_2$[1] | 8.5147 | 8.5147 | 8.5147 | 8.5147 | 8.5147 |
| PEG-20 Sorbitan monolaurate (Tween 20)[2] | 1.0000 | 1.0000 | 3.0000 | 1.0000 | 1.0000 |
| Mineral oil[3] | 2.0000 (pre-mix) + 86.3853 (main batch) | — | — | — | — |
| Mineral oil[4] | — | 2.0000 (pre-mix) + 86.3853 (main batch) | — | — | — |
| Mineral oil[5] | — | — | 2.0000 (pre-mix) + 84.3853 (main batch) | 2.0000 (pre-mix) + 86.3853 (main batch) | 2.0000 (pre-mix) + 86.1423 (main batch) |
| Sucralose[6] | 0.1000 | 0.1000 | 0.1000 | 0.1000 | 0.1000 |
| Flavor |  |  |  |  |  |
| Menthol[7] | 1.0000 | 1.0000 | 1.0000 | 1.0000 | 1.0000 |
| Peppermint[8] | 1.0000 | 1.0000 | 1.0000 | 1.0000 | 1.0000 |
| Sodium fluoride[9] | — | — | — | — | 0.2430 |
| Sodium lauryl sulfate[10] | — | — | — | — | — |
| Calcium pyrophosphate[11] | — | — | — | — | — |
| % $H_2O_2$ | 3 | 3 | 3 | 3 | 3 |
| ppm Fluoride | — | — | — | — | 1100 |
| Free of opacifier? | YES | YES | YES | YES | YES |
| Number of ingredients[12] | 6 | 6 | 6 | 6 | 7 |
| Yield Stress measured according to the method specified herein (Pa) | 168 | 205 | >Measurement limit of 800 | 178 | 156 |
| Appearance | Opaque | Opaque | Opaque | Opaque | Opaque |
| Color | White | White | White | White | White |
| Consistency | Semisolid | Semisolid | Semisolid | Semisolid | Semisolid |
| L* | — | — | 63.51 | 80.66 | — |
| a* |  |  | −3.10 | −0.39 |  |
| b* of the composition measured according to the method specified herein |  |  | −9.71 | −1.25 |  |
| Dv 50 | — | — | 0.56 | 2.36 | — |
| D[4, 3] |  |  | 0.58 | 2.42 |  |
| [3, 2] (microns) mean equivalent-diameter of regions or droplets of the |  |  | 0.51 | 1.97 |  |

TABLE 4-continued

Example II-A, Example II-B, Example II-C, Example II-D, Example II-E, Example II-F, Example II-G, Example II-H, Example II-I hydrophobic phase measured according to the method specified herein

| Weight % | F | G | H | I |
|---|---|---|---|---|
| 35% aqueous solution of $H_2O_2$[1] | 8.5147 | 8.5147 | 8.5147 | 8.5147 |
| PEG-20 Sorbitan monolaurate (Tween 20)[2] | 1.0000 | 1.0000 | 1.0000 | 1.0000 |
| Mineral oil[3] | — | — | — | — |
| Mineral oil[4] | — | — | — | — |
| Mineral oil[5] | 2.0000 (pre-mix) + 84.3853 (main batch) | 2.0000 (pre-mix) + 84.3853 (main batch) | 2.0000 (pre-mix) + 82.1423 (main batch) | 2.0000 (pre-mix) + 86.2638 (main batch) |
| Sucralose[6] | 0.1000 | 0.1000 | 0.1000 | 0.1000 |
| Flavor | | | | |
| Menthol[7] | 1.0000 | 1.0000 | 1.0000 | 1.0000 |
| Peppermint[8] | 1.0000 | 1.0000 | 1.0000 | 1.0000 |
| Sodium fluoride[9] | — | — | 0.2430 | 0.1215 |
| Sodium lauryl sulfate[10] | 2.0000 | — | 2.0000 | — |
| Calcium pyrophosphate[11] | — | 2.0000 | 2.0000 | — |
| % H2O2 | 3 | 3 | 3 | 3 |
| ppm Fluoride | — | — | 1100 | 550 |
| Free of opacifier? | YES | No | No | Yes |
| Number of ingredients[12] | 7 | 7 | 9 | 7 |
| Yield Stress measured according to the method specified herein (Pa) | 596 | 190 | 191 | 148 |
| Appearance | Opaque | Opaque | Opaque | Opaque |
| Color | White | White | White | White |
| Consistency | Semisolid | Semisolid | Semisolid | Semisolid |
| L* | 66.21 | — | — | — |
| a* | −3.89 | | | |
| b* | −9.69 | | | |
| of the composition measured according to the method specified herein | | | | |
| Dv 50 | 0.44 | — | — | — |
| D[4, 3] | 0.45 | | | |
| [3, 2] (microns) mean equivalent-diameter of regions or | 0.40 | | | |

TABLE 4-continued

Example II-A, Example II-B, Example II-C, Example II-D, Example II-E, Example II-F, Example II-G, Example II-H, Example II-I droplets of the hydrophobic phase measured according to the method specified herein

[1] Ultra cosmetic grade 35% from Solvay, Houston, TX
[2] Tween20-LQ-(AP) from Croda Inc. Edison, NJ
[3] Hydrobrite HV grade from Sonneborn LLC., Parsippany, NJ
[4] Drakeol 35, USP grade from Calumet, Indianapolis, IN
[5] Hydrobrite 1000 grade from Sonneborn LLC., Parsippany, NJ
[6] Sucralose Micronized Powder USP/NF/FCC grade from Newtrend Technology Co. Ltd. Jiangxi, China
[7] Menthol USP grade from Boody Menthol International Inc., Paramus, NJ
[8] Peppermint flavor TAK-121065 from Takasago International Corporation, Rockleigh, NJ
[9] Sodium Fluoride USP from Sunlit Fluo Chemical, Taiwan, R.O.C.
[10] Sodium lauryl sulfate, Stepanol WA-100 NF/USP grade from Stepan Company, Northfield, IL
[11] Calcium pyrophosphate, Prayphos SCPP 0000 Dental grade from Prayon, Augusta, GA
[12] This counts flavor as one ingredient comprising a mixture of peppermint and menthol, and counts 35% aqueous solution of H2O2 as two ingredients comprising water and H2O2.

700-gram batches of Example II-A, Example II-B, Example II-C, Example II-D, Example II-E, Example II-F, and Example II-I were made according to the following procedure:
1. The Peppermint, Mineral Oil for Pre-mix, and Menthol were weighed into a Speedmixer container ("Max 40 Long Cup Translucent", item number 501 223Lt from Flacktek Inc., Landrum, SC), heated in a convection oven set at 33 C to 35 C for about 30 to 60 minutes, and Speedmixed at 800 RPM for 2 minutes and visually checked to make sure the Menthol was dissolved.
2. The Sucralose, Tween 20, and Aqueous solution of H2O2 were weighed (along with Sodium lauryl sulfate, and Sodium fluoride if listed above) into a Speedmixer container (Max 200 Long Cup Translucent item number 501 220t from Flacktek Inc., Landrum, SC) and mixed in Speedmixer at 800 RPM for 2 minutes and visually checked to make sure all the ingredients were dissolved. The contents of this Speedmixer container were then transferred into a High Shear Mixer (KFP0711 Food Processor from KitchenAid, Benton Harbor, MI).
3. The Mineral Oil for Main Batch was weighed into a separate container and slowly added over 3 to 5 minutes into the High Shear Mixer while it was running at LOW-speed setting.
4. The Pre-mix (of Peppermint, Mineral Oil for Pre-mix, and Menthol) from step-1 was added into the High Shear Mixer while it was running at LOW-speed setting.
5. The contents of the High Shear Mixer were mixed at HIGH-speed setting for about 5 minutes. The High Shear Mixer was stopped, opened and allowed to cool for about 5 minutes. The contents of the High Shear Mixer were again mixed at HIGH-speed setting for about 5 minutes. The above procedure resulted in jammed oil-in-water emulsion.

500-gram batches of Example II-G and Example II-H were made according to the following procedure:
A. A 700-gram base-batch was prepared using the above steps 1 to 5.
B. 10 grams of Calcium pyrophosphate was weighed into a separate Speedmixer container (Max 300×Long Cup Translucent item number 501 217t, from Flacktek Inc., Landrum, SC), 490 grams of the base-batch from step-A was transferred into this Speedmixer container, and the contents of this Speedmixer container were mixed at 800 RPM for 2 minutes.

The above procedure resulted in jammed oil-in-water emulsion comprising Calcium pyrophosphate.

TABLE 4 shows that:
1. Surprisingly, Examples II-A, II-B, II-C, II-D, II-E, II-F, and II-I have a yield stress much greater than 20 Pa even though they do not contain polymeric binders, polymeric rheology modifiers, or particulate thickeners such as silica.
2. Surprisingly, Examples II-A, II-B, II-C, II-D, II-E, II-F, and II-I are opaque even though they do not contain an opacifier.
3. Surprisingly, while the L* of all the Examples whose L* was measured (Examples II-C, II-D, and II-F) have a L* value greater than 20, only Example II-D has a L* greater than 70—even though it does not have any added opacifiers or brighteners.
4. Surprisingly, while the D[4,3] of all the Examples whose D[4,3] was measured (Examples II-C, II-D, and II-F) have a D[4,3] greater than 0.4 micron, only Example II-D has a D[4,3] greater than 0.7 micron.
5. Without wishing to be bound by theory, it is believed that:
   a. The higher L* of Example II-D (80.66 units) may be due to the larger droplet size D[4,3] (2.42 microns, which is much larger than the longest wavelength of visible light which is about 0.7 microns).
   b. The lower L* of Example II-C and II-F (63.51 units and 66.21 units) may be due to the smaller droplet size D[4,3] (0.58 microns and 0.45 microns, which are both smaller than the longest wavelength of visible light which is about 0.7 microns.
6. Despite the droplet size D[4,3] of Example II-C (0.58 microns) and II-F (0.45 microns) being smaller than the longest wavelength of visible light, both Examples II-C and II-F are opaque. Without wishing to be bound by theory, it is believed that this may due to the fact that their D[4,3] is still larger than the shortest wavelength of visible light which is about 0.4 micron.

7. It is also worth noting that Examples II-C and II-F have a yield stress substantially higher than the rest, and specifically higher than Example II-D (>800 Pa and 596 Pa Vs. a maximum of 205 Pa for the rest, and 178 Pa for Example II-D). Without wishing to be bound by theory, it is believed that this may due to the fact that the droplet size D[4,3] of Examples II-C and II-F are lower than that of II-D (0.58 micron and 0.45 micron Vs. 2.42 micron).

8. It is worth noting that the brochure titled "Manufacture of Toothpastes" (Issue No. 14TA4, Silverson Machines, East Longmeadow, MA) teaches that "Toothpastes are generally either white abrasive pastes or clear gels. Although the formulations differ, they share many common ingredients; these may vary from country to country according to legislation on use of ingredients, etc. Typical ingredients and their function are shown in TABLE 5.

TABLE 5

Typical toothpaste ingredients

| Ingredient type | Typical % | Function |
|---|---|---|
| Liquid Base | White - 30 Gel - Up to 80 | Polyols, most commonly sorbitol (glycerin is also used) act as a humectant, preventing the product from drying out and preserving the texture and flavor. Polyol solutions can contain up to 30% water; additional water (10-25%) completes the liquid base. |
| Fillers and Abrasives | White - 20-50 Gel - 15-25 | Various ingredients provide the polishing action in white toothpastes; these include calcium carbonate, hydrated silica, sodium bicarbonate, dicalcium phosphate and sodium metaphosphate. In clear gel type products, hydrated silica is used to provide polishing and "body." |
| Rheology Modifiers | 0.5-2 | Used to obtain several properties: the toothpaste must flow easily but not too rapidly from the tube; it must "break" easily without being "stringy"; it must sit on the toothbrush without sinking in; these ingredients are also used to keep fillers/abrasives in suspension. Various ingredients are used, including CMC, carrageenan, xanthan gum and cellulose gum. |
| Detergent | 0.5-2.5 | Added to make the product foam when brushing. This helps dispersion and retention of the product in the mouth. SLS (Sodium Lauryl Sulphate) is most commonly used. |
| Active Ingredient | 0.3 | Fluoride can be added to help prevent tooth decay. Sodium fluoride, sodium monofluorophosphate and stannous fluoride are used, subject to legislation, etc. |
| Flavor | 0.5-2 | Flavoring is added to disguise the unpleasant taste of the detergent. It also provides "freshness." Typically mint (and sometimes menthol and cinnamon)flavoring oils are used. |
| Sweetener | 0.2 | Sweeteners include sodium saccharinate. |
| Coloring | 0.1 | Titanium dioxide can be added to white toothpaste as a coloring; gel toothpastes may be manufactured in a number of colors using food gradeproducts. |
| Preservative | 0.2 | Sodium benzoate, ethyl paraben, methyl paraben. |

Surprisingly, in contrast to the above teaching from Silverson, Examples II-A to II-I are toothpaste compositions containing very few and very simple ingredients (with just 6 to 9 ingredients)—see TABLE 4 above and TABLE 6 below.

TABLE 6

| | Example | | | | | | | | |
|---|---|---|---|---|---|---|---|---|---|
| | II-A | 11-B | II-C | II-D | II-E | II-F | II-G | II-H | II-I |
| Free of Liquid Base? | No | No | No | No | No | No | No | No | No |
| Free of Fillers and Abrasives? | YES | YES | YES | YES | YES | YES | No | No | YES |
| Free of Rheology Modifiers such as gums? | YES | YES | YES | YES | YES | YES | YES | YES | YES |
| Free of Detergents such as SLS? | YES | YES | YES | YES | YES | No | YES | No | YES |
| Free of Active Ingredients such as Fluoride? | YES | YES | YES | YES | No | YES | YES | No | No |
| Free of Flavor? | No | No | No | No | No | No | No | No | No |
| Free of Sweetener? | No | No | No | No | No | No | No | No | No |
| Free of Coloring? | YES | YES | YES | YES | YES | YES | No | No | YES |
| Free of Preservatives such as parabens? | YES | YES | YES | YES | YES | YES | YES | YES | YES |

Figure 5:
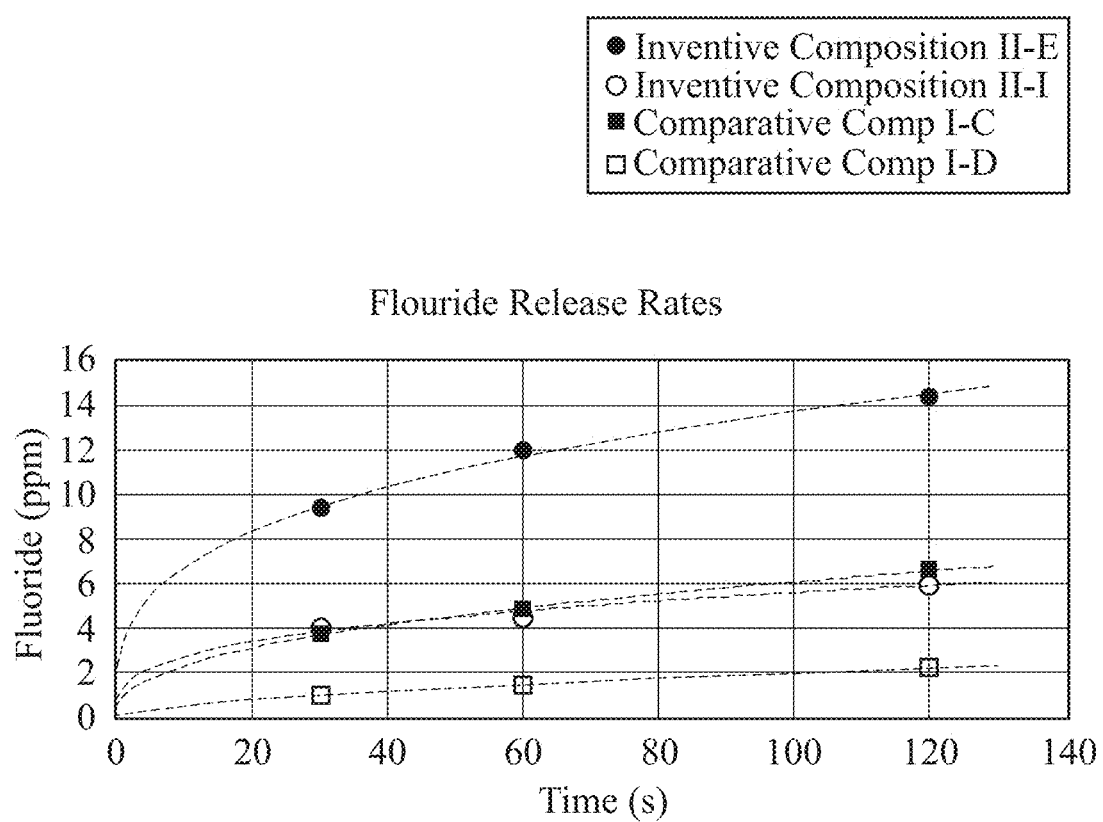
FIG. 5 shows the fluoride release rate of Example II-E, Example II-I, and Comparative Composition I-C.
Figure 6A:
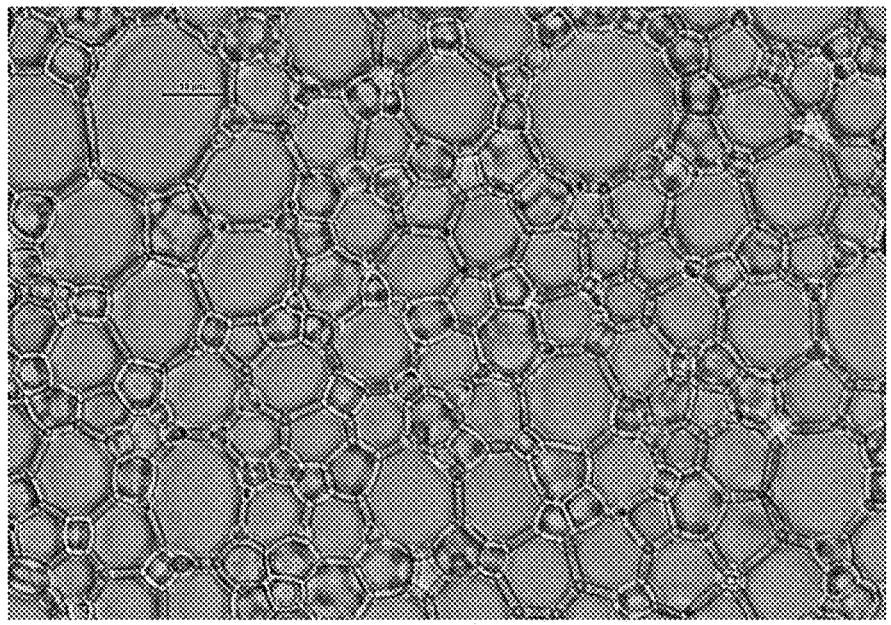
FIG. 6A shows a microscope image of Example I-A.
Figure 6B:
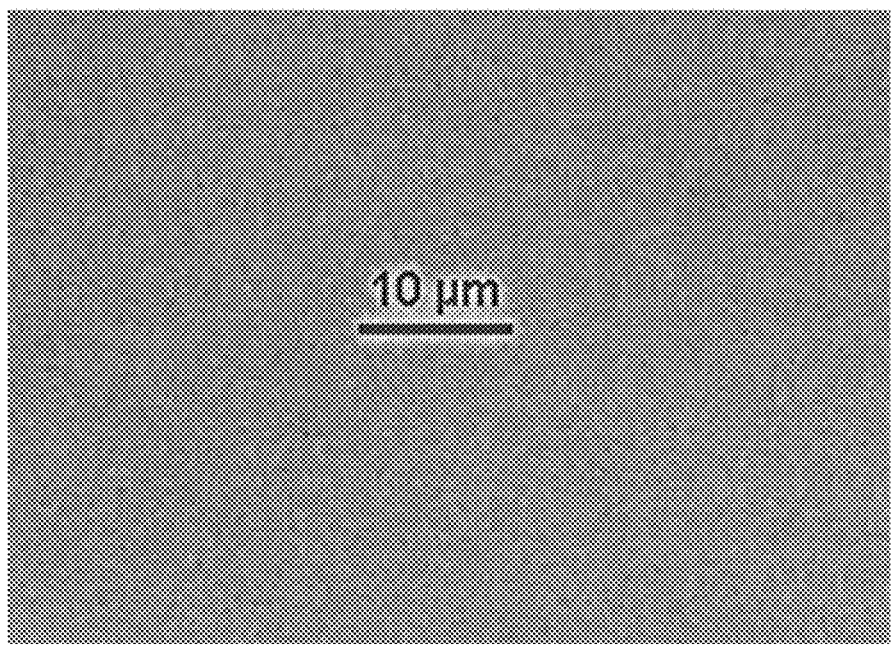
FIG. 6B shows a microscope image of Example II-C.
Figure 6C:
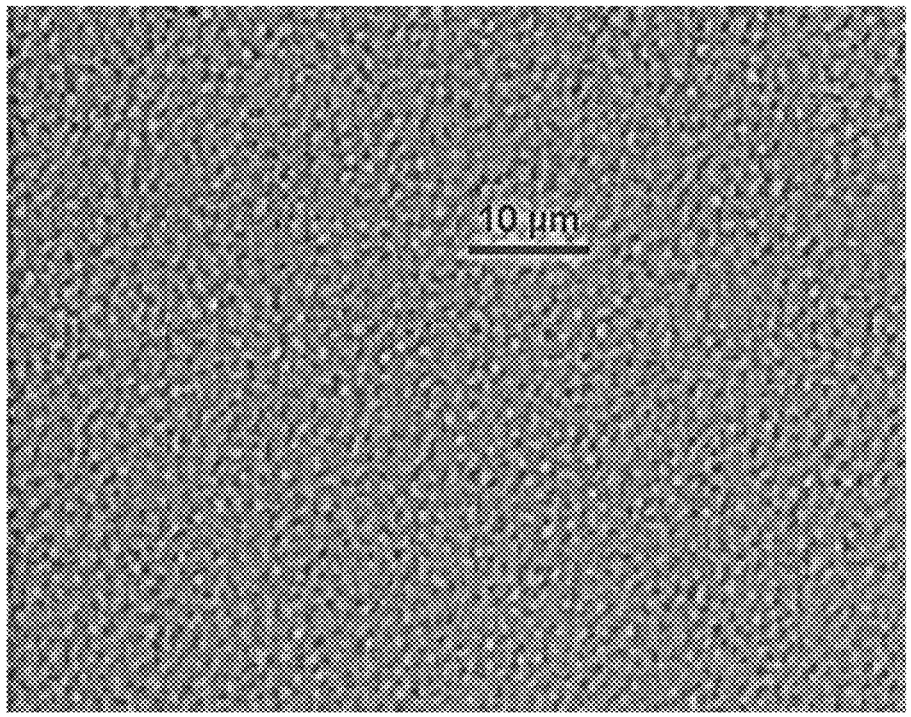
FIG. 6C shows a microscope image of Example II-D.
Figure 6D:
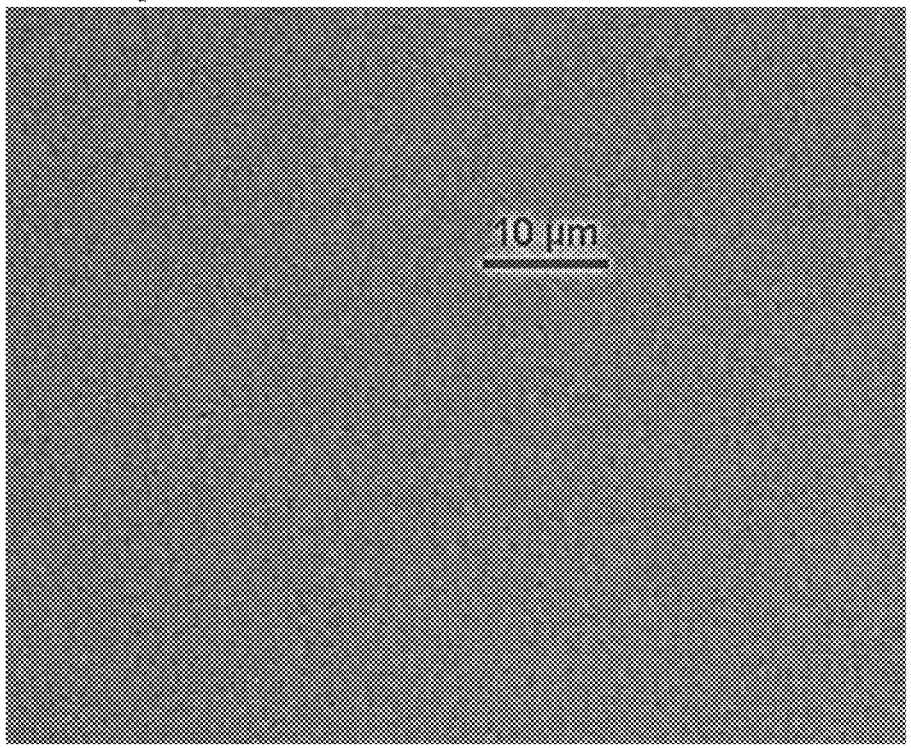
FIG. 6D shows a microscope image of Example II-F.

The Fluoride (active) release rate was determined according to the method specified herein for four compositions: 1) Example II-E, 2) Example II-I, 3) Comparative Composition I-C(Sensodyne Pronamel, 1100 ppm fluoride) and 4) Comparative Composition I-D (Paradontax, 1100 ppm fluoride). Example II-E and Example II-I are inventive compositions containing 1100 ppm and 550 ppm Fluoride respectively. The Fluoride Release Rate Profiles [ppm Fluoride released over time] of these four compositions are shown in FIG. 5. FIG. 5 shows that both the inventive compositions (Example II-E and Example II-I) have a much higher Fluoride release rate profile Vs. Comparative Composition I-D. The ppm Fluoride released in 60 and 120 Seconds by these four compositions are additionally presented in TABLE 7.

TABLE 7 ppm Fluoride Released In 60 and 120 Seconds

|  | Example II-E (Jammed Oil-in-Water Emulsion Toothpaste) 1100 ppm F | Example II-I (Jammed Oil-in-Water Emulsion Toothpaste) 550 ppm F | Comparative Composition I-C (Traditional Toothpaste) 1100 ppm F | Comparative Composition I-D (Traditional Toothpaste) 1100 ppm |
|---|---|---|---|---|
| ppm Fluoride released in 60 seconds measured according to the method specified herein | 12.0 | 4.7 | 4.9 | 1.5 |
| ppm Fluoride released in 120 seconds measured according to the method specified herein | 14.4 | 6.0 | 6.6 | 2.2 |

TABLE 7 shows that surprisingly in 60 seconds:
a) Example II-E released a much higher amount (over 300%) of Fluoride Vs. Comparative Composition I-C and Comparative Composition I-D (12 ppm Vs. 4.9 ppm and 1.5 ppm)
b) Example II-I released almost the same amount of Fluoride as Comparative Composition I-C (4.7 ppm Vs. 4.9 ppm) even though it was formulated with half the Fluoride (550 ppm II-I vs 1100 ppm)
c) Example II-E released a much higher amount (over 300%) of Fluoride Vs. Comparative Composition I-D (4.7 ppm Vs. 1.5 ppm) even though it was formulated with half the amount of Fluoride (550 ppm Vs. 1100 ppm)

Similar results are observed after 120 seconds.

These results clearly demonstrate that a 550 ppm composition of the present invention (Example II-I) performs like a 1100 ppm traditional toothpaste (Comparative Composition II-C) or better than a 1100 ppm traditional toothpaste (Comparative Composition II-D).

Example III

TABLE 8

| Example III | |
|---|---|
| Weight % | A |
| 35% aqueous solution of $H_2O_2$[1] | 8.5714 |
| PEG-20 Sorbitan monolaurate (Tween 20)[2] | 1.0000 |
| Fractionated coconut oil[3] | 90.4286 |

TABLE 8-continued

| Example III | |
|---|---|
| Weight % | A |
| Appearance | Opaque |
| Color | White |
| Consistency | Lotion-like |

[1]Ultra cosmetic grade 35% from Solvay, Houston, TX
[2]Tween20-LQ-(AP) from Croda Inc. Edison, NJ
[3]Fractionated Coconut Oil (or MCT—Medium Chain Triglycerides), Supplier website bulkapothecary.com (Aug. 8, 2021) states it to be "Nearly clear. Typically, colorless to light yellow", "MCT can also be derived from Palm Oil through the esterification process.", "Also known as MCT Oil or Medium Chain Triglycerides is a fraction of the whole coconut oil.", and ". . . fractionated coconut oil has the long chain triglycerides like lauric acid removed retaining the capric and caprylic acids."; Item number J-007-bna-123 from Bulk Apothecary, Aurora, OH.

A 100-gram batch of Example III-A was made according to the following procedure:

4. The Tween 20, and aqueous solution of $H_2O_2$ were weighed into a Speedmixer container ("Max 200 Long Cup Translucent", item number 501 220t from Flacktek, Landrum, SC) and mixed by manually swirling the container until dissolved.

5. The oil was added in portions starting at about 2 g first, about 3 g next, and about 5 g thereafter and mixed at 800 RPM for 2 minutes between portions in a Speedmixer. An oil-in-water emulsion formed during this step, and the composition developed a lotion-like semi-solid consistency.
6. Once all the oil was added, the contents of the Speedmixer container were mixed 3 times at 800 RPM for 2 minutes each time in a Speedmixer.

TABLE 9

Yield Stress of Hydrophobic Phase (without flavor) and Aqueous Phase (without sweetener) of Example II-B

| | Yield Stress (Pa) |
|---|---|
| Hydrophobic Phase (Mineral Oil)[1] | <Detection Limit of 4 |
| Aqueous Phase (Plus $H_2O_2$ and Tween 20)[2] | <Detection Limit of 4 |

[1]Kaydol grade from Sonneborn LLC., Parsippany, NJ
[2]Ultra cosmetic grade 35% from Solvay, Houston, TX (8.5714 parts) + Tween20-LQ-(AP) from Croda Inc. Edison, NJ (1.0000 part)

TABLE 10

Appearance, Color, Consistency, and L*, a*, b* of Hydrophobic Phase (without flavors) and Aqueous Phase (without sweetener) of Example II-D

| | Hydrophobic Phase (Mineral Oil)[1] | Aqueous Phase (Plus $H_2O_2$ and Tween 20)[2] |
|---|---|---|
| Appearance | Clear | Translucent |
| Color | Colorless | Pale yellow |
| Consistency | Free flowing liquid | Free flowing liquid |
| L* | 1.24 | 0.93 |
| a* | −0.04 | −0.24 |
| b* | −0.54 | −0.73 |
| measured according to the method specified herein | | |

[1]Hydrobrite 1000 grade from Sonneborn LLC., Parsippany, NJ
[2]Ultra cosmetic grade 35% from Solvay, Houston, TX (8.5147 parts) + Tween20-LQ-(AP) from Croda Inc. Edison, NJ (1.0000 part)

TABLE 10 compared with TABLE 4 shows that Hydrophobic Phase and Aqueous Phase are not opaque, but surprisingly, when they are combined, as in Example II-D the final composition is opaque even though it does not contain an opacifier. TABLE 9 compared with TABLE 4 also shows that Hydrophobic Phase and Aqueous Phase have a L* much less than 25, but surprisingly, when they are combined as in Example II-D, the final composition has a L* greater than 25 even though it does not contain an opacifier. It is worth noting that the L* of the final composition of Example II-D has a L* value 6500% more than the L* of the Hydrophobic Phase and 8700% more than the L* of the Aqueous Phase (80.66 Vs. 1.24 and 0.93) even though it does not have an opacifier.

FIG. 3 shows that Hydrophobic Phase and Aqueous Phase are not opaque, but surprisingly, when they are combined as in Examples II-C, II-D, and II-F the final compositions are opaque even though these Examples do not contain an opacifier. FIG. 3 also shows that Example II-D is brighter than Examples II-C and II-F.

FIG. 4A-D shows a nurdle of Examples II-C, II-D, II-F, and II-G dispensed onto a toothbrush. FIG. 4A-D shows that these Example compositions have a yield stress that allows them to stand-up on the bristles without sinking into the bristles or flow down the sides of the bristles—surprisingly even though they do not contain polymeric binders, polymeric rheology modifiers, or particulate thickeners such as silica. FIG. 4A-D also shows that Examples II-C, II-D, and II-F are surprisingly opaque even though they do not contain an opacifier.

FIG. 5 shows a nurdle of Example I-A dispensed onto a toothbrush. FIG. 5 shows that this Example, in contrast to the Examples in FIG. 4, does not have a yield stress that allows it to stand-up on the bristles.

FIG. 6A-D shows microscopic images of jammed emulsions of Example I-A, II-C, II-D, and II-F with varying droplet sizes of the hydrophobic phase.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A toothpaste composition comprising:
   (a) an aqueous phase;
   (b) greater than 80%, by weight of the toothpaste composition, of a hydrophobic phase; and
   (c) an emulsifier,
   wherein the toothpaste composition is a jammed oil-in-water emulsion composition comprising droplets of the hydrophobic phase, and the droplets have a D[4,3] equivalent-diameter from 0.001 microns to 1000 microns,
   wherein the hydrophobic phase is discontinuous and separate regions of the hydrophobic phase influence a shape of one another, and
   wherein the toothpaste composition is substantially free of opacifier and the toothpaste composition is opaque.

2. The toothpaste composition of claim 1, wherein the D[4,3] equivalent-diameter is from 0.01 microns to 100 microns.

3. The toothpaste composition of claim 1, wherein a yield stress of the toothpaste composition is greater than a yield stress of the hydrophobic phase and a yield stress of the aqueous phase.

4. The toothpaste composition of claim 1, wherein a yield stress of the toothpaste composition is from 4 Pa to 1000 Pa.

5. The toothpaste composition of claim 1, wherein a yield stress of the toothpaste composition is from 25 Pa to 500 Pa.

6. The toothpaste composition of claim 1, wherein the emulsifier comprises nonionic surfactant, anionic surfactant, cationic surfactant, zwitterionic surfactant, amphoteric surfactant, polymeric surfactant, synthetic surfactant, or combinations thereof.

7. The toothpaste composition of claim 6, wherein the emulsifier is substantially free of sulfate.

8. The toothpaste composition of claim 6, wherein the emulsifier is substantially free of sodium lauryl sulfate.

9. The toothpaste composition of claim 6, wherein the emulsifier comprises polysorbate, alkyl sulfate, betaine, or combinations thereof.

10. The toothpaste composition of claim 1, further comprising an oral care active agent.

11. The toothpaste composition of claim 10, wherein the oral care active agent comprises a whitening agent, and the whitening agent comprises peroxide.

12. The toothpaste composition of claim 11, wherein the peroxide comprises hydrogen peroxide, urea peroxide, polyvinylpyrrolidone peroxide complex, cross-linked polyvinylpyrrolidone peroxide complex, or combinations thereof.

13. The toothpaste composition of claim 10, wherein the oral care active agent comprises an anticaries agent, and the anticaries agent comprises hops, fluoride, or combinations thereof.

14. The toothpaste composition of claim 13, wherein the oral care active agent comprises fluoride, and the fluoride comprises sodium fluoride, amine fluoride, sodium monofluorophosphate, stannous fluoride, or combinations thereof.

15. The toothpaste composition of claim 10, wherein the oral care active agent comprises an antibacterial agent, and the antibacterial agent comprises hops, metal, or combinations thereof.

16. The toothpaste composition of claim 15, wherein the antibacterial agent comprises a metal, and the metal comprises zinc, tin, copper, or combinations thereof.

17. The toothpaste composition of claim 16, wherein the metal comprises the zinc, and the zinc comprises zinc phosphate, zinc oxide, zinc citrate, zinc lactate, zinc chloride, or combinations thereof.

18. The toothpaste composition of claim 16, wherein the metal comprises the tin, and the tin comprises stannous fluoride, stannous chloride, or combinations thereof.

19. The toothpaste composition of claim 10, wherein the oral care active agent comprises an amino acid, and the amino acid comprises arginine, histidine, lysine, aspartic acid, glutamic acid, serine, threonine, asparagine, glutamine, cysteine, selenocysteine, glycine, proline, alanine, valine, isoleucine, leucine, methionine, phenylalanine, tyrosine, tryptophan, citrulline, ornithine, creatine, diaminobutanoic acid, diaminoproprionic acid, salts thereof, or combinations thereof.

20. The toothpaste composition of claim 10, wherein the oral care active agent comprises an antisensitivity agent, and the antisensitivity agent comprises potassium nitrate, tin, dicarboxylic acid, or combinations thereof.

21. The toothpaste composition of claim 20, wherein the oral care active agent comprises a dicarboxylic acid, and the dicarboxylic acid comprises oxalic acid, salts thereof, or combinations thereof.

22. The toothpaste composition of claim 10, wherein the oral care active agent comprises a retinoid compound, and the retinoid compound comprises retinol.

23. The toothpaste composition of claim 1, wherein the toothpaste reflects visible light.

24. The toothpaste composition of claim 23, wherein the visible light comprises light with a wavelength of from 0.4 microns to 0.7 microns.

25. The toothpaste composition of claim 1, further comprising an abrasive.

26. The toothpaste composition of claim 25, wherein the abrasive comprises silica abrasive, calcium abrasive, alumina abrasive, or combinations thereof.

27. The toothpaste composition of claim 1, wherein the toothpaste composition is substantially free of abrasive.

28. The toothpaste composition of claim 1, wherein the hydrophobic phase comprises edible oil, natural oil, or synthetic oil.

29. The toothpaste composition of claim 28, wherein the hydrophobic phase comprises mineral oil, petrolatum, coconut oil, palm oil, or combinations thereof.

* * * * *